US011685208B2

(12) United States Patent
Sardes et al.

(10) Patent No.: US 11,685,208 B2
(45) Date of Patent: Jun. 27, 2023

(54) DUAL-AXLE VEHICLE CORNER ASSEMBLY

(71) Applicant: REE AUTOMOTIVE LTD, Glil-Yam (IL)

(72) Inventors: Ahishay Sardes, Tel Aviv (IL); Ran Dekel, Nofit (IL); Zohar Goldenstein, Nes-Tziyona (IL); Ran Meir, Givataim (IL); Ido Gury, Tel-Aviv Jaffa (IL)

(73) Assignee: REE AUTOMOTIVE LTD, Glil-Yam (IL)

( * ) Notice: Subject to any disclaimer, the term of this patent is extended or adjusted under 35 U.S.C. 154(b) by 0 days.

(21) Appl. No.: 17/972,864

(22) Filed: Oct. 25, 2022

(65) Prior Publication Data

US 2023/0037444 A1    Feb. 9, 2023

Related U.S. Application Data

(63) Continuation of application No. PCT/IL2022/050425, filed on Apr. 26, 2022.
(Continued)

(51) Int. Cl.
*B60G 5/04* (2006.01)
*B60G 17/052* (2006.01)
(Continued)

(52) U.S. Cl.
CPC ........... *B60G 5/04* (2013.01); *B60G 17/0523* (2013.01); *B60K 7/0007* (2013.01); *B62D 21/11* (2013.01);
(Continued)

(58) Field of Classification Search
CPC .......... B60G 5/04; B60G 7/04; B60G 21/023; B60G 21/045; B60G 2204/13;
(Continued)

(56) References Cited

U.S. PATENT DOCUMENTS

| 429,331 A | 6/1890 | Wise |
| 2,237,575 A | 4/1941 | Quartullo |

(Continued)

FOREIGN PATENT DOCUMENTS

| DE | 467309 C | * 10/1928 |
| DE | 2836028 | 9/1979 |

(Continued)

OTHER PUBLICATIONS

Communication Relating to the Results of the Partial International Search for PCT Appl. No. PCT/IL2022/050892 dated Dec. 8, 2022.
(Continued)

*Primary Examiner* — Laura Freedman
(74) *Attorney, Agent, or Firm* — Pearl Cohen Zedek Latzer Baratz LLP

(57) ABSTRACT

A dual-axle vehicle corner assembly which may include a sub-frame, a first arm connected to the sub-frame and rotatable with respect to the sub-frame about a first arm axis, the first arm having a first axle axis about which a first wheel rotates when connected to the first arm, a second arm connected to the sub-frame and rotatable with respect to the sub-frame about a second arm axis, the second arm having a second axle axis about which a second wheel rotates when connected to the second arm, and a suspension system comprising a piston assembly interconnecting the first arm and the second arm, the piston assembly is to controllably increase and decrease a length of the piston assembly to control a distance between the first axle axis and the second axle axis.

20 Claims, 32 Drawing Sheets

Related U.S. Application Data

(60) Provisional application No. 63/179,815, filed on Apr. 26, 2021.

(51) Int. Cl.
*B60K 7/00* (2006.01)
*B62D 21/11* (2006.01)

(52) U.S. Cl.
CPC .............. *B60K 2007/0046* (2013.01); *B60K 2007/0061* (2013.01)

(58) Field of Classification Search
CPC .......... B60G 2204/17; B60G 2204/422; B60G 2300/0262; B60G 17/0523; B60G 2202/32; B60G 2202/413; B60G 2500/30; B60K 7/0007; B60K 2007/0046; B60K 2007/0061; B62D 21/11; F16F 9/16
See application file for complete search history.

(56) References Cited

U.S. PATENT DOCUMENTS

| | | |
|---|---|---|
| 2,336,485 A | 12/1943 | Knox |
| 2,589,863 A | 3/1952 | Quartullo |
| 2,702,194 A | 2/1955 | Alden |
| 3,097,862 A * | 7/1963 | Dye .................. B60G 5/04 280/789 |
| 3,174,771 A | 3/1965 | Miller |
| 3,363,913 A | 1/1968 | McFarland |
| 3,369,824 A | 2/1968 | Bunch |
| 3,387,857 A | 6/1968 | Elmer |
| 3,522,941 A | 8/1970 | Henry-Biabaud |
| 3,572,745 A | 3/1971 | Willetts |
| 3,687,478 A | 8/1972 | Willetts |
| 3,740,069 A | 6/1973 | Fister et al. |
| 3,752,498 A | 8/1973 | Shea et al. |
| 3,761,110 A | 9/1973 | Grosseau |
| 3,945,664 A | 3/1976 | Hiruma |
| 4,199,166 A | 4/1980 | Bohmer |
| 4,379,571 A | 4/1983 | Simmons |
| 4,397,473 A * | 8/1983 | Miles .................. B60G 5/04 280/124.16 |
| 4,460,196 A * | 7/1984 | Perlini .................. B60G 5/06 280/676 |
| 4,595,069 A | 6/1986 | Oswald |
| 4,623,162 A | 11/1986 | Weitzenhof et al. |
| 5,839,741 A | 11/1998 | Heyring |
| 7,219,779 B2 | 5/2007 | Bauer et al. |
| 7,296,642 B1 * | 11/2007 | DeWald .................. B60G 5/00 180/6.38 |
| 8,317,208 B2 | 11/2012 | Bird |
| 8,851,500 B2 | 10/2014 | Dobbelaar et al. |
| 10,343,481 B2 | 7/2019 | Fredriksson |
| 10,801,583 B2 | 10/2020 | Sardes et al. |
| 11,364,764 B2 * | 6/2022 | Dekel .................. B60G 7/04 |
| 11,376,956 B2 * | 7/2022 | Fliearman ............ B60G 13/04 |
| 2003/0105563 A1 | 6/2003 | Oshima |
| 2003/0184056 A1 | 10/2003 | Bowers |
| 2004/0113377 A1 | 6/2004 | Klees |
| 2005/0074296 A1 | 4/2005 | McCarty et al. |
| 2006/0048978 A1 | 3/2006 | Nagaya |
| 2006/0054439 A1 | 3/2006 | Honma |
| 2006/0234567 A1 | 10/2006 | Longdill |
| 2008/0230289 A1 | 9/2008 | Schoon et al. |
| 2009/0029821 A1 | 1/2009 | Martin, III |
| 2018/0072120 A1 | 3/2018 | Hunter et al. |
| 2018/0079276 A1 | 3/2018 | Baumgartner |
| 2019/0168558 A1 | 6/2019 | Dolan et al. |
| 2019/0193620 A1 | 6/2019 | Matsuoka |
| 2022/0055438 A1 * | 2/2022 | Dekel .................. B60G 5/04 |

FOREIGN PATENT DOCUMENTS

| | | |
|---|---|---|
| DE | 10 2016 014004 | 5/2017 |
| DE | 102016001594 | 7/2017 |
| EP | 0082547 | 6/1983 |
| EP | 0444981 | 9/1991 |
| EP | 1985474 | 4/2018 |
| EP | 1167093 | 1/2023 |
| ER | 0931684 | 7/1999 |
| FR | 2636570 | 3/1990 |
| FR | 2698825 | 6/1994 |
| GB | 1105508 | 3/1968 |
| GB | 1374548 | 11/1974 |
| GB | 1393187 | 5/1975 |
| GB | 2 247 063 | 2/1992 |
| IT | UB20 161 155 | 8/2017 |
| JP | 58-110307 | 6/1983 |
| JP | H0649445 Y2 | 4/1990 |
| JP | U 2-59005 | 4/1990 |
| JP | 2011520701 | 7/2011 |
| KR | 100783877 | 12/2007 |
| KR | 1020100059391 | 6/2010 |
| WO | WO 1995006570 | 3/1995 |
| WO | WO 2007/036234 | 4/2007 |
| WO | WO 2021070186 | 4/2021 |

OTHER PUBLICATIONS

International Search for PCT Appl. No. PCT/IL2022/050892 dated Jan. 5, 2023.
Office Action for U.S. Appl. No. 17/981,834 dated Mar. 29, 2023.
Notice of Allowance for Korean Patent Application No. 10-2021-7009765 dated Mar. 31, 2023.

* cited by examiner

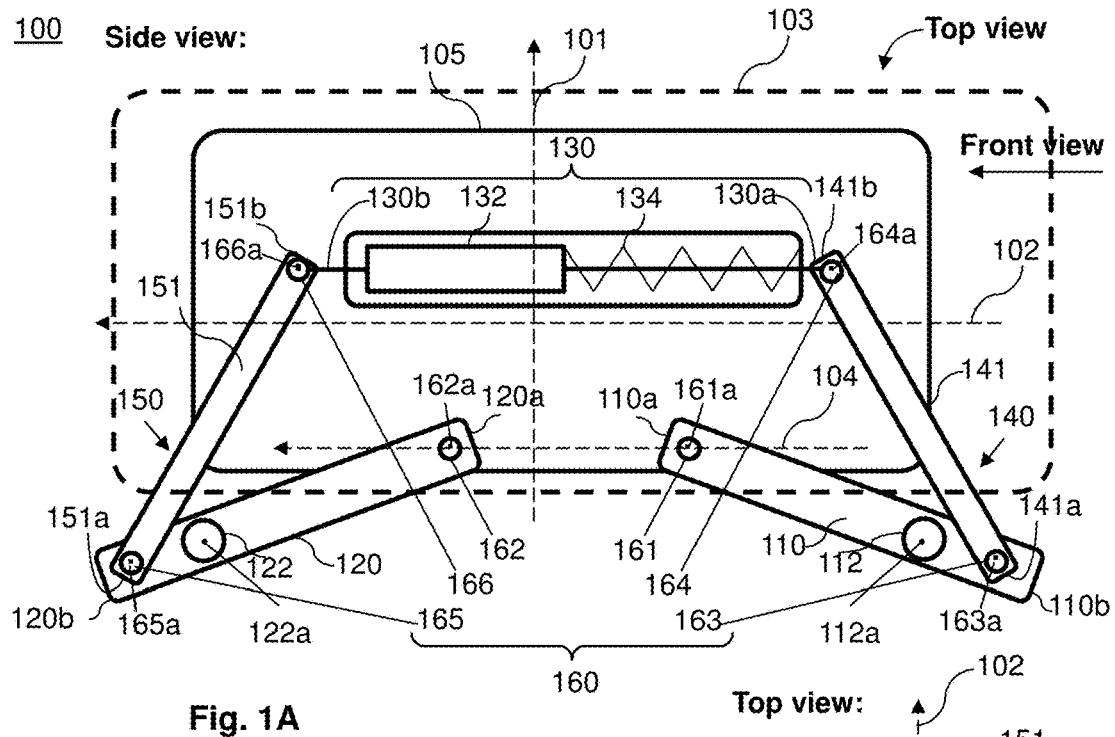
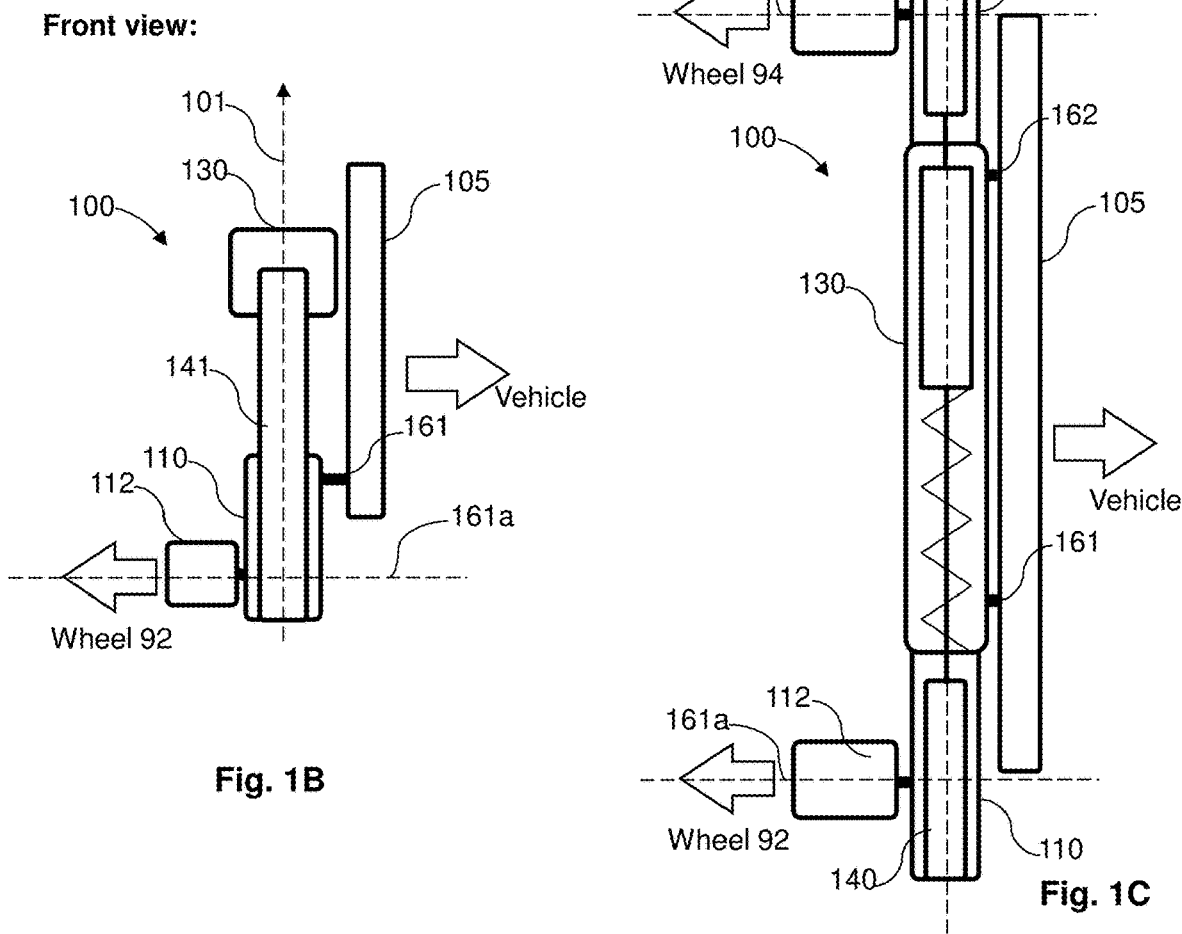

400
Side view:

400
Side view:

400
Side view:

400
Top view:

400
Side view:

400
Top view:

400
Side view:

400
Top view:

DUAL-AXLE VEHICLE CORNER ASSEMBLY

CROSS-REFERENCE TO RELATED APPLICATIONS

This application is a continuation of PCT International Application No. PCT/IL2022/050425, International Filing Date Apr. 26, 2022, claiming the benefit of U.S. Provisional Patent Application No. 63/179,815, filed Apr. 26, 2021, both of which are hereby incorporated by reference.

FIELD OF THE INVENTION

The present invention relates to the field of vehicle corner assemblies, and more particularly, to dual-axle vehicle corner assemblies.

BACKGROUND OF THE INVENTION

Some vehicles, such as trucks, may have two or more dual-axle wheel assemblies. For example, tandem axles vehicles may have double-axle wheel assemblies in a rear portion of a vehicle. Typically, tandem axles are used in wheel assemblies having wheels with relatively small diameter and/or in vehicles having relatively low chassis height. Current dual-axle wheel assemblies are typically bulky (e.g. occupy significant vertical space below a chassis of a vehicle) and/or provide shared suspension for the dual-axle wheel assemblies on opposite lateral sides of the vehicle. Optionally, some or all of the double-axle wheel assemblies in the vehicle may be driven axles. Current driven dual-axle wheel assemblies typically require complex and bulky transmission units. Typically, current dual-axle wheels assemblies are not steerable.

SUMMARY OF THE INVENTION

Some embodiments of the present invention may provide a dual-axle vehicle corner assembly including: a sub-frame; a first arm connected to the sub-frame and rotatable with respect to the sub-frame about a first arm axis, the first arm having a first axle axis about which a first wheel rotates when connected to the first arm; a second arm connected to the sub-frame and rotatable with respect to the sub-frame about a second arm axis, the second arm having a second axle axis about which a second wheel rotates when connected to the second arm; and a suspension system including a piston assembly interconnecting the first arm and the second arm, the piston assembly is to controllably increase and decrease a length of the piston assembly to control a distance between the first axle axis and the second axle axis.

In some embodiments, the piston assembly is to controllably increase and decrease the length of the piston assembly to control a height of the sub-frame relative to a ground surface when the assembly is assembled to a vehicle platform.

In some embodiments, the piston assembly controls a relative motion of the first arm and the second arm with respect to each other.

In some embodiments, the piston assembly controls a relative motion of the first arm and the second arm with respect to the sub-frame.

In some embodiments, the first arm axis, the first axle axis, the second arm axis and the second axle axis are substantially parallel to each other.

In some embodiments, the piston assembly is perpendicular to the first axle axis and the second axle axis.

In some embodiments, the first arm axis coincides with the second arm axis.

In some embodiments, the piston assembly, the first arm and the second arm are positioned at the same side of the sub-frame.

In some embodiments, (i) the piston assembly and (ii) the first arm and the second arm are positioned at opposing sides of the sub-frame with respect to each other.

In some embodiments, the assembly includes a motion restrainer connected between the first arm and the sub-frame.

In some embodiments, the assembly includes a motion restrainer connected between the second arm and the sub-frame.

In some embodiments, the piston assembly and the motion restrainer are positioned at the same side of the sub-frame.

In some embodiments, the piston assembly and the motion restrainer are positioned at opposite sides of the sub-frame with respect to each other.

In some embodiments, the piston assembly including: a housing; a first piston having a first piston head and a second piston having a second piston head, the first piston head and the second piston head being positioned within the housing and forming within the housing a first fluid chamber, a second fluid chamber and a third fluid chamber; and a spring positioned within the housing between the first piston head and the second piston head.

In some embodiments, the first piston is connected to the first arm and the second piston is connected to the second arm.

In some embodiments, the suspension system including: a fluid pump to alternately introduce fluid to and expel fluid from at least one of the first fluid chamber, the second fluid chamber or the third fluid chamber; and a controller to operate the fluid pump.

In some embodiments, the controller to operate the fluid pump to control a spring rate of the spring.

In some embodiments, the controller to operate the fluid pump to control the length of the piston assembly and the distance between the first axle axis and the second axle axis.

In some embodiments, the piston assembly including: a housing connected to the first arm;
a first spring-loaded member and a second spring-loaded member positioned within the housing, the first spring-loaded member and the second spring-loaded member being parallel to each other and being connected to the second arm.

In some embodiments, springs of the first spring-loaded member and the second spring-loaded member are pre-loaded to set the distance between the first axle axis and the second axle axis.

In some embodiments, each of the first spring-loaded member and the second spring-loaded member including a shock absorber.

In some embodiments, the suspension system including: a liquid pump to alternately introduce liquid to and expel liquid from the housing; and a controller to operate the liquid pump.

In some embodiments, the controller to operate the liquid pump to control the length of the piston assembly and the distance between the first axle axis and the second axle axis.

In some embodiments, the piston assembly including: a housing including: a first chamber, and a second chamber; a first piston positioned within the first chamber and connected to the first arm; and a second piston positioned within the second chamber and connected to the second arm.

In some embodiments, the first piston is a spring-loaded piston.

In some embodiments, the suspension system including an accumulator in fluid communication with the first chamber of the housing, the accumulator including a pressurized gas.

In some embodiments, the suspension system including two or more accumulators in fluid communication with the first chamber of the housing, each of the accumulators including a gas pressurized to a different pressure value than a gas in other accumulators.

In some embodiments, the suspension system including: a liquid pump to alternately introduce liquid to and expel liquid from the second chamber of the housing; and a controller to operate the liquid pump.

In some embodiments, the controller to operate the liquid pump to control the length of the piston assembly and the distance between the first axle axis and the second axle axis.

In some embodiments, the suspension system including a damper interconnecting the housing and the first arm.

In some embodiments, the suspension system including a damper interconnecting the housing and the second arm.

In some embodiments, the piston assembly including: a housing including a housing cavity, the housing being connected to the first arm; a first piston positioned within the housing cavity, the first piston including a first piston cavity; and a second piston positioned within the first piston cavity, the second piston being connected to the second arm.

In some embodiments, the suspension system including an accumulator in fluid communication with the housing cavity, the accumulator including a pressurized gas.

In some embodiments, the suspension system including two or more accumulators in fluid communication with the housing cavity, each of the accumulators including a gas pressurized to a different pressure value than a gas in other accumulators.

In some embodiments, the suspension system including: a liquid pump to alternately introduce liquid to and expel liquid from the first piston cavity; and a controller to operate the liquid pump.

In some embodiments, the second piston including a hollow channel in fluid communication with the first piston cavity to introduce liquid and expel liquid from the first piston cavity.

In some embodiments, the controller to operate the liquid pump to control the length of the piston assembly and the distance between the first axle axis and the second axle axis.

In some embodiments, the suspension system including a damper interconnecting the sub-frame and the first arm.

In some embodiments, the suspension system including a damper interconnecting the sub-frame and the second arm.

In some embodiments, the assembly including: a first connector connected to the first arm and rotatable about the first axle axis, the first connector to connect to the first wheel; and a second connector connected to the second arm and rotatable about the second axle axis, the second connector to connect to the second wheel.

In some embodiments, at least one of: (i) the first connector is steerable relative to the first arm about a first steering axis or (ii) the second connector is steerable relative to the second arm about a second steering axis.

In some embodiments, the first arm and the second arm are steerable about a steering axis relative to the sub-frame, the steering axis being positioned between the first axle axis and the second axle axis.

In some embodiments, the assembly including a drivetrain motor connected to the sub-frame, the drivetrain motor is to rotate at least one of the first connector or the second connector about the first axle axis and the second axle axis, respectively.

In some embodiments, the first arm axis coincides with the second arm axis; and the assembly including: a drivetrain shaft positioned along the first arm axis, the drivetrain shaft is connected to the drivetrain motor; and a transmission to transmit rotations of the drivetrain shaft to the first connector.

In some embodiments, the assembly including a transmission to transmit rotations of the drivetrain shaft to the second connector.

In some embodiments, the transmission is positioned within the respective arm.

In some embodiments, the assembly including a first linkage to connect the suspension system to the first arm and a second linkage to connect the suspension system to the second arm.

In some embodiments, each of the first linkage and a second linkage includes a rocker link.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIGS. 1A, 1B and 1C are schematic illustrations of a suspension system for a dual-axle wheels assembly, according to some embodiments of the invention;

Figure 1D:
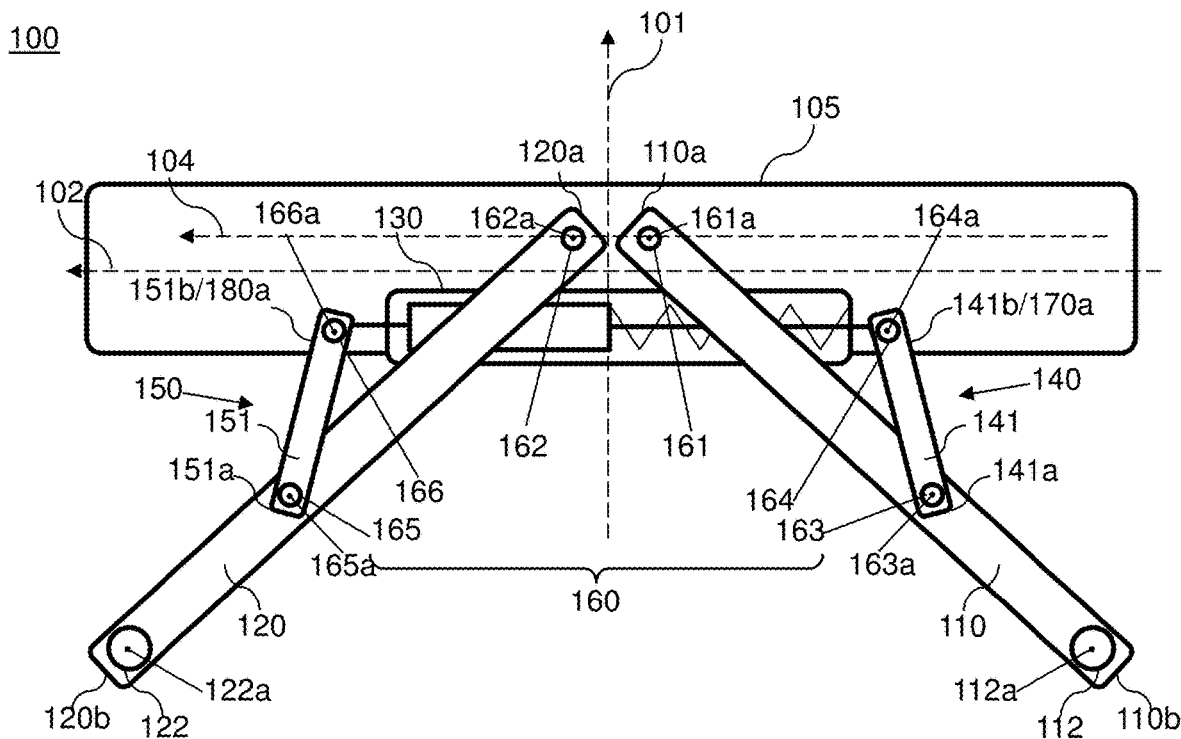
FIG. 1D is a schematic illustration of the suspension system for a dual-axle wheels assembly, wherein wheel connectors of the suspension system are disposed at distal ends of arms of the suspension system, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

The following illustrations/description depict embodiments of a suspension system for a dual-axle wheels assembly (e.g. described below with respect to FIGS. 1A-1K and 2A-2F) and embodiments of a dual-axle vehicle corner assembly (e.g. described below with respect to FIGS. 4A-4F, 5A-5H, 6A-6B, 7A-7F, 8A-8C, 9A-9D, 10A-10D, 11A-11G and 12A-12D). Each of these embodiments may of course include features from other embodiments presented, and embodiments not specifically described may include various features described herein.

Reference is now made to FIGS. 1A, 1B and 1C, which are schematic illustrations of a suspension system 100 for a dual-axle wheels assembly, according to some embodiments of the invention.

Reference is also made to FIG. 1D, which is a schematic illustration of suspension system 100 for the dual-axle wheels assembly, wherein wheel connectors 112, 122 are disposed at distal ends of arms 110, 120 of suspension system 100, according to some embodiments of the invention.

FIGS. 1A and 1D show a schematic illustration of a side view of suspension system 100. FIG. 1B shows a front view (e.g. as defined in FIG. 1A) of suspension system 100. FIG. 1C shows a top view (e.g. as defined in FIG. 1A) of suspension system 100. The side, front and top views as schematically shown in FIGS. 1A, 1B, 1C and 1D are indicated with respect to directions of a vehicle assembled with suspension system 100.

According to some embodiments, suspension system 100 includes a sub-frame 105, a first arm 110, a first connector 112, a second arm 120, a second connector 122, a motion restrainer 130, a first linkage 140, a second linkage 150 and multiple pivoting connections 160.

Sub-frame 105 may be a structural element that may connect at least a portion of suspension system 100 to a reference frame (e.g. chassis) of the vehicle. Sub-frame 105 may have a vertical axis 101, a longitudinal axis 102 and a vertical reference plane 103. Vertical axis 101 may be parallel (or substantially parallel) to any vertical axis of the reference frame of the vehicle when suspension system 100 is assembled therein. Longitudinal axis 102 may be perpendicular to vertical axis 101. Longitudinal axis 102 of suspension system 100 may be parallel (or substantially parallel) to any longitudinal axis of the reference frame of the vehicle when suspension system 100 is assembled therein. Vertical reference plane 103 may be parallel (or substantially parallel) to any vertical plane of the reference frame of the vehicle when suspension system 100 is assembled therein. In some embodiments, sub-frame 105 is part of the reference frame of the vehicle. The reference frame may be, for example, a chassis of the vehicle.

First arm 110 is connected to sub-frame 105 and is rotatable with respect to sub-frame 105 about a first axis 161a. For example, first arm 110 may be rotatably connected at its first end 110a to sub-frame 105 using a first pivoting connection 161.

First connector 112 is connected to first arm 110 and has a first connector axis 112a about which a first wheel 92 of the dual-axle wheels assembly may rotate when connected to first connector 112. First connector axis 112a may be parallel, or substantially parallel, to first axis 161a. First connector 112 may, for example, be or may include a wheel knuckle, a wheel upright, a wheel hub, a wheel bearing, etc.

Second arm 120 is connected to sub-frame 105 and is rotatable with respect to sub-frame 105 about a second axis 162a. For example, second arm 120 may be rotatably connected at its first end 120a to sub-frame 105 using a second pivoting connection 162. Second axis 162a may be parallel, or substantially parallel, to first axis 161a.

Second connector 122 is connected to second arm 120 and has a second connector axis 120a about which a second wheel 94 of dual-axle wheels assembly 90 may rotate when connected to second connector 122. Second connector axis 122a may be parallel, or substantially parallel, to second axis 162a. Second connector 122 may, for example, be or may include a wheel knuckle, a wheel upright, a wheel hub, a wheel bearing, etc.

Motion restrainer 130 may interconnect first arm 110 and second arm 120. In some embodiments, motion restrainer 130 is not coupled to sub-frame 105 (e.g. as shown in FIGS. 1A, 1B, 1C and 1D). Motion restrainer 130 may restrain a displacement and/or a relative velocity of at least one of first arm 110 and second arm 120. Motion restrainer 130 may transfer a load applied on first arm 110 to second arm 120 and may transfer a load applied on second arm 120 to first arm 110. Motion restrainer 130 may, for example, push each of first wheel 92 and second wheel 94 connected to first connector 112 and second connector 122, respectively, to a road surface by applying forces on first arm 110 and second arm 120. In this manner, the traction of first wheel 92 and second wheel 94 of dual-axle wheels assembly 90 with the road surface may be maintained when, for example, one of first wheel 92 and second wheel 94 is lowered with respect to the other and drops away of sub-frame 105 or the reference frame (e.g. due to a bump or a hole on the road surface).

In some embodiments, motion restrainer 130 is a linear restrainer. For example, motion restrainer 130 may include a linear (e.g. telescopic) shock absorber 132 loaded with a spring 134 (e.g. as shown in FIGS. 1A, 1C, 1D and 1E). In some embodiments, motion restrainer 130 includes a damper. In some embodiments, motion restrainer 130 includes a spring-damper. In some embodiments, motion restrainer 130 includes an inerter. In some embodiments, motion restrainer 130 is a rotational restrainer and includes a rotational shock absorber and a rotational spring. For example, the rotational spring may be a torque-based spring. In some embodiments, the rotational motion restrainer includes a rotational damper. In some embodiments, the rotational motion restrainer includes a rotational inerter.

In some embodiments, motion restrainer 130 is connected to first arm 110 using first linkage 140 and to second arm 120 using second linkage 150.

In some embodiments, first linkage 140 includes a firm link 141, and second linkage 150 includes a second link 151 (e.g. as shown in FIGS. 1A, 1B, 1C, 1D and 1E). In some embodiments, first link 141 is rotatably connected to first arm 110 and rotatably connected to motion restrainer 130. For example, first link 141 may be rotatably connected at its first end 141a to second end of 110b of first arm 110 using a third pivoting connection 163 and rotatably connected at its second end 141b to first end 130a of motion restrainer 130 using a fourth pivoting connection 164. First link 141 and first arm 110 may rotate with respect to each other about a third axis 163a that may be parallel (or substantially parallel) to first axis 161a. First link 141 and motion restrainer 130 may rotate with respect to each other about a fourth axis 164a that may be parallel (or substantially parallel) to first axis 161a.

In some embodiments, second link 151 is rotatably connected to second arm 120 and rotatably connected to motion restrainer 130. For example, second link 151 may be rotatably connected at its first end 151a to second end 120b of second arm 120 using a fifth pivoting connection 165 and rotatably connected at its second end 151b to second end 130b of motion restrainer 130 using a sixth pivoting connection 166. Second link 151 and second arm 120 may be rotatable with respect to each other about a fifth axis 165a that may be parallel (or substantially parallel) to second axis 162a. Second link 151 and motion restrainer 130 may be rotatable with respect to each other about a sixth axis 166a that may be parallel (or substantially parallel) to second axis 162a.

In some embodiments, first linkage 140 and second linkage 150 are not coupled to sub-frame 105 (e.g. as shown in FIGS. 1A, 1B, 1C, 1D and 1E). In some embodiments, first link 141 and second link 151 are not coupled to sub-frame 105.

The position of first connector 112 along first arm 110 and/or the position of second connector 122 along second arm 120 may be preset according to an application of suspension system 100 and/or according to an application of the vehicle to be assembled with suspension system 100.

For example, as shown in FIG. 1A, first connector 112 may be between first axis 161a/first pivoting connection 161 and third axis 163a/third pivoting connection 163, closer to third axis 163a/third pivoting connection 163 than to first axis 161a/first pivoting connection 161. Second connector 122 may be between second axis 162a/second pivoting connection 162 and fifth axis 165a/fifth pivoting connection 165, closer to fifth axis 165a/fifth pivoting connection 165 than to second axis 162a/second pivoting connection 162.

In another example, e.g. as shown in FIG. 1D, first connector 112 may be adjacent to second end 110b of first arm 110 and third axis 163a/third pivoting connection 163 may be between first axis 161a/first pivoting connection 161 and first connector 112. Second connector 112 may be adjacent to second end 120b of second arm 120 and fifth axis 165a/fifth pivoting connection 165 may be between second axis 162a/second pivoting connection 162 and second connector 122.

The position of first axis 161a/first pivoting connection 161 and second axis 162a/second pivoting connection 162 may be preset according to an application of suspension system 100 and/or according to an application of the vehicle to be assembled with suspension system 100.

In some embodiments, first axis 161a/first pivoting connection 161 and second axis 162a/second pivoting connection 162 are positioned along a longitudinal axis 104 that is parallel, or substantially parallel, to longitudinal axis 102 of sub-frame 105 (e.g. as shown in FIG. 1A). Longitudinal axis 102 of sub-frame 105 may be perpendicular, or substantially perpendicular, to first axis 161a and to second axis 162a. First axis 161a/first pivoting connection 161 and second axis 162a/second pivoting connection 162 may be at a preset distance with respect to each other along longitudinal axis 104 (e.g. as shown in FIG. 1A).

Figure 1E:
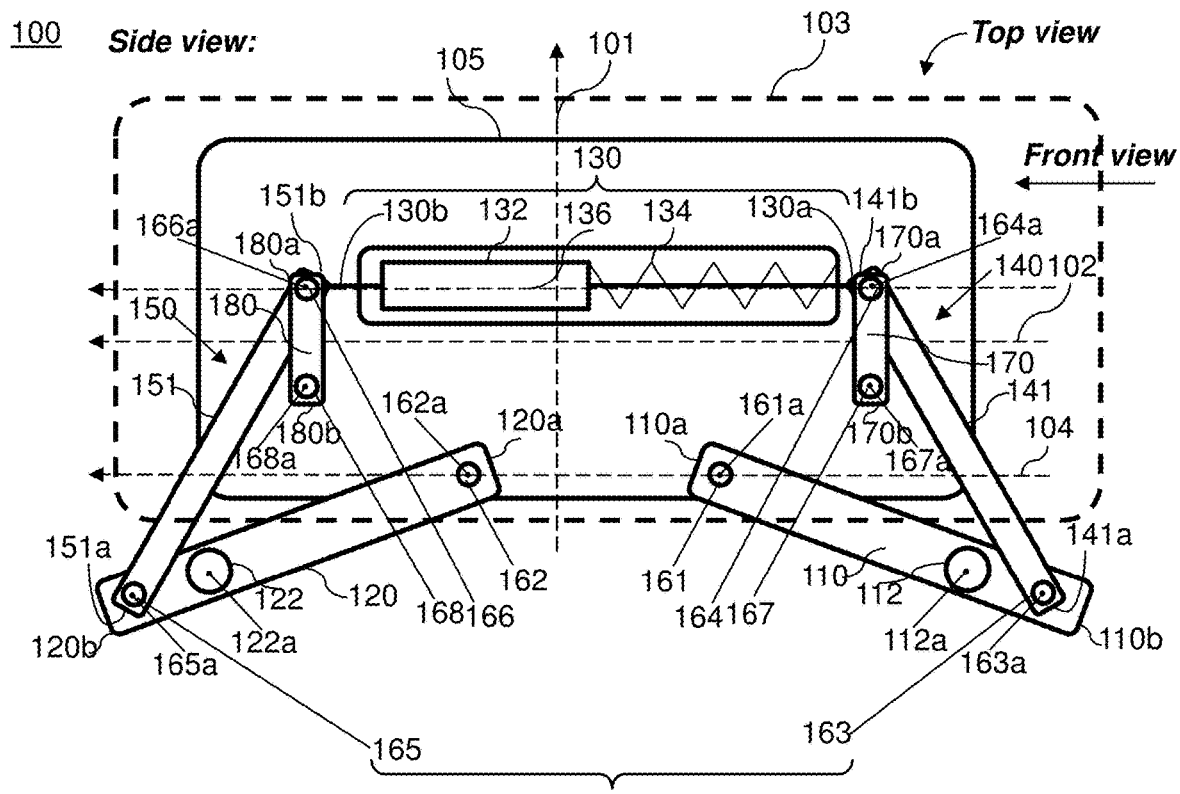
FIG. 1E is a schematic illustration of the suspension system for a dual-axle wheels assembly, wherein a motion restrainer of the suspension system is coupled to a sub-frame of the suspension system, according to some embodiments of the invention.
Figure 1F:
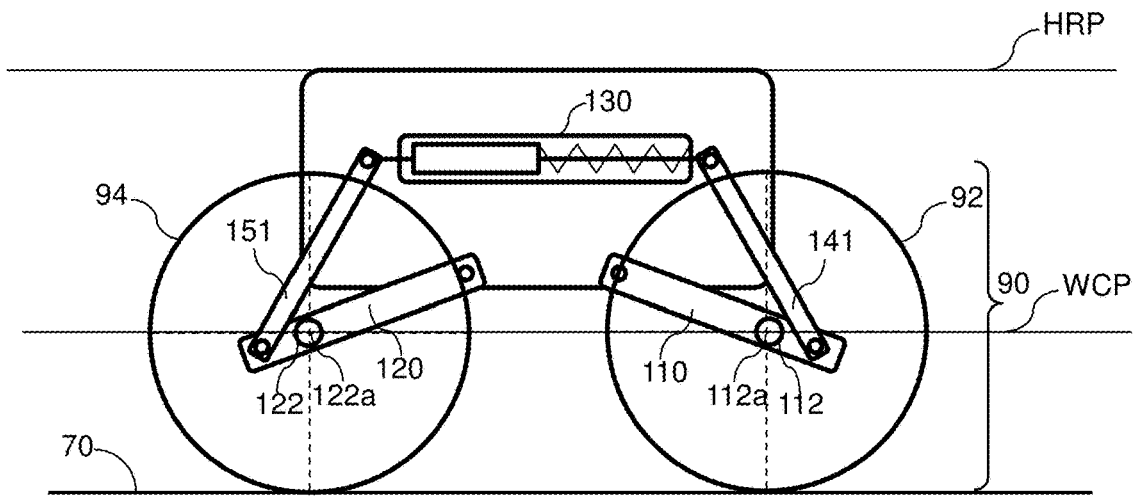
FIGS. 1F, 1G and 1H are schematic illustrations of a suspension system and of two wheels of the dual-axle wheels assembly assembled to the suspension system, at various positions on a road, according to some embodiments of the invention.
Figure 1G:
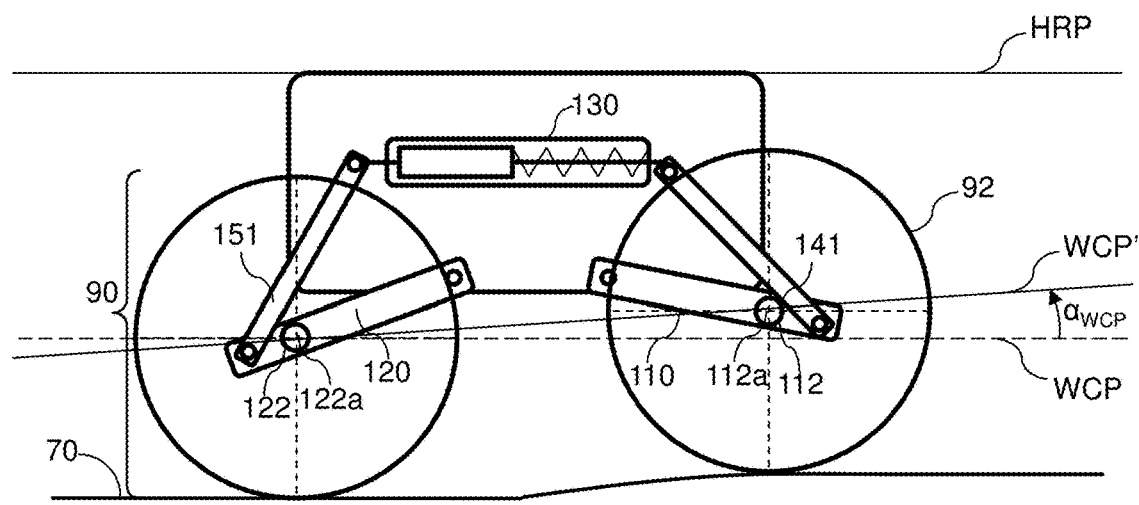
Figure 1H:
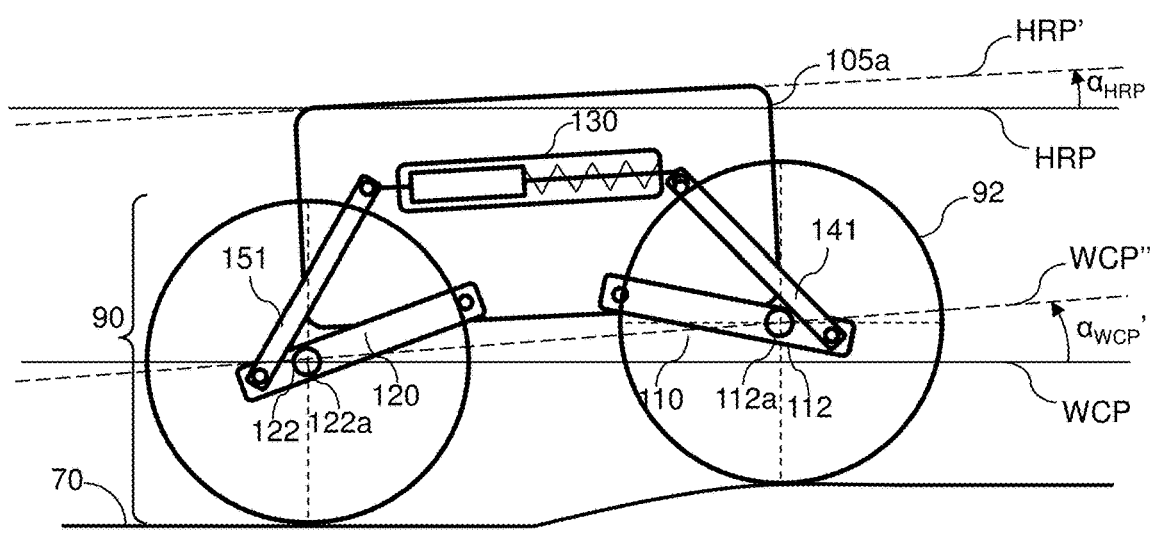
Figures 1I, 1J:
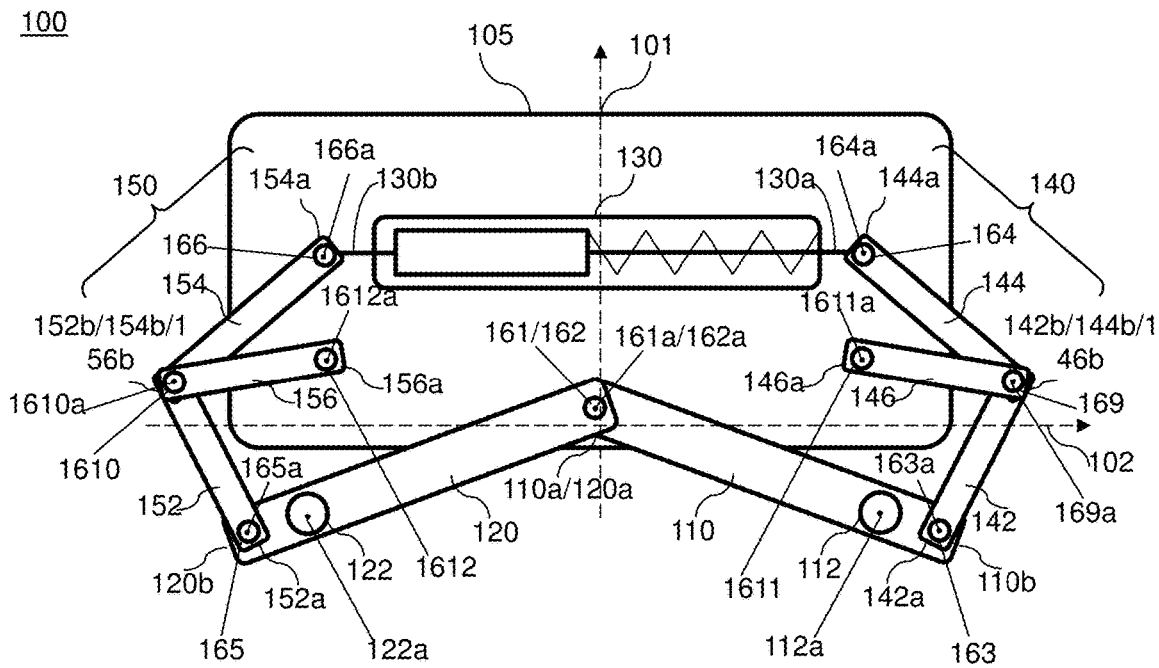
FIG. 1I is a schematic illustration of the suspension system for a dual-axle wheels assembly, wherein linkages of the suspension system include two or more links, according to some embodiments of the invention.
FIG. 1J is a schematic illustration of the suspension system for a dual-axle wheels assembly, wherein linkages of the suspension system include rocker links, according to some embodiments of the invention.

In some embodiments, first axis 161a coincides with second axis 162a (e.g. as shown in FIG. 1I). For example, first ends 110a, 120a of first arm 110 and second arm 120, respectively, may be rotatably connected to sub-frame 105 using the same pivoting connection (e.g. such as first pivoting connection 161 or second pivoting connection 162, e.g. as shown in FIGS. 1I and 1J).

In various embodiments, the size of one or more of first arm 110 and second arm 120 and/or the size of one or more of first linkage 140 and second linkage 150 is adjustable. The adjustment may be performed prior to assembling suspension system 100 to the vehicle, during the lifetime of suspension system 100, and optionally during the vehicle driving. For example, the adjustment may be based on the type and/or the size and/or the weight constrains of the vehicle. In another example, the adjustment may be based on the size of the wheels of the dual-axle wheels assembly of the vehicle. In another example, the adjustment may be based on a location of suspension system 100 with respect to the reference frame of the vehicle.

Pivoting connections 160 may include any connection that may allow pivoting around at least one axis. For example, pivoting connections 160 may include bearings, bushings, hinges, joints and the like. Pivoting connections 160 may cause rotation of components of suspension system 100 about axes that are parallel, or substantially parallel to first axis 161a and to second axis 162a. Such components may include at least one of first arm 110, second arm 120, motion restrainer 130, components of first linkage 140 and components of second linkage 150.

Pivoting connections 160 may cause rotation of components of suspension system 100 in one or more planes that are parallel (or substantially parallel) to vertical reference plane 103 of sub-frame 105. Vertical reference plane 103 may be perpendicular, or substantially perpendicular, to first axis 161a and to second axis 162a. Vertical reference plane 103 may be parallel, or substantially parallel, to planes in which first wheel 92 and second wheel 94 of dual-axle wheels assembly 90 rotate when connected to first connector 112 and second connector 122, respectively.

The size of first arm 110, second arm 120, components of first linkage 140 and components of second linkage 150, pivoting connections 160 and positions of pivoting connections 160 may be set to cause a linear, or substantially linear, displacement of first connector 112 and of second connector 122 along axes that are parallel, or substantially parallel, to vertical axis 101 of sub-frame 105 (e.g. axes that are perpendicular, or substantially perpendicular, to first axis 161a and second axis 162). For example, the size of first arm 110, second arm 120, components of first linkage 140 and components of second linkage 150, pivoting connections 160 and positions of pivoting connections 160 may be set to cause rotation of first arm 110 and second arm 120 within a range of −30° to 30° with respect to longitudinal axis 104.

In some embodiments, motion restrainer 130 is not coupled to sub-frame 105, and first linkage 140 and second linkage 150 are not coupled to sub-frame 105 (e.g. as shown in FIGS. 1A, 1B, 1C and 1D) so as motion restrainer 130 is free to move with respect to sub-frame 105. In this manner, when a force applied by one connector of first connector 112 and second connector 122 to motion restrainer 130 (e.g. through respective first linkage 140 or second linkage 150, respectively), motion restrainer 130 increases a force it applies to another connector of first connector 112 and second connector 122 (e.g. through the respective linkage), thus increasing a traction of the wheels of the dual-axle wheels assembly with the road.

Reference is also made to FIG. 1E, which is a schematic illustration of suspension system 100 for the dual-axle wheels assembly, wherein a motion restrainer 130 of suspension system 100 is coupled to sub-frame 105 of suspension system 100, according to some embodiments of the invention.

In some embodiments, motion restrainer 130 is parallel, or substantially parallel, to longitudinal axis 102 of sub-frame 105. In some embodiments, motion restrainer 130 is coupled to sub-frame 105. In some embodiments, motion restrainer 130 is coupled to sub-frame 105 so as to maintain, or substantially maintain, its orientation with respect to sub-frame 105 when motion restrainer 130 moves with respect to sub-frame 105. In some embodiments, motion restrainer 130 is coupled to sub-frame 105 so as to cause motion restrainer 130 to move in a direction that is substantially parallel to longitudinal axis 102 of sub-frame 105. In some embodiments, motion restrainer 130 is slidable with respect to sub-frame 105. In some embodiments, motion restrainer 130 is coupled to sub-frame 105 so as to significantly reduce displacement of motion restrainer 130 along vertical axis 101 of sub-frame 105 as compared to embodiments in which motion restrainer 130 is coupled to sub-frame 105.

For example, motion restrainer 130 may be connected to sub-frame 105 using a first motion restrainer link 170 and a second motion restrainer link 180. First motion restrainer link 170 may be rotatably connected to motion restrainer 130 and rotatably connected to sub-frame 105. For example, first motion restrainer link 170 may be rotatably connected at its first end 170a to first end 130a of motion restrainer 130 using, for example, fourth pivoting connection 164 and may be rotatably connected at its second end 170b to sub-frame 105 using, for example, a seventh pivoting connection 167. First motion restrainer link 170 may rotate with respect to motion restrainer 130 about, for example, fourth axis 164a and may rotate with respect to sub-frame 105 about, for example, a seventh axis 167a that is parallel, or substantially parallel, to first axis 161a.

Second motion restrainer link 180 may be rotatably connected to motion restrainer 130 and rotatably connected to sub-frame 105. For example, second motion restrainer linkage 180 may be rotatably connected at its first end 180a to second end 130b of motion restrainer 130 using, for example, sixth pivoting connection 166 and may be rotatably connected at its second end 180b to sub-frame 105 using, for example, an eighth pivoting connection 168. Second motion restrainer link 180 may rotate with respect to motion restrainer 130 about, for example, sixth axis 166a and may rotate with respect to sub-frame 105 about, for example, an eighth axis 168a that is parallel, or substantially parallel, to second axis 162a.

The size of first motion restrainer link 170 and of second motion restrainer link 180 and the positions of seventh pivoting connection 167/seventh axis 167a and of eighth pivoting connection 168/eighth axis 168a may be set to cause movement of motion restrainer 130 substantially along an axis that is parallel to longitudinal axis 102 of sub-frame 105 while maintaining motion restrainer 130 substantially parallel to longitudinal axis 102. For example, the size of first motion restrainer link 170 and of second motion restrainer link 180 and the positions of seventh pivoting connection 167/seventh axis 167a and of eighth pivoting connection 168/eighth axis 168a may be set to cause inclination of motion restrainer 130 within a range of −30° and 30° with respect to a longitudinal motion restrainer axis 136.

In embodiments in which motion restrainer 130 is coupled to sub-frame 105, two-sided integrated spring and damper motion restrainer may, for example, provide an additional degree of freedom.

Reference is now made to FIGS. 1F, 1G and 1H, which are schematic illustrations of suspension system 100 and two wheels 92, 94 of dual-axle wheels assembly 90 assembled therein, at various positions on the road 70, according to some embodiments of the invention.

FIG. 1F, 1G and 1H show side view of suspension system 100 and dual-axle wheels assembly 90 including a first wheel 92 and a second wheel 94 (e.g. side view as defined in FIG. 1A).

FIG. 1F shows an example in which wheel connectors plane extends through axes 112a, 122a of first connector 112 and of second connector 122, respectively, (e.g. indicated in FIG. 1F as "WCP") and a horizontal reference plane of sub-frame 105 (e.g. indicated in FIG. 1F as "HRP") are parallel (or substantially parallel) to road 70.

FIG. 1G shows an example, in which first connector 112 has displaced in a direction substantially perpendicular to road 70 (e.g. due to a bump on road 70) thus inclining the connectors plane at an angle $\alpha_{WCP}$ with respect to an orientation of the connectors plane shown in FIG. 1A (e.g. "WCP'"). The inclined connectors plane is indicated in FIG. 1G as WCP' and both WCP and WCP' are shown in FIG. 1G for sake of clarity. In example shown in FIG. 1G, the horizontal reference plane of sub-frame 105 (e.g. HRP) remains unchanged.

Suspension system 100 may restrain the displacement of sub-frame 105 in the direction substantially perpendicular to road 70 independent of the displacement of the connectors 110, 120 in the direction thereof (e.g. as shown in FIG. 1G).

For example, suspension system 100 may restrain the displacement of sub-frame 105 when a vertical load (e.g. in a direction substantially perpendicular to road 70) applied on connectors 112, 122 is larger than a maximal load applied on motion restrainer 130 by connectors 112, 122 (e.g. through respective arms and linkages) during the displacement of one or more of connectors 112, 122. For example, the load applied on motion restrainer 130 may be 0.5-3 times the load applied on connectors 112, 122.

FIG. 1H illustrates an example in which first connector 112 and a first end 105a of sub-frame 105 have displaced in the direction substantially perpendicular to road 70 inclining the connectors plane at an angle $\alpha_{WCP}$' with respect to the orientation of the connectors plane shown in FIG. 1A and inclining the horizontal reference plane of sub-frame 105 by an angle $\alpha_{HRP}$ with respect to the orientation of the horizontal reference plane of sub-frame 105 shown in FIG. 1A. The inclined connectors plane and the inclined horizontal reference plane are indicated in FIG. 1H as WCP" and HRP', respectively, and both WCP" and WCP and HRP' and HRP are shown in FIG. 1H for sake of clarity.

Suspension system 100 may limit a measure of inclination of sub-frame 105 in response to the displacement of connector(s) 110, 120 in the direction substantially perpendicular to road 70 such that the inclination angle $\alpha_{HRP}$ of the horizontal reference plane of sub-frame 105 may be smaller than the inclination angle $\alpha_{ECP}$' of the wheels connectors axis (e.g. as shown in FIG. 1H). For example, suspension system 100 limit the inclination of sub-frame 105 in response to the displacement of connector(s) 110, 120 in the direction substantially perpendicular to road 70 such that $\alpha_{HRP}$ is at least 50% (e.g. at least 70% or 90%) smaller than $\alpha_{WCP}$40.

Suspension system 100 may reduce the inclination angle $\alpha_{HRP}$ of the horizontal reference plane of sub-frame 105 (e.g. due to the displacement of connector(s) 110, 120 in the direction substantially perpendicular to road 70) to null (or substantially to null) in less than 1 minute (e.g. in less than 45 seconds or 20 seconds).

For example, the locations of at least some of pivoting connections 160 and/or the distance between at least some of pivoting connections 160 may be predetermined to reduce the maximal inclination angle $\alpha_{HRP}$ and/or the time of damping the displacement. In another example, a restraining profile of motion restrainer 130 (e.g. shock absorbing parameters, etc.) may be preset to reduce the maximal inclination angle $\alpha_{HRP}$ and/or the time of damping the displacement.

Reference is now made to FIG. 1I, which is a schematic illustration of suspension system 100 for the dual-axle wheels assembly, wherein linkages 140, 150 of suspension system 100 include two or more linkage links, according to some embodiments of the invention.

In some embodiments, first linkage 140 includes two or more first-linkage links and second linkage 150 includes two or more second-linkage links. For example, first linkage 140 may include a first first-linkage link 142 and a second first-linkage link 144, and second linkage 150 may include a first second-linkage link 152 and a second second-linkage link 154.

First first-linkage link 142 may be rotatably connected to first arm 110. In some embodiments, first first-linkage link 142 is rotatably connected at its first end 142*a* to first arm 110. For example, first first-linkage link 142 may be rotatably connected to second end 110*b* of first arm 110, for example using third pivoting connection 163. First first-linkage link 142 and first arm 110 may rotate with respect to each other about third axis 163*a*.

Second first-linkage link 144 may be rotatably connected to motion restrainer 130. In some embodiments, second first-linkage link 144 is rotatably connected at its first end 144*a* to first end 130*a* of motion restrainer 130, for example using fourth pivoting connection 164. Second first-linkage link and motion restrainer 130 may rotate with respect to each other about fought axis 164*a*.

Second first-linkage link 144 may be rotatably connected to first first-linkage link 142. In some embodiments, second first-linkage link 144 may be rotatably connected at its second end 144*b* to first first-linkage link 142, for example to a second end 142*b* thereof using, for example, a ninth pivoting connection 169. Second first-linkage link 144 and first first-linkage link 142 may rotate with respect to each other about a ninth axis 169*a*. Ninth axis 169*a* may be parallel, or substantially parallel, to first axis 161*a*.

First second-linkage link 152 may be rotatably connected to second arm 120. In some embodiments, first second-linkage link 152 is rotatably connected at its first end 152*a* to second arm 120. For example, first second-linkage link 152 may be rotatably connected to second end 120*b* of second arm 120, for example using fifth pivoting connection 165. First second-linkage link 152 and second arm 120 may rotate with respect to each other about fifth axis 165*a*.

Second second-linkage link 154 may be rotatably connected to motion restrainer 130. In some embodiments, second second-linkage link 154 is rotatably connected at its first end 154*a* to second end 130*b* of motion restrainer 130, for example using sixth pivoting connection 166. Second second-linkage link 154 and motion restrainer 130 may rotate with respect to each other about sixth axis 166*a*.

Second second-linkage link 154 may be rotatably connected at its second end 154*b* to first second-linkage link 152. In some embodiments, second second-linkage link 154 is rotatably connected at its second end 154*b* to first second-linkage link 152, for example to a second end 152*b* thereof using, for example, a tenth pivoting connection 1610. Second second-linkage link 154 and first second-linkage link 152 may rotate with respect to each other about a tenth axis 1610*a*.

In some embodiments, first linkage 140 includes a third first-linkage link 146, and second linkage 150 includes a third second-linkage link 156.

Third first-linkage link 146 may be rotatably connected to sub-frame 105. In some embodiments, third first-linkage link 146 is rotatably connected at its first end 146*a* to sub-frame 105, for example using an eleventh pivoting connection 1611. Third first-linkage link 146 may rotate with respect to sub-frame about an eleventh axis 1611*a* that is parallel, or substantially parallel, to first axis 161*a*.

Third first-linkage link 146 may be rotatably connected to first first-linkage link 142 and/or to second first-linkage link 144. In various embodiments, third first-linkage link 146 is rotatably connected at its second end 146*b* to first first-linkage link 142 and/or to second first-linkage link 144. For example, third first-linkage link 146 may be rotatably connected at its second end 146*b* to second end 142*b* and second end 144*b* of first first-linkage link 142 and second first-linkage link 144, respectively, using, for example, ninth pivoting connection 169. For example, third first-linkage link 146 and first first-linkage link 142 and/or to second first-linkage link 144 may rotate with respect to each other about ninth axis 169.

Third second-linkage link 156 may be rotatably connected to sub-frame 105. In some embodiments, third second-linkage link 156 is rotatably connected at its first end 156*a* to sub-frame 105, for example using a twelfth pivoting connection 1612. Third second-linkage link 156 may rotate with respect to sub-frame 105 about a twelfth axis 1612*a* that is parallel, or substantially parallel, to second axis 162*a*.

Third second-linkage link 156 may be rotatably connected to first second-linkage link 152. In some embodiments, third second-linkage link 156 is rotatably connected at its second end 156*b* to first second-linkage link 152 and/or to second second-linkage link 154. For example, third second-linkage link 156 may be rotatably connected at its second end 156*b* to second end 152*b* and second end 154*b* of first second-linkage link 152 and second second-linkage link 154, respectively, using, for example, tenth pivoting connection 1610. Third second-linkage link 156 and first second-linkage link 152 and/or second second-linkage link 154 may rotate with respect to each other about tenth axis 1610*a*.

It is noted that other number of linkage links of first linkage 140 and second linkage 150 may be used, as well as other pivotal connections between linkage links and/or first arm 110 and second arm 120 may be used.

In embodiments shown in FIG. 1I, first axis 161*a* coincides with second axis 162*a*. For example, first end 110*a* of first arm 110 and first end 120*a* of second arm 120 may be rotatably connected to sub-frame 105 using the same pivoting connection (e.g. first pivoting connection 161 or second pivoting connection 162).

Reference is now made to FIG. 1J, which is a schematic illustration of suspension system 100 for the dual-axle wheels assembly, wherein linkages 140, 150 of suspension system 100 include rocker links, according to some embodiments of the invention.

In some embodiments, first linkage 140 includes a first link 147 and a first rocker link 148, and second linkage 150 includes a second link 157 and a second rocker link 158. In some embodiments, motion restrainer 130 is connected to sub-frame 105 via first rocker link 148 and second rocker link 158 (e.g. as described hereinbelow with respect to FIG. 1J).

First link 147 may be rotatably connected to first arm 110. In some embodiments, first link 147 is rotatably connected at its first end 147a to second end 110b of first arm 110, for example using third pivoting connection 163. First link 147 and first arm 110 may rotate with respect to each other about, for example, third axis 163a.

First rocker link 148 may be rotatably connected to first link 147. In some embodiments, first rocker link 148 is rotatably connected at its first connection point 148a to a second end 147b of first link 147 using, for example, a thirteenth pivoting connection 1613. First rocker link 148 and first link 147 may rotate with respect to each other about a thirteenth axis 1613a that is parallel, or substantially parallel to first axis 161a.

First rocker link 148 may be rotatably connected to motion restrainer 130. In some embodiments, first rocker link 148 is rotatably connected at its second connection point 148b to first end 130a of motion restrainer 130 using, for example, a fourteenth pivoting connection 1614. First rocker link 148 and motion restrainer 130 may rotate with respect to each other about a fourteenth axis 1614a that is parallel, or substantially parallel, to first axis 161a.

In some embodiments, first rocker link 148 is rotatably connected at its third connection point 148c to sub-frame 105 using, for example, fifteenth pivoting connection 1615. First rocker link 148 may rotate with respect to sub-frame 105 about a fifteenth axis 1615a that may be parallel, or substantially parallel, to first axis 161a.

In some embodiments, first rocker link 148 has a polygonal shape (e.g. substantially triangular shape) wherein each of connection points 148a, 148b, 148c is at one of corners thereof.

Second link 157 may be rotatably connected to second arm 120. In some embodiments, second link 157 is rotatably connected at its first end 157a to second end 120b of second arm 120, for example using fifth pivoting connection 165. Second link 157 and second arm 120 may rotate with respect to each other about, for example, fifth axis 165a.

Second rocker link 158 may be rotatably connected to second link 157. In some embodiments, second rocker link 158 is rotatably connected at its first connection point 158a to a second end 157b of second link 157 using, for example, a sixteenth pivoting connection 1616. Second rocker link 158 and second link 157 may rotate with respect to each other about a sixteenth axis 1616a that is parallel, or substantially parallel to second axis 162a.

Second rocker link 158 may be rotatably connected to motion restrainer 130. In some embodiments, second rocker link 158 is rotatably connected at its second connection point 158b to second end 130b of motion restrainer 130 using, for example, a seventeenth pivoting connection 1617. Second rocker link 158 and motion restrainer 130 may rotate with respect to each other about a seventeenth axis 1617a that is parallel, or substantially parallel, to second axis 162a.

In some embodiments, second rocker link 158 is rotatably connected at its third connection point 158c to sub-frame 105 using, for example, an eighteenth pivoting connection 1618. Second rocker link 158 may rotate with respect to sub-frame 105 about an eighteenth axis 1618a that may be parallel, or substantially parallel, to second axis 162a.

In some embodiments, second rocker link 158 has a polygonal shape (e.g. substantially triangular shape) wherein each of connection points 158a, 158b, 158c is at one of corners thereof.

First rocker link 148 and second rocker link 158 may be shaped and positioned to cause a displacement of at least one of first arm 110 and second arm 120 with respect to sub-frame 105 and a displacement of motion restrainer 130 in accordance with the displacement of at least one of first arm 110 and the second arm 120.

First rocker link 148 and second rocker link 158 may be shaped to transmit loads between motion restrainer 130 and at least one of first arm 110 and second arm 120, via at least one of first rocker link 148 and second rocker link 158, respectively.

In embodiments in which motion restrainer 130 is coupled to sub-frame 105 (e.g. via first rocker link 148 and second rocker link 158 of first linkage 140 and second linkage 150, respectively), two-sided integrated spring and damper motion restrainer may, for example, provide an additional degree of freedom.

In embodiments shown in FIG. 1J, first axis 161a coincides with second axis 162a. For example, first end 110a of first arm 110 and first end 120a of second arm 120 may be rotatably connected to sub-frame 105 using the same pivoting connection (e.g. first pivoting connection 161 or second pivoting connection 162).

Figure 1K:
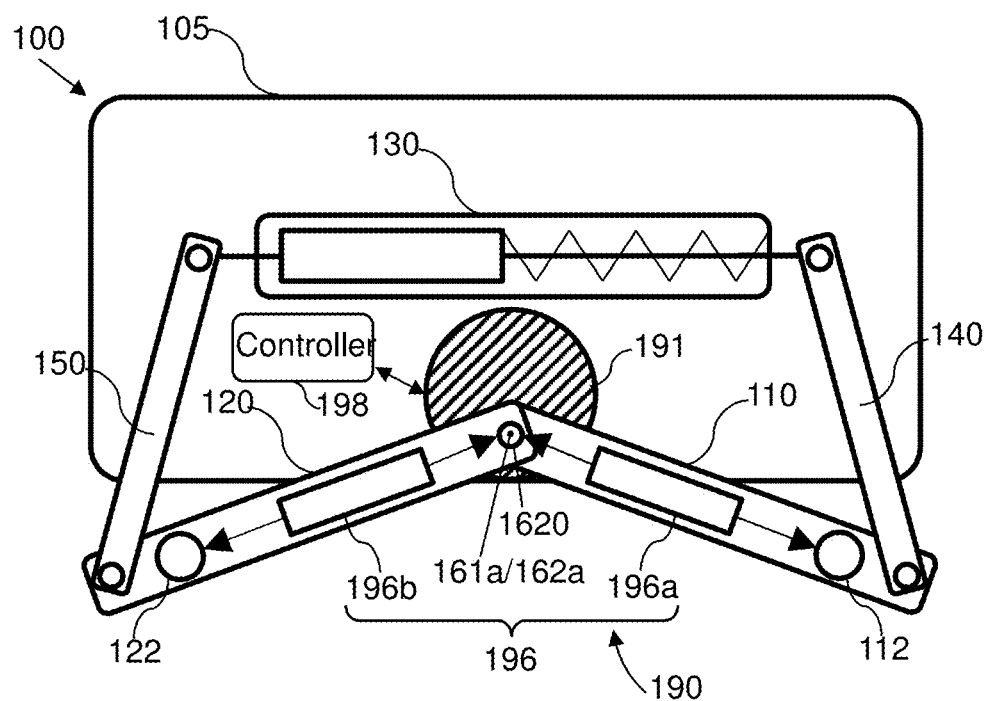
FIG. 1K is a schematic illustration of a dual-axle vehicle corner assembly including the suspension system for the dual-axle wheels assembly and a drivetrain unit including a motor and a transmission assembly, according to some embodiments of the invention.

Reference is now made to FIG. 1K, which is a schematic illustration of a dual-axle vehicle corner assembly 101 including suspension system 100 for the dual-axle wheels assembly and a drivetrain unit 190, according to some embodiments of the invention.

In some embodiments, suspension system 100 includes a drivetrain unit 190. Drivetrain unit 190 may include a motor 191 and a transmission assembly 196. Motor 191 may be connected to, for example, sub-frame 105. Coupling motor 191 to sub-frame 190 may allow motor 191 to be a sprung mass. Motor 191 may be coupled to first connector 112 and second connector 122 via transmission assembly 196. Transmission assembly 196 may transmit rotational motions generated by motor 191 to at least one of first connector 112 and second connector 122 to rotate at least one of first connector 112 and second connector 122, respectively, and drive at least one of first wheel 92 and second wheel 94 connected to first connector 112 and second connector 122, respectively. Motor 191 may be, for example, an electrical motor.

In some embodiments, first axis 161a coincides with second axis 162a. For example, first arm 110 and second arm 120 may be rotatably connected at their first ends 110a, 120a, respectively, to sub-frame 105 using a pivoting connection 1620. Pivoting connection 1620 may be first pivoting connection 161 or second pivoting connection 162 described above with respect to FIGS. 1A 1B, 1C, 1D, 1I and 1I. Motor 191 may be coupled to pivoting connection 1620 and may rotate pivoting connection 1620.

In some embodiments, transmission assembly 196 includes a first transmission unit 196a and a second transmission unit 196b. First transmission unit 196a may be mounted within, for example, first arm 110 of suspension system 100. Second transmission unit 196b may be mounted within, for example, second arm 120 of suspension system 100. In various embodiments, first transmission unit 196a and/or second transmission unit 196b includes a transmission gear. In various embodiments, first transmission unit 196a and/or second transmission unit 196b includes a transmission belt. In various embodiments, first transmission unit 196a and/or second transmission unit 196b includes a transmission chain.

Motor 191 may rotate pivoting connection 1620 and first transmission unit 196a and second transmission unit 196b may transmit the rotation thereof to first connector 112 and to second connector 122, respectively.

In some other embodiments, motor 191 is axially coupled to one of first connector 112 and second connector 122 to directly rotate the respective connector. In this manner, a need in transmission assembly 196 may be eliminated.

In some embodiments, suspension system 100 includes a controller 198. Controller 198 may be configured to control an activation and/or deactivation of transmission assembly 196. In various embodiments, the activation and/or the deactivation of transmission assembly 196 is achieved by controlling the rotational speed of motor 191. The activation and deactivation of transmission assembly 196 may, for example, improve a steering of the vehicle. The activation and/or the deactivation of transmission assembly 196 may, for example, enable cornering of the vehicle with a rotational speed difference between pairs of rear wheels of the vehicle. In some embodiments, e.g. when transmission assembly 196 includes first transmission unit 196a and second transmission unit 196b, suspension system 100 includes a decoupling device that decouples first transmission unit 196a and second transmission unit 196b thereof. Decoupling of first transmission unit 196a and second transmission unit 196b of transmission assembly 196 may, for example, enable independently controlling first transmission unit 196a and second transmission unit 196b.

Pivoting connections 160 may include connections that may allow pivoting around at least one axis. For example, pivoting connections 160 may include bearings, bushings, hinges, joints and the like. Pivoting connections 160 may cause rotation of components of suspension system 100 about axes that are parallel, or substantially parallel, to first axis 161a and to second axis 162a. Such components may include at least one of first arm 110, second arm 120, motion restrainer 130, components of first linkage 140 and components of second linkage 150. Pivoting connections 160 may cause rotation of components of suspension system 100 in one or more planes that are parallel (or substantially parallel) to vertical reference plane 103 of sub-frame 105. Vertical reference plane 103 may be perpendicular, or substantially perpendicular, to first axis 161a and to second axis 162a. Vertical reference plane 103 may be parallel, or substantially parallel, to planes in which first wheel 92 and second wheel 94 of dual-axle wheels assembly 90 rotate when connected to first connector 112 and second connector 122, respectively.

Figure 2A:
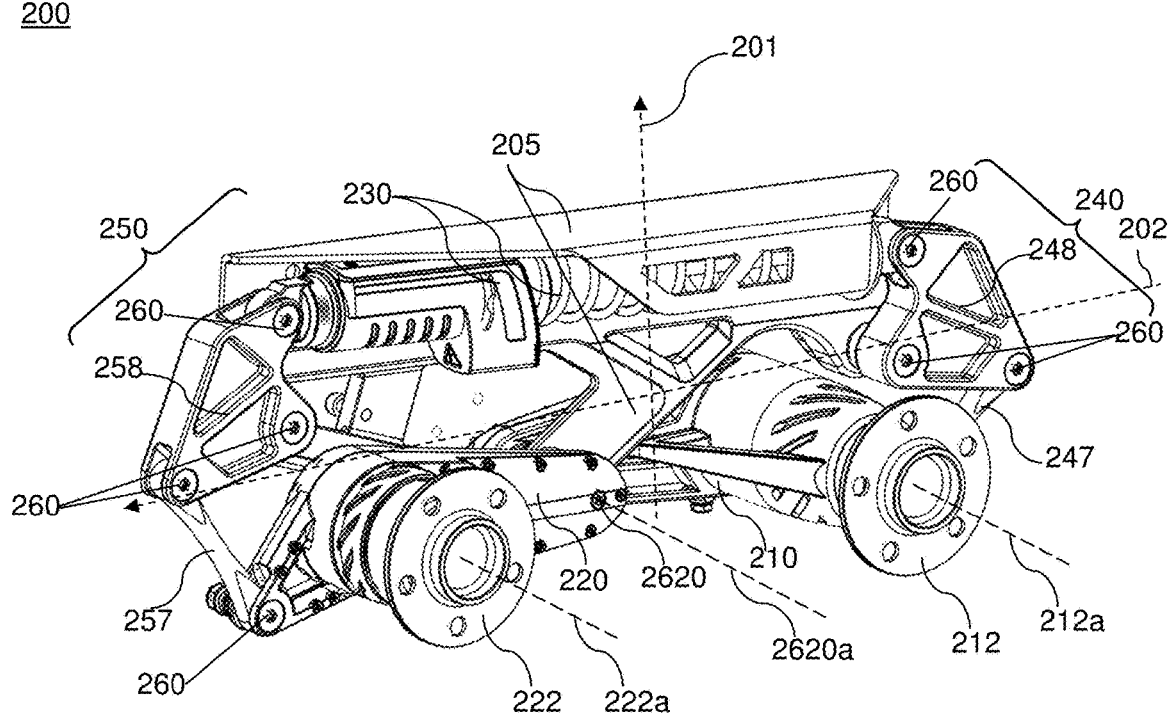
FIGS. 2A is a three-dimensional diagram (3D) of a suspension system for a dual-axle wheels assembly, according to some embodiments of the invention.

Reference is now made to FIGS. 2A, which is a three-dimensional diagram (3D) of a suspension system 200 for the dual-axle wheels assembly, according to some embodiments of the invention.

Figure 2B:
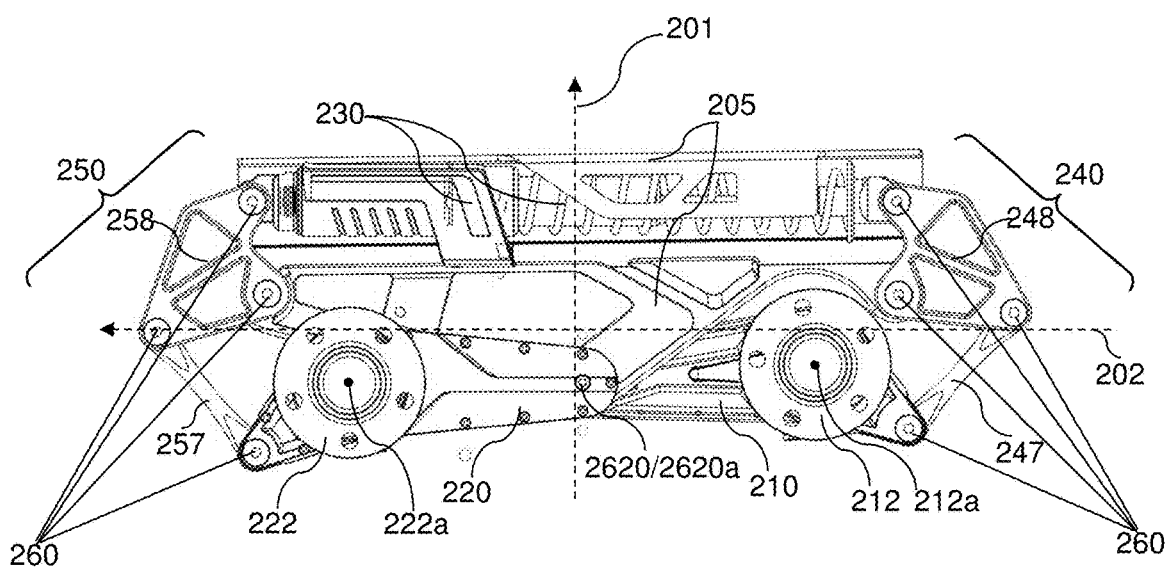
FIG. 2B shows a side view of the suspension system for the dual-axle wheels assembly of FIG. 2A, according to some embodiments of the invention.

Reference is also made to FIG. 2B, which shows a side view of a suspension system 200 for the dual-axle wheels assembly of FIG. 2A, according to some embodiments of the invention.

FIG. 2A shows a perspective view of suspension system 200. FIG. 2B shows a side view of suspensions system 200, wherein the side view is indicated with respect to direction of a vehicle assembled with suspension system 200.

According to some embodiments, suspension system 200 includes a sub-frame 205, a first arm 210, a first connector 212, a second arm 220, a second connector 222, a motion restrainer 230, a first linkage 240 and a second linkage 250.

First arm 210 and second arm 220 are connected to sub-frame 205 and are rotatable with respect to sub-frame 205 about an axis 2620a.

First connector 212 is connected to first arm 210 and has a first connector axis 212a about which a first wheel of the dual-axle wheels assembly rotates when connected to first connector 212. First connector axis 212a may be parallel, or substantially parallel, to axis 2620a. First connector 212 may, for example, be or may include a wheel knuckle, a wheel upright, a wheel hub, a wheel bearing, etc.

Second connector 222 is connected to second arm 220 and has a second connector axis 222a about which a second wheel of the dual-axle wheels assembly rotates when connected to second connector 222. Second connector axis 222a may be parallel, or substantially parallel, to axis 2620a. Second connector 222 may, for example, be or may include a wheel knuckle, a wheel upright, a wheel hub, a wheel bearing, etc.

Motion restrainer 230 may be rotatably connected to first arm 210 and to second arm 220 using first linkage 240 and second linkage 250, respectively.

First linkage 240 may include a first link 247 and a first rocker link 248. Second linkage 250 may include a second link 257 and a second rocker link 258. For example, first linkage 240 and second linkage 250 may be similar to first linkage 140 and second linkage 150 described above with respect to FIG. 1J.

Pivoting connections 260 may include connection that allow pivoting around at least one axis. For example, pivoting connections 260 may include bearings, bushings, hinges, joints and the like. Pivoting connections 260 constrain the rotation of components of suspension system 100 about axes that are parallel, or substantially parallel, to axis 2620a. Such components may include at least one of first arm 210, second arm 220, motion restrainer 230, components of first linkage 240 and components of second linkage 250. Pivoting connections 260 may cause rotation of components of suspension system 200 in one or more planes that are parallel (or substantially parallel) to planes in which a first wheel and a second wheel of the dual-axle wheels assembly rotate when connected to first connector 212 and second connector 222, respectively.

Figure 2C:
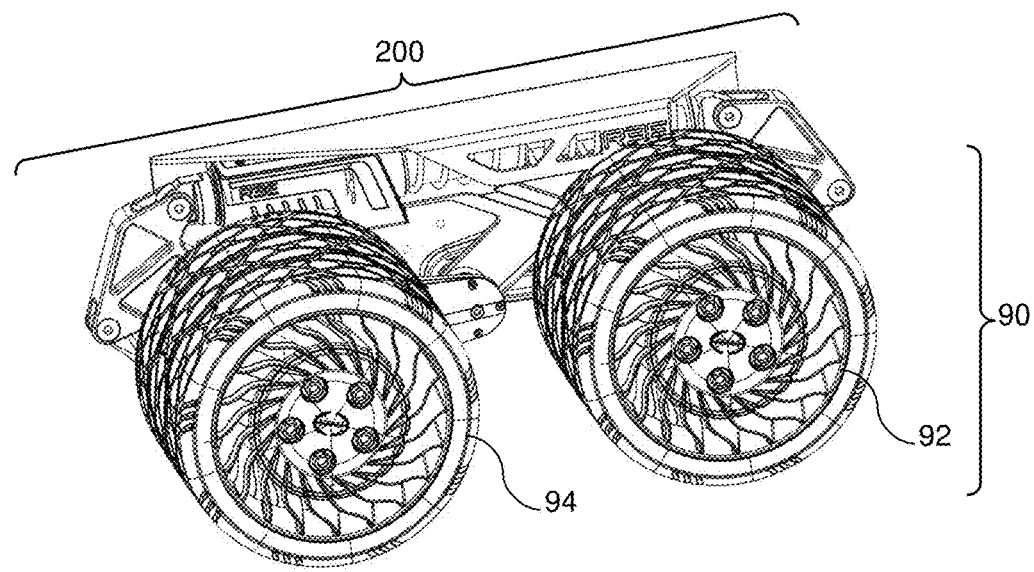
FIGS. 2C, 2D and 2E show different views of the suspension system and of the dual-axle wheels assembly of FIG. 2A, according to some embodiments of the invention.
Figure 2D:
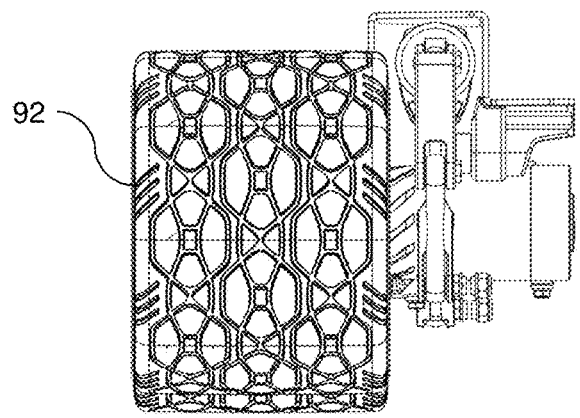
Figure 2E:
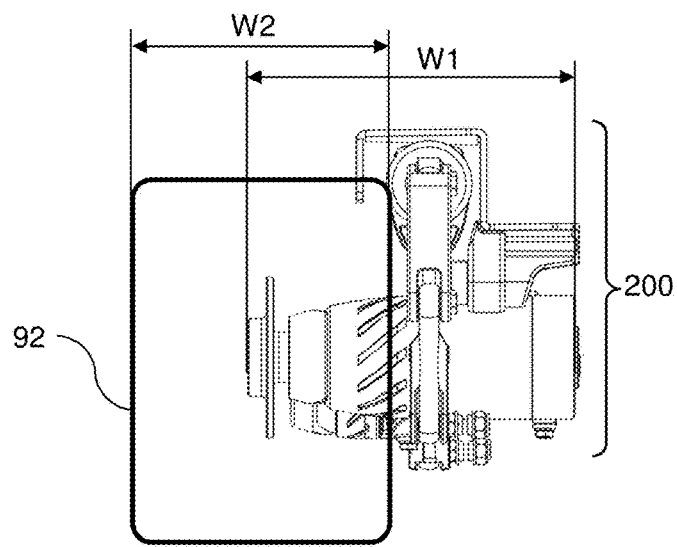

Reference is now made to FIGS. 2C, 2D and 2E show different views of a suspension system 200 of FIG. 2A and of dual-axle wheels assembly 90, according to some embodiments of the invention.

FIG. 2C shows a perspective view of suspension system 200 and of dual-axle wheels assembly 90 assembled to suspension system 200. Dual-axle wheels assembly 90 may include first wheel 92 and second wheel 94. FIGS. 2D and 2E show a front view (e.g. as defined in FIG. 2C) of dual-axle wheels assembly 90 assembled to suspension system 200. FIG. 2E shows an outer border of first wheel 92 for sake of clarity. The front view as schematically shown in FIGS. 2D and 2E are indicated with respect to directions of a vehicle assembled with suspension system 200.

In some embodiments, at least a portion of suspension system 200 may be accommodatable within wheels 92, 94 of dual-axle wheels assembly 90 when dual-axle wheels assembly 90 is assembled to suspension system 200 (e.g. as shown in FIGS. 2C, 2D and 2E). In some embodiments, a width W1 of suspension system 200 is less than 5 times (e.g.

or less than 4 times or 2 times) than a width W2 of wheels 92, 94 (e.g. W1 and W2 as indicated in FIG. 2E).

Figure 2F:
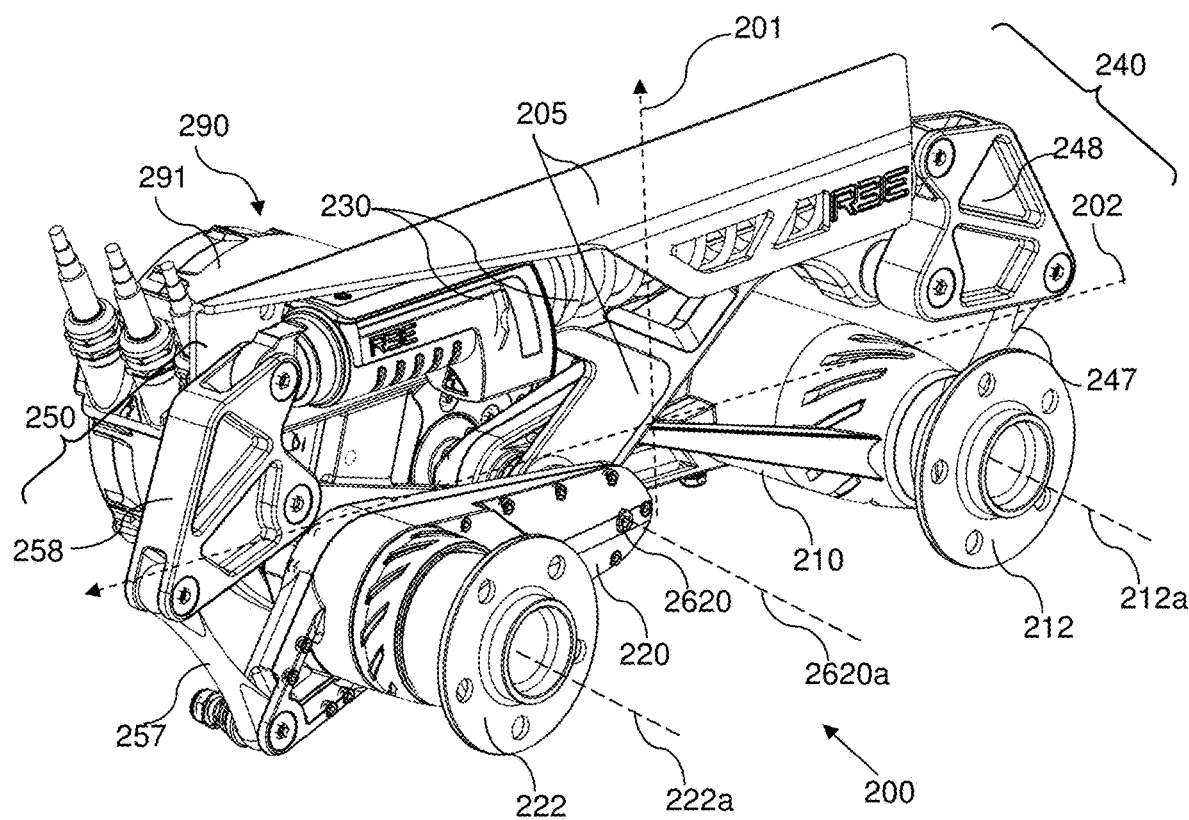
FIG. 2F is a 3D diagram of a dual-axle vehicle corner assembly including the suspension system for the dual-axle wheels assembly of FIG. 2A and a drivetrain system including a motor, according to some embodiments of the invention.

Reference is now made to FIG. 2F, which is a 3D diagram of a dual-axle vehicle corner assembly 201 including a suspension system 200 of FIG. 2A and a drivetrain unit 290, according to some embodiments of the invention.

In some embodiments, suspension system 200 includes a powertrain unit 290. Powertrain unit 290 may include a motor 291 and a transmission assembly. The transmission assembly is not shown in FIG. 2F, but it may be similar to transmission assembly 196 described above with respect to FIG. 1K.

In some embodiments, suspension system 200 includes a motor 291 and a transmission assembly. Motor 291 may be connected to, for example, sub-frame 205. Motor 291 may be coupled to first connector 210 and second connector 220 using the transmission assembly. The transmission assembly may transmit rotational motions generated by motor 291 to at least one of first connector 212 and second connector 222 to rotate at least one of first connector 212 and second connector 222, respectively, and drive at least one of a first wheel and a second wheel connected to first connector 212 and second connector 222, respectively. Motor 291 may be, for example, an electrical motor.

Motor 291 may be coupled to pivoting connection 2620 and may rotate pivoting connection 2620. In some embodiments, the transmission assembly includes a first transmission unit mounted within first arm 210 and a second transmission unit mounted within second arm 220. Motor 291 may rotate pivoting connection 2620, and the first transmission unit and the second transmission unit may transmit the rotation thereof to first connector 212 and to second connector 222, respectively.

Some embodiments of the present invention may provide a dual-axle vehicle corner assembly including a suspension system for the dual-axle wheels assembly as described herein (e.g. such as suspension system 100 and/or suspension system 200 described herein).

Figure 3:
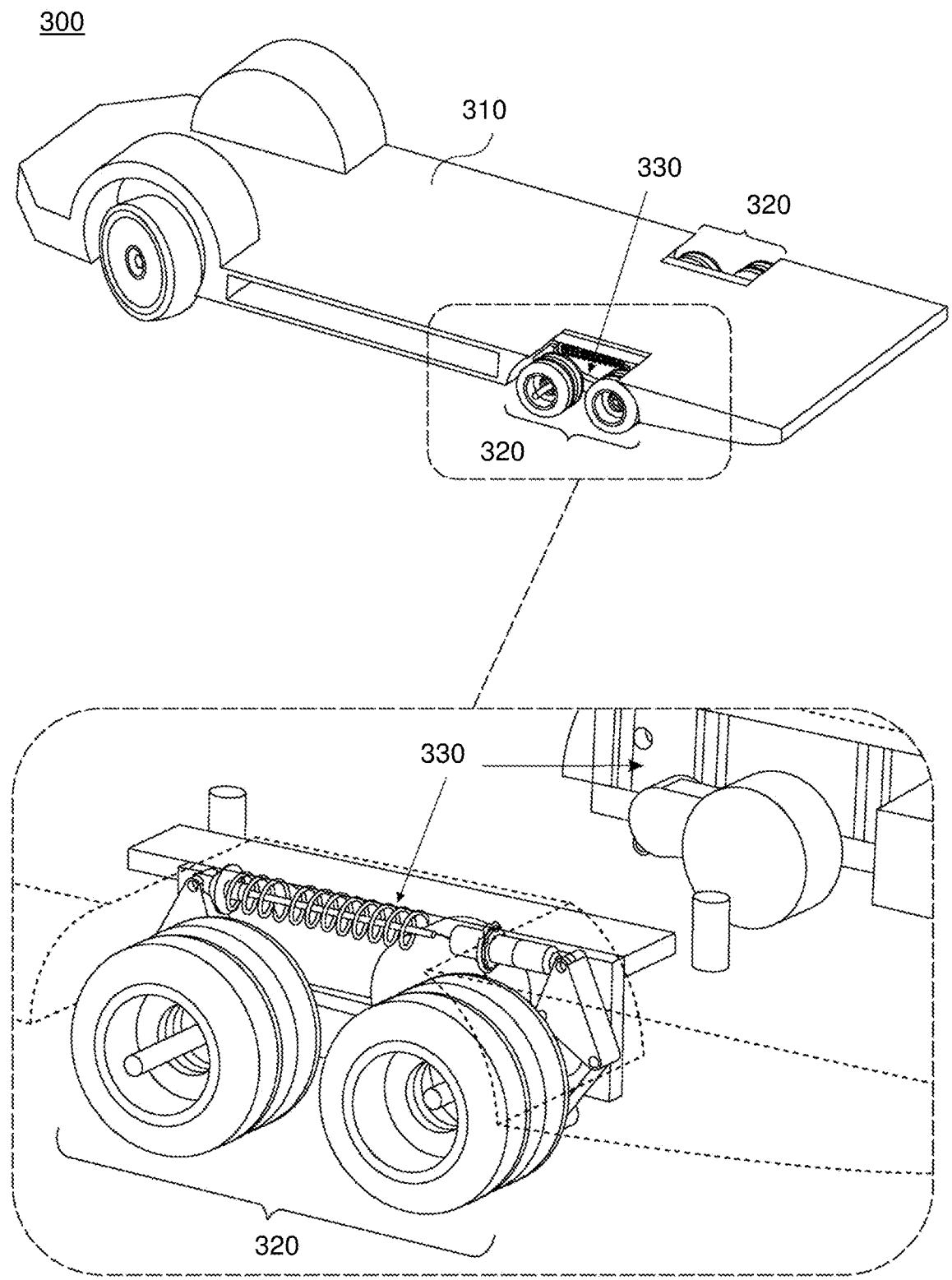
FIG. 3 is a 3D diagram of a vehicle, according to some embodiments of the invention.

Reference is now made to FIG. 3, which is a 3D diagram a vehicle 300, according to some embodiments of the invention.

Vehicle 300 may include a reference frame 310 and two or more dual-axle wheels assemblies 320, at least one dual-axle wheels assemblies 320 at each lateral side 302 of vehicle 300.

Vehicle 300 may include two or more suspension systems 330, one for each of dual-axle wheels assemblies 320; or two or more dual-axle vehicle corner assemblies each including suspension system 330. Suspension systems 330 may be similar to suspension system 100 described above with respect to FIGS. 1A, 1B, 1C, 1D, 1F, 1G, 1H, 1I, 1J and 1K or suspension system 200 described above with respect to FIGS. 2A, 2B, 2C, 2D, 2E and 2F.

According to various embodiments, the suspension system (e.g. such as suspension system 100, 200 or 330) or the dual-axle vehicle corner assembly (e.g. such as dual-axle vehicle corner assembly 101 or 201) includes a control system. In some embodiments, the control system receives data from one or more sensors. In some embodiments, the one or more sensors are for measuring road conditions. In some embodiments, the one or more sensors are for measuring loads in the suspension system. In some embodiments, the one or more sensors are for measuring motorizing of the wheels of the dual-axle wheels assembly. In some embodiments, the control system includes one or more processors. In various embodiments, the one or more processors may use artificial intelligence (AI) algorithms and/or machine learning to determine one or more parameters related to health of the suspension system. In some embodiments, the one or more parameters include maintenance information. In some embodiments, the control system outputs predictive information.

According to various embodiments, the suspension system (e.g. such as suspension system 100, 200 or 330) or the dual-axle vehicle corner assembly (e.g. such as dual-axle vehicle corner assembly 101 or 201) may be detachably connectable to the vehicle. In various embodiments, the suspension system may be connected to the vehicle by a plurality of fasteners. In some embodiments, the suspension system or the dual-axle vehicle corner assembly may be connected to the vehicle by a plurality of bolts. In various embodiments, the suspension system or the dual-axle vehicle corner assembly may be detachable of the vehicle by releasing the plurality of bolts. In various embodiments, coupling of the suspension system or the dual-axle vehicle corner assembly to the vehicle may be by coupling the sub-frame of the suspension system or the dual-axle vehicle corner assembly to the frame of the vehicle.

According to various embodiments, the suspension system (e.g. such as suspension system 100, 200 or 330) and/or the dual-axle vehicle corner assembly (e.g. such as dual-axle vehicle corner assembly 101 or 201) may be electrically coupled to the electrical systems of the vehicle by one or more electrical connectors. In various embodiments, at least one of the electrical systems of the suspension system the dual-axle vehicle corner assembly may be coupled to the electrical systems of the vehicle by wireless connection.

Figure 4A:
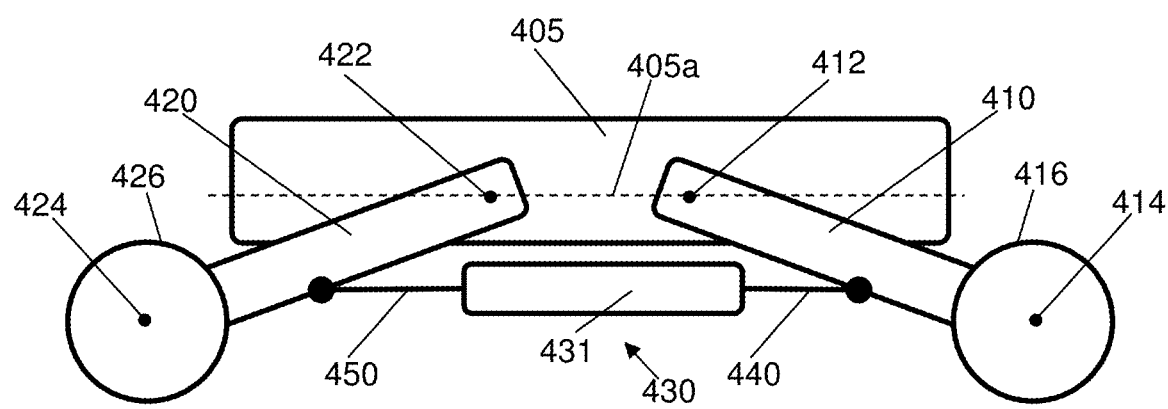
FIG. 4A is a schematic illustration of a side view a dual-axle vehicle corner assembly, according to some embodiments of the invention.

Reference is now made to FIG. 4A, which is a schematic illustration of a side view of a dual-axle vehicle corner assembly 400, according to some embodiments of the invention.

Figure 4B:
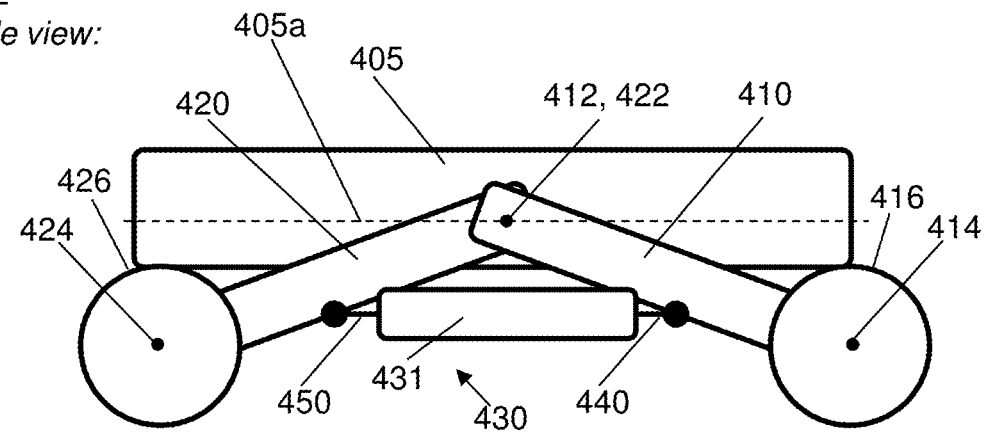
FIG. 4B is a schematic illustration of a side view of a dual-axle vehicle corner assembly having coinciding first and second arm axes, according to some embodiments of the invention.

Reference is also made to FIG. 4B, which is a schematic illustration of a side view of a dual-axle vehicle corner assembly 400 having coinciding first and second arm axes 412, 422, according to some embodiments of the invention.

Figure 4C:
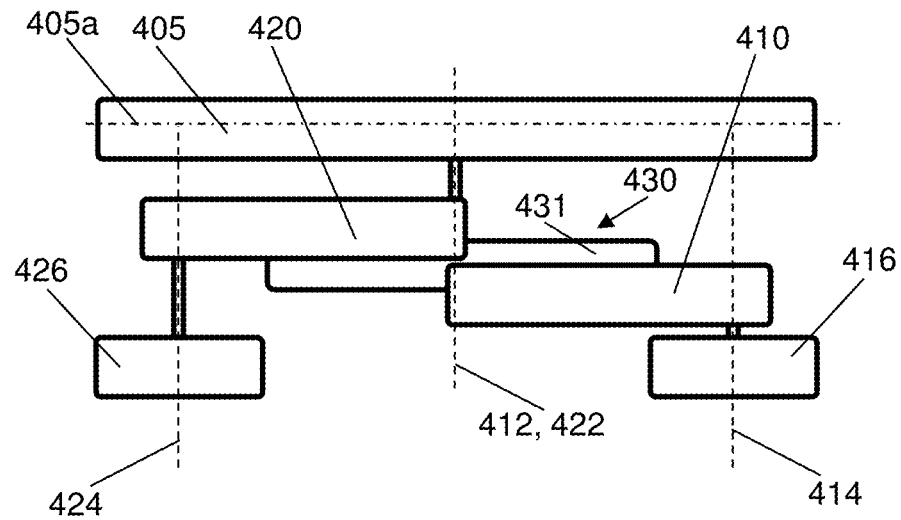
FIG. 4C is a schematic illustration of a top view of a dual-axle vehicle corner assembly, according to some embodiments of the invention.

Reference is also made to FIG. 4C, which is a schematic illustration of a top view of a dual-axle vehicle corner assembly 400, according to some embodiments of the invention.

Figure 4D:
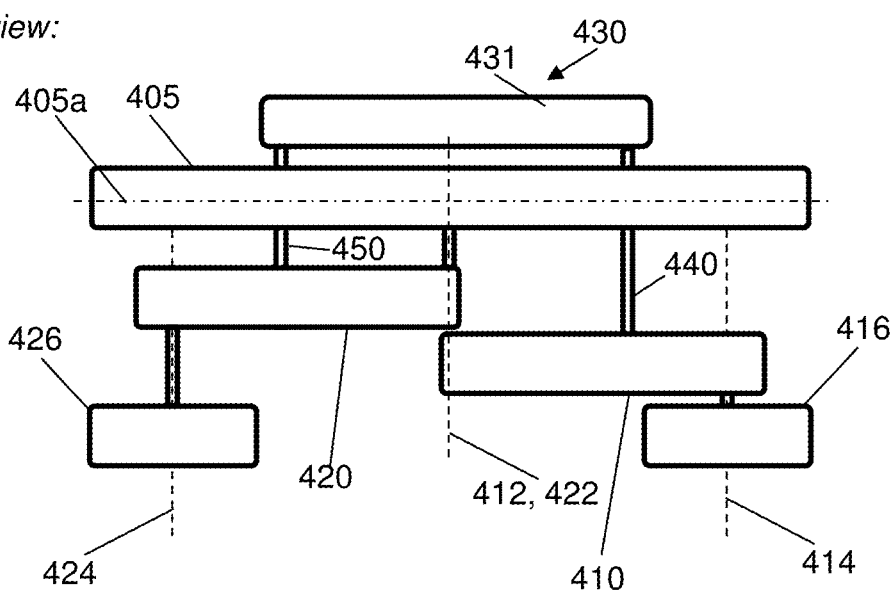
FIG. 4D is a schematic illustration of a top view of a dual-axle vehicle corner assembly, wherein arms and a suspension system positioned at opposing sides of a sub-frame with respect to each other, according to some embodiments of the invention.

Reference is also made to FIG. 4D, which is a schematic illustration of a top view of a dual-axle vehicle corner assembly 400, wherein arms 410, 420 and a suspension system 430 are positioned at opposing sides of a sub-frame 405 with respect to each other, according to some embodiments of the invention.

Figure 4E:
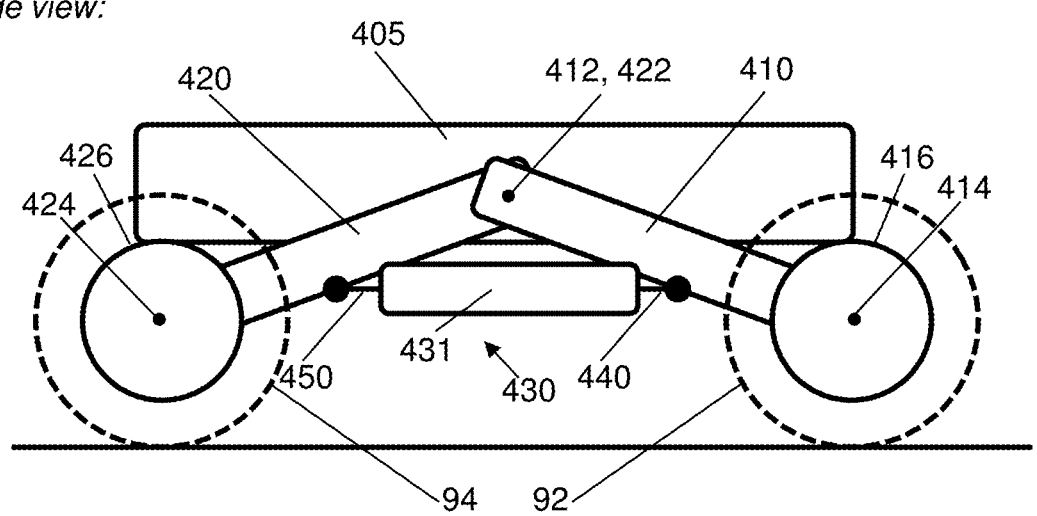
FIGS. 4E and 4F are schematic illustrations of a side view of a dual-axle vehicle corner assembly and wheels connected to the dual-axle vehicle corner assembly, according to some embodiments of the invention.
Figure 4F:
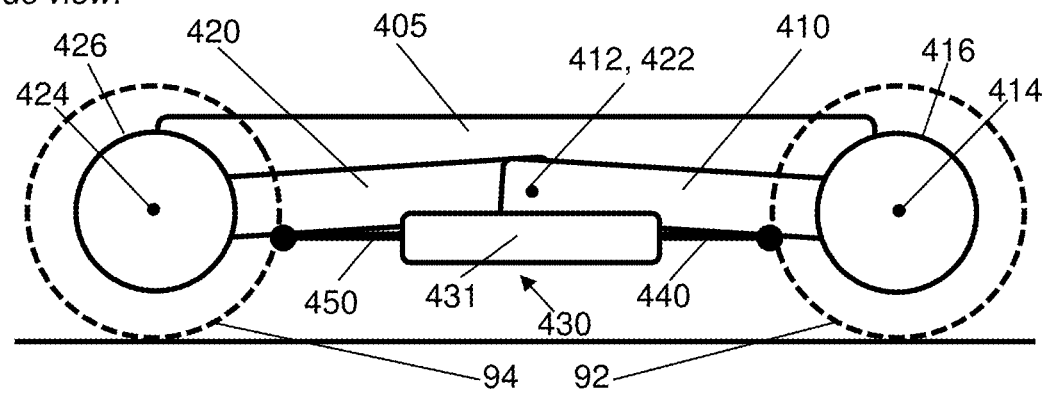

Reference is also made to FIGS. 4E and 4F, which are schematic illustrations of a side view of dual-axle vehicle corner assembly 400 and wheels 92, 94 connected to dual-axle vehicle corner assembly 400, according to some embodiments of the invention.

Dual-axle vehicle corner assembly 400 may include a sub-frame 405 (e.g. such as sub-frame 105 or 205 described above), a first arm 410 (e.g. such as first arm 110 or 210 described above) and a second arm 420 (e.g. such as second arm 120 or 220 described above).

Sub-frame 405 may connect at least some components of dual-axle vehicle corner assembly 400 to a vehicle platform. The vehicle platform may be, for example, a chassis or a frame (e.g. reference frame) of the vehicle that supports various components of the vehicle (e.g. such as suspension components, vehicle body, electrical control components, and power source components or any other vehicle components known in the art).

First arm 410 may be connected to sub-frame 405 and may rotate with respect to sub-frame 405 about a first arm axis 412 (e.g. such as first axis 161a described above). Second arm 420 may be connected to sub-frame 405 and may rotate with respect to sub-frame 405 about a second arm axis 422 (e.g. such as second axis 162a described above). For example, first arm 410 and second arm 420 may each be connected to sub-frame 405 at its respective end (e.g. as shown in FIGS. 4A-4F). In some embodiments, first arm axis 412 coincides with second arm axis 422 (e.g. as shown in FIGS. 4B-4F).

First arm 410 may include a first axle axis 414 (e.g. such as first connector axis 112a described above) about which a first wheel 92 may rotate when first wheel 92 is connected to first arm 410 (e.g. as shown in FIGS. 4E and 4F). Second arm 420 may include a second axle axis 424 (e.g. such as second connector axis 122a) about which a second wheel 94 may rotate when second wheel 94 is connected to second arm 420 (e.g. as shown in FIGS. 4E and 4F).

In some embodiments, dual-axle vehicle corner assembly 400 includes a first connector 416 (e.g. such as first connector 112 or 212 described above) to connect first wheel 92 to first arm 410 and a second connector 426 (e.g. such as second connector 122 or 222 described above) to connect second wheel 94 to second arm 420 (e.g. as shown in FIGS. 4A-4F). First connector 416 may be connected to first arm 410 and may rotate with respect to first arm 410 about first axle axis 414, and second connector 426 may be connected to second arm 420 and may rotate with respect to second arm 420 about second axle axis 424 (e.g. as shown in FIGS. 4A-4F). Each of first connector 416 and second connector 426 may include a wheel knuckle, a wheel upright, a wheel hub, a wheel bearing, etc. (e.g. as described above with respect to FIGS. 1A-1K or FIGS. 2A-2F).

First arm axis 412, second arm axis 422, first axle axis 414 and second axle axis 424 may be parallel (or substantially parallel) to each other.

Dual-axle vehicle corner assembly 400 may include a suspension system 430. Suspension system 430 may include a piston assembly 431. Piston assembly 431 may interconnect first arm 410 and second arm 420 (e.g. as shown in FIGS. 4A-4F). Dual-axle vehicle corner assembly 400 may include a first linkage 440 to connect (e.g. rotatable connect) piston assembly 431 to first arm 410 and a second linkage 450 to connect (e.g. rotatable connect) piston assembly 431 to second arm 420. It is noted that first and second linkages 440, 450 are shown schematically in FIGS. 4A-4F for sake of clarity.

Various configurations of first and second linkages 440, 450 may be used to connect piston assembly 431 to first and second arms 410, 420, respectively. Each of first and second linkages 440, 450 may include one or more links. In some embodiments, each of first and second linkages 440, 450 includes a rocker link. In some embodiments, each of first and second linkages 440, 450 includes one or more links that rotate about axes that are parallel (or substantially parallel) to first and second axle axes 414, 424. In some embodiments, each of first and second linkages 440, 450 includes one or more links that rotate about axes that are perpendicular (or substantially perpendicular) to first and second axle axes 414, 424. The links rotatable about axes that are perpendicular (or substantially perpendicular) to first and second axle axes 414, 424 may be used to, for example, offset (e.g. transversally or laterally offset) piston assembly 431 from first and second arms 410, 420 to, for example, position piston assembly 43 land first and second arms 410, 420 at opposing sides of sub-frame 405 with respect to each other (e.g. as described below with respect to FIG. 4D). In various embodiments, first linkage 440 and second linkage 450 are similar to first linkages 140 or 240 and second linkages 150 or 250, respectively, described above with respect to FIGS. 1A-1K and 2A-2F. One example of first linkage 440 and second linkage 450, respectively, described below with respect to FIGS. 11E-11F. Other configurations of first and second linkages 440, 450 are also possible.

Piston assembly 431 may be perpendicular (or substantially perpendicular) to first axle axis 414 and second axle axis 424. Piston assembly 431 may be parallel (or substantially parallel) to a longitudinal axis 405a of sub-frame 405. Piston assembly 431 may be parallel (or substantially parallel) to sub-frame 405.

In some embodiments, piston assembly 431, first arm 410 and second arm 420 are positioned at the same side of sub-frame 405 (e.g. as shown in FIGS. 4A-4C and 4E-4F). In some embodiments, (i) piston assembly 431 and (ii) first arm 410 and second arm 420 are positioned at opposing sides of sub-frame 405 with respect to each other (e.g. as shown in FIG. 4D).

Suspension system 430 and/or piston assembly 431 may support and/or control relative motion between first arm 410 and second arm 420 with respect to each other and with respect to sub-frame 405.

Suspension system 430 and/or piston assembly 431 may control and/or distribute loads between first arm 410 and second arm 420. For example, suspension system 430 may transfer loads applied on first arm 410 to second arm 420 and transfer loads applied on second arm 420 to first arm 410.

Suspension system 430 and/or piston assembly 431 may control a distance between first axle axis 414 and second axle axis 424. For example, piston assembly 431 may controllably increase and decrease a length of piston assembly 431 (e.g. a distance between connection points of piston assembly 431 to first and second arms 410, 420) to control the distance between first and second axle axes 414, 424. When dual-axle vehicle corner assembly 400 is assembled to the vehicle platform, the distance between first axle axis 414 and second axle axis 424 of dual-axle vehicle corner assembly 400 may define a height of sub-frame 405 and of the vehicle platform relative to the ground (e.g. as shown in FIGS. 4E and 4F). By controlling the distance between first axle axis 414 and second axle axis 424, suspension system 430 and/or piston assembly 431 may control the height of sub-frame 405 and the vehicle platform relative to the ground. For example, as shown in FIGS. 4E and 4F, the greater the distance between first axle axis 414 and second axle axis 424, the lower sub-frame 405 of dual-axle vehicle corner assembly 400 relative to the ground (e.g. kneeling). In the same example, the smaller the distance between first axle axis 414 and second axle axis 424, the higher sub-frame 405 of dual-axle vehicle corner assembly 400 relative to the ground (e.g. lifting).

Suspension system 430 and/or piston assembly 431 may, for example, apply forces to first and second arms 410, 420 to push or pull each of first and second wheels 92, 94 connected to first and second arms 410, 420, respectively, to the ground surface.

Suspension system 430 and/or piston assembly 431 may maintain traction of first and second wheels 92, 94 with the ground surface when, e.g. first or second wheel 92, 94 is lowered with respect to another wheel and/or drops away from sub-frame 405 or the vehicle platform due to, e.g. a bump or a hole on the ground surface. In some embodiments, when the same suspension system 430 interconnects first and second arms 410, 420, traction is applied on both first and second wheels 92, 94.

In some embodiments, suspension system 430 includes a piston. In some embodiments, suspension system 430 includes a damper. In various embodiments, suspension system 430 sets and/or controls a damping profile of the damper. In some embodiments, suspension system 430 includes a spring. In some embodiments, suspension system 430 includes a pneumatic mechanism. In some embodiments, suspension system 430 includes a hydraulic mechanism. In some embodiments, suspension system 430 includes a hydro-pneumatic mechanism. In some embodiments, suspension system 430 includes a telescopic mechanism. In some embodiments, suspension system 430 includes a screw mechanism (e.g. a ball screw mechanism or a screw shaft mechanism). In some embodiments, suspension system 430 includes a shock absorber (e.g. an active shock absorber).

Various embodiments of suspension system 430 for dual-axle vehicle corner assembly 400 are described below with respect to FIGS. 8A-8C, 9A-9D, 10A-10D, 11A-11H and 12A-12B.

Reference is now made to FIGS. 5A-5D, which are schematic illustrations of dual-axle vehicle corner assembly 400 including a steering system 500 that steers wheel connectors 416, 426 relative to arms 410, 420, according to some embodiments of the invention.

Reference is also made to FIGS. 5E-5H, which are schematic illustrations of dual-axle vehicle corner assembly 400 including a steering system 500 that steers arms 410, 420 relative to sub-frame 405, according to some embodiments of the invention.

Figure 5A:
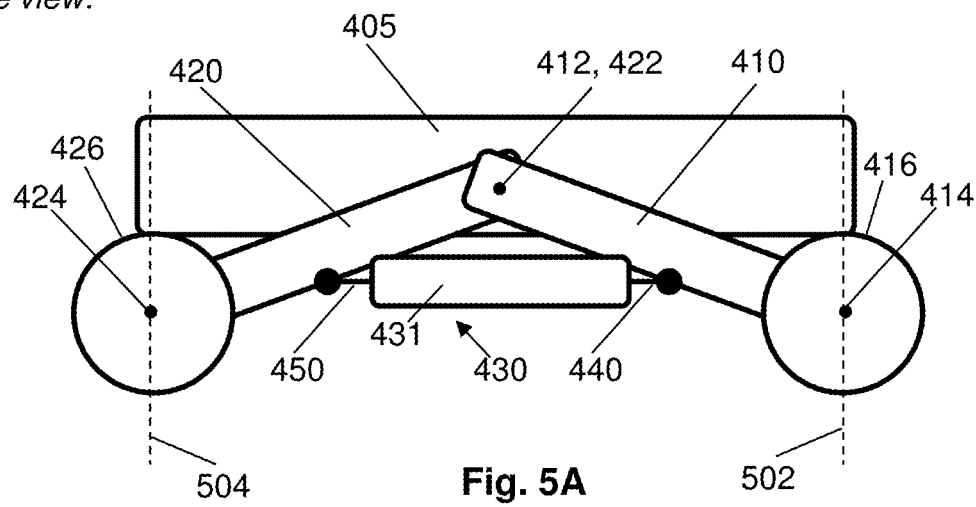
FIGS. 5A-5D are schematic illustrations of a dual-axle vehicle corner assembly including a steering system that steers wheel connectors relative to arms, according to some embodiments of the invention.
Figure 5B:
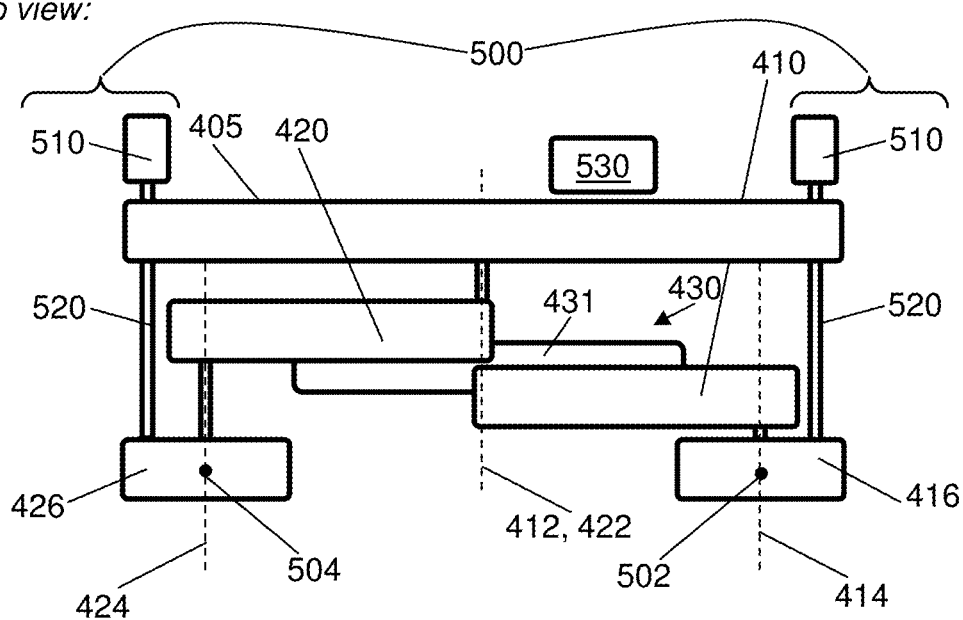
Figure 5C:
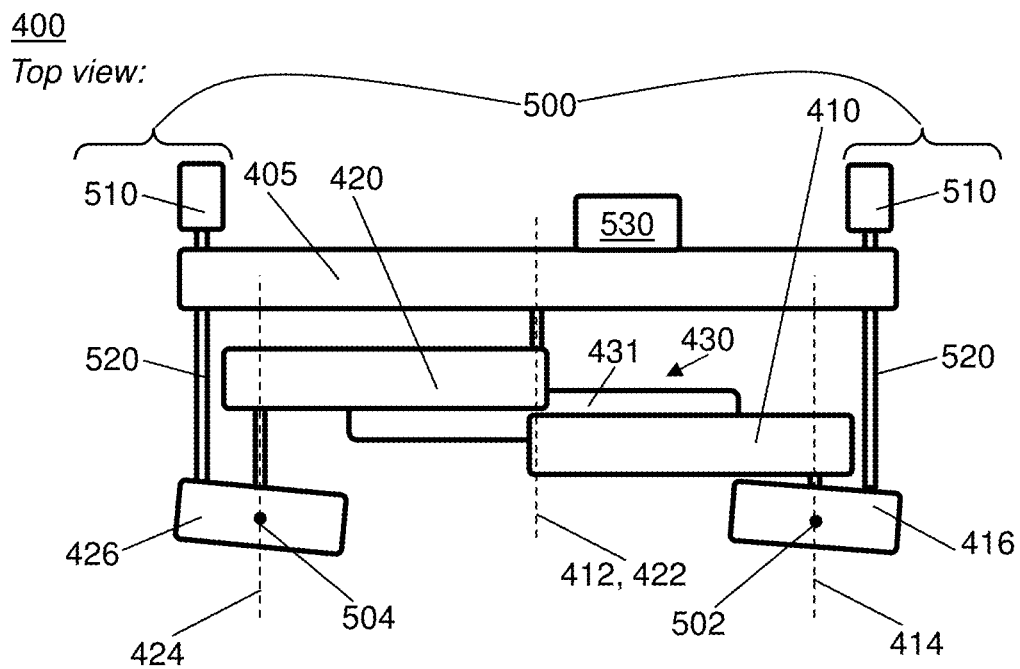
Figure 5D:
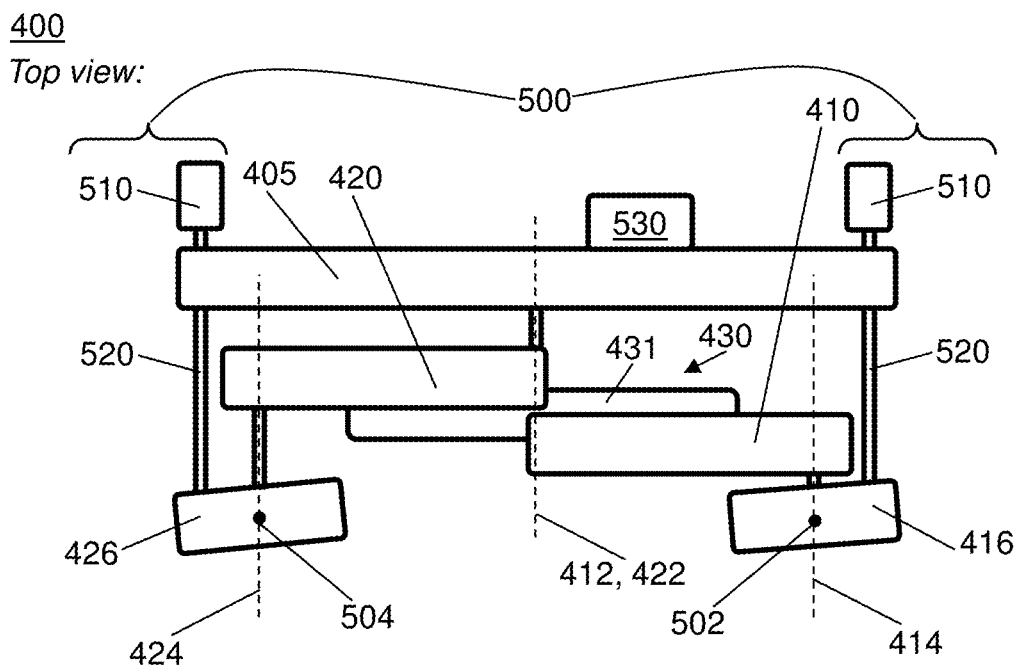
Figure 5E:
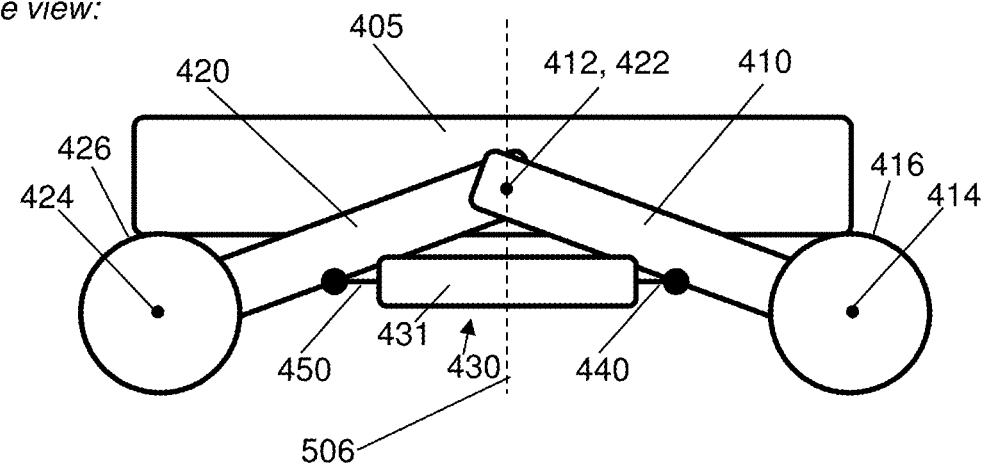
FIGS. 5E-5H are schematic illustrations of a dual-axle vehicle corner assembly including a steering system that steers arms relative to a sub-frame, according to some embodiments of the invention.
Figure 5F:
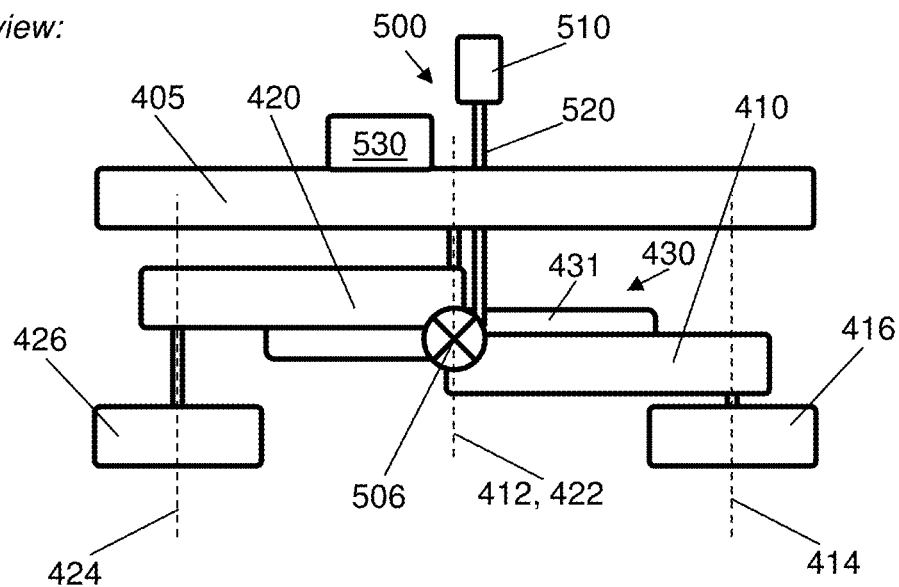
Figure 5G:
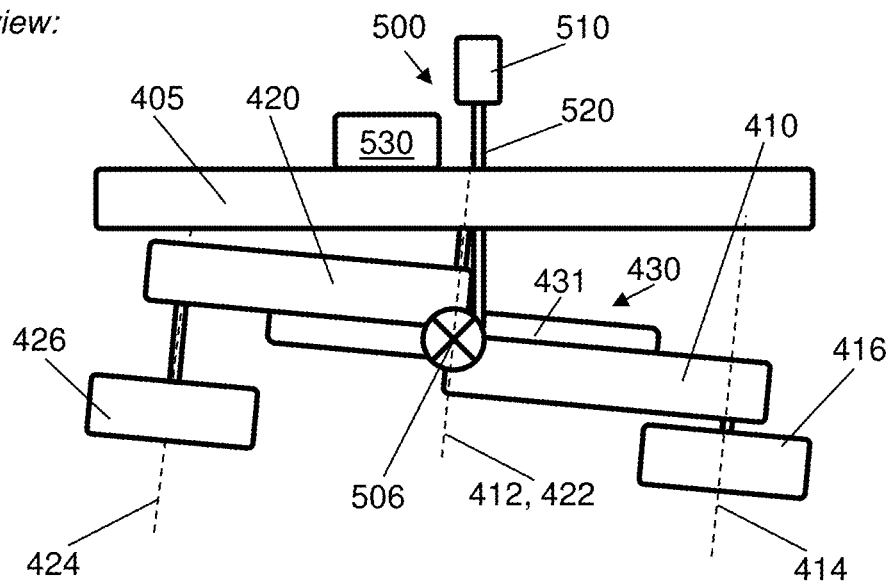
Figure 5H:
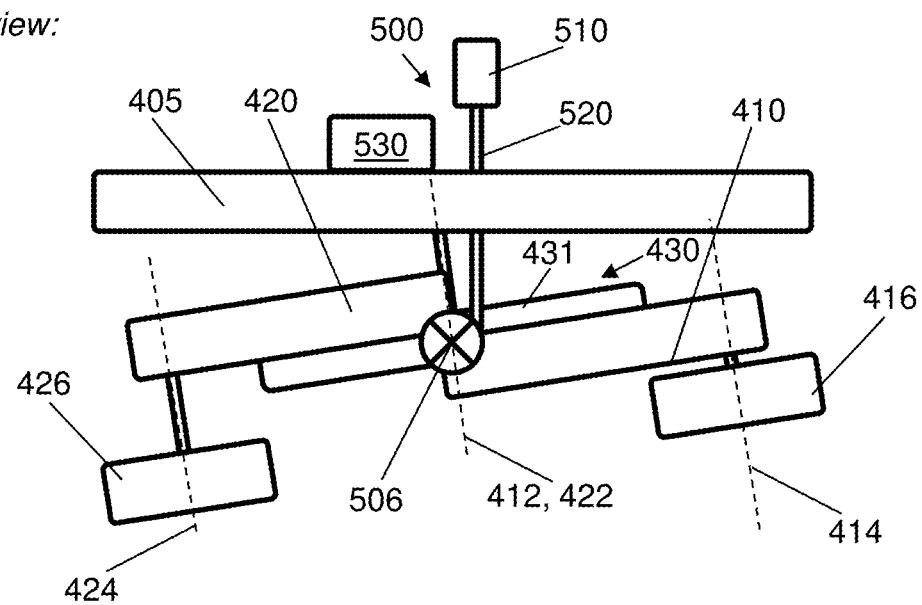

FIGS. 5A and 5E show a schematic side view of dual-axle vehicle corner assembly 400. FIGS. 5B, 5C, 5D and 5F, 5G, 5H show a schematic top view of dual-axle vehicle corner assembly 400.

Dual-axle vehicle corner assembly 400 may include a steering system 500. Steering system 500 may steer each of first connector 416 and second connector 426 about its respective steering axis relative to first arm 410 and second arm 420, respectively (e.g. as shown in FIGS. 5A-5D) or steer both first arm 410 and second arm 420 about a common steering axis relative to sub-frame 405 (e.g. as shown in FIGS. 5E-5H).

In the example of FIGS. 5A-5D, steering system 500 steers first connector 416 relative to first arm 410 about a first steering axis 502. First steering axis 502 may be, for example, perpendicular (or substantially perpendicular) to first axle axis 414. In some embodiments, first steering axis 502 is a first caster angle with respect to first axle axis 414. In the same example, steering system 500 may steer second connector 426 relative to second arm 420 about a second steering axis 504. Second steering axis 504 may be, for example, perpendicular (or substantially perpendicular) to second axle axis 424. In some embodiments, second steering axis 504 is a second caster angle with respect to second axle axis 424.

In some embodiments, steering system 500 simultaneously (or substantially simultaneously) steers first connector 416 and second connector 426 about first steering axis 502 and second steering axis 504, respectively. In some embodiments, steering system 500 simultaneously steers first connector 416 and second connector 426 about first steering axis 502 and second steering axis 504, respectively, in the same direction. In some embodiments, steering system 500 steers first connector 416 and second connector 426 to the same (or substantially the same) steering angle. In some embodiments, steering system 500 steers first connector 416 and second connector 426 to different steering angles as compared to each other. For example, steering system 500 may steer first connector 416 to a first steering angle and steer second connector 426 to a second steering angle that is different from the first steering angle. The first steering angle and/or the second steering angle may be predetermined based on, for example, a geometry of a vehicle chassis platform assembled with the vehicle corner system. For example, the first steering angle and/or the second steering angle may be a predetermined Ackermann angle. In another example, the first steering angle and/or the second steering angle may be dynamically dictated or defined by a dynamic turning center point of the vehicle platform assembled with dual-axle vehicle corner assembly 400.

In some embodiments, steering unit 500 provides first connector 416 and second connector 426 with different steering characteristics or parameters. In various embodiments, steering system 500 steers first connector 416 and second connector 426 at different steering rates, to different steering angles and/or in different steering directions. For example, steering system 500 may steer first connector 416 and second connector 426 in different steering directions to cause the vehicle platform assembled with dual-axle vehicle corner assembly 400 brake and/or stabilize the vehicle platform on the ground surface.

In the example of FIGS. 5E-5H, steering system 500 steers first arm 410 and the second arm 420 about a common steering axis 506 relative to sub-frame 405. Common steering axis 506 may be positioned between first axle axis 414 and second axle axis 426 (e.g. as shown in FIGS. 5E-5H).

Steering system 500 may include one or more steering actuators 510 and a steering linkage 520 including one or more steering rods to (i) steer each of first connector 416 and second connector 426 about its respective steering axis 502, 504, respectively, or (ii) steer first arm 410 and second arm 420 about common steering axis 508 (e.g. as described hereinabove). Various numbers of steering actuators 510 and various configurations of steering linkages 520 may be used.

In some embodiments, steering system 500 includes a controller 530 to control steering actuator(s) 510. Controller 530 may control steering actuator(s) 510 based on, e.g. input signals the central controller of the vehicle platform.

It is noted that steering system 500 may be used with each of embodiments described above with respect to FIGS. 1A-1K or FIGS. 2A-2F.

Figure 6A:
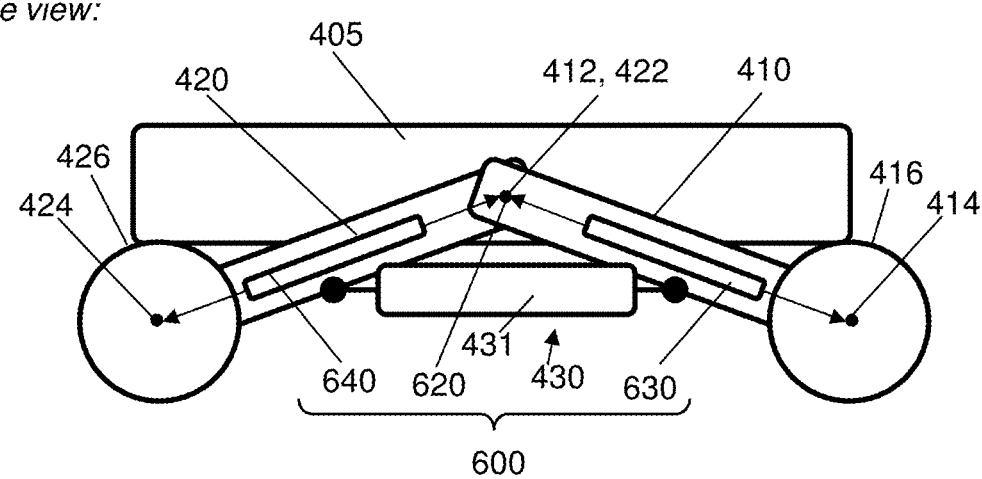
FIGS. 6A and 6B are schematic illustrations of a dual-axle vehicle corner assembly including a drivetrain system, according to some embodiments of the invention.
Figure 6B:
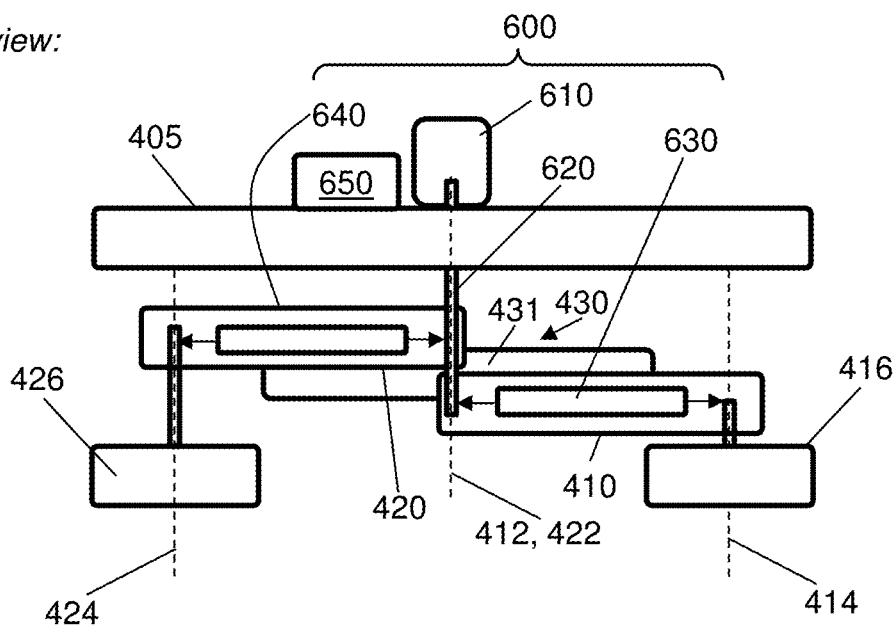

Reference is now made to FIGS. 6A and 6B, which are schematic illustrations of dual-axle vehicle corner assembly 400 including a drivetrain system 600, according to some embodiments of the invention. FIG. 6A shows a schematic side view of dual-axle vehicle corner assembly 400. FIG. 6B shows a schematic top view of dual-axle vehicle corner assembly 400.

Dual-axle vehicle corner assembly 400 may include a drivetrain system 600 (e.g. such as drivetrain unit 190 or 290 described above). Drivetrain system 600 may include a drivetrain motor 610. Drivetrain motor 610 may be connected to, for example, sub-frame 405. For example, (i) drivetrain motor 610 and (ii) first arm 410 and second arm 420 may be positioned at opposing sides of sub-frame 405 with respect to each other (e.g. as shown in FIGS. 6A and 6B).

Drivetrain system 600 may include a drivetrain shaft 620 connected to drivetrain motor 610. If first arm axis 412 and second arm axis 422 coincide with each other, drivetrain shaft 620 may be positioned along first and second arm axes 412, 422 (e.g. as shown in FIGS. 6A and 6B).

Drivetrain system 600 may include a drivetrain transmission 630 (e.g. a first drivetrain transmission, such as transmission unit 196a described above). Drivetrain transmission 630 may transmit rotations from drivetrain motor 610 to first connector 416 or first wheel 92. In some embodiments, drivetrain transmission 630 is positioned within first arm 410 (e.g. as described above with respect to FIG. 1K and as schematically shown in FIGS. 6A and 6B). For example, first arm 410 may include a casing or housing to accommodate drivetrain transmission 630.

Drivetrain system 600 may include a drivetrain transmission 640 (e.g. a second drivetrain transmission, such as transmission unit 196b as described above). Drivetrain transmission 640 may transmit rotations from drivetrain motor 610 to second connector 426 or second wheel 94. In some embodiments, drivetrain transmission 640 is positioned within second arm 420 (e.g. as described above with respect to FIG. 1K and as schematically shown in FIGS. 6A and 6B). For example, second arm 420 may include a casing or housing to accommodate drivetrain transmission 640.

Figure 7A:
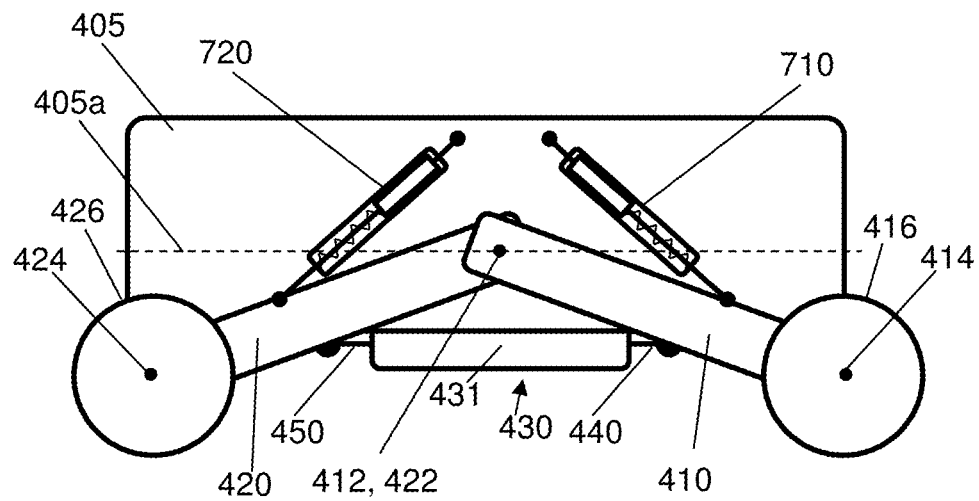
FIGS. 7A and 7B are schematic illustrations of a dual-axle vehicle corner assembly including two motion restrainers, according to some embodiments of the invention.
Figure 7B:
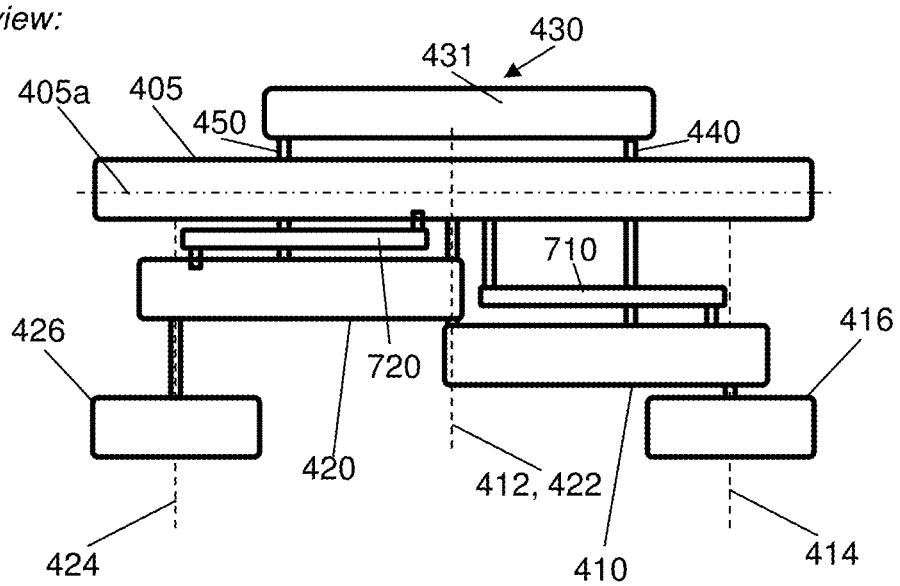
Figure 7C:
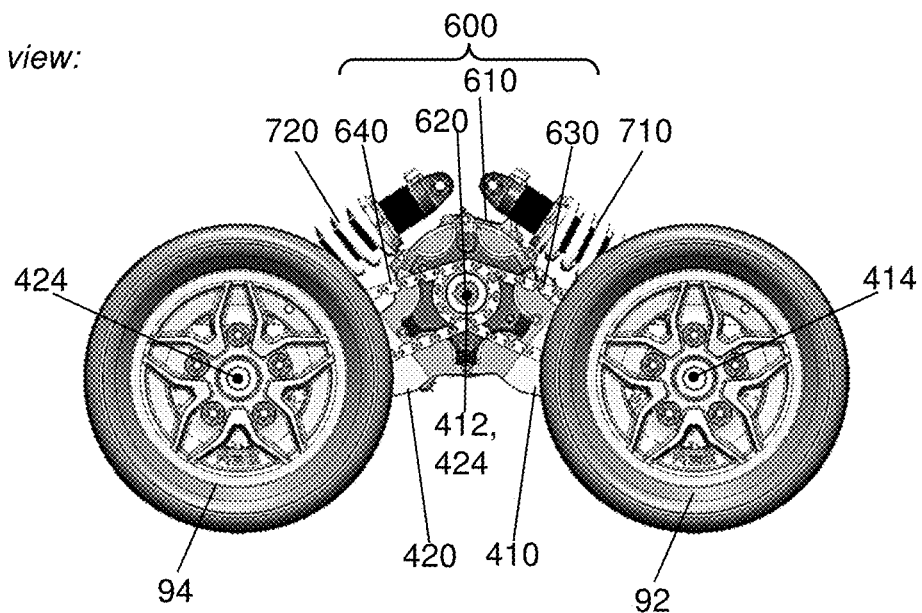
FIGS. 7C and 7D are two-dimensional diagrams of a dual-axle vehicle corner assembly including the drivetrain system and two motion restrainers, and of wheels connected to the dual-axle vehicle corner assembly, according to some embodiments of the invention.
Figure 7D:
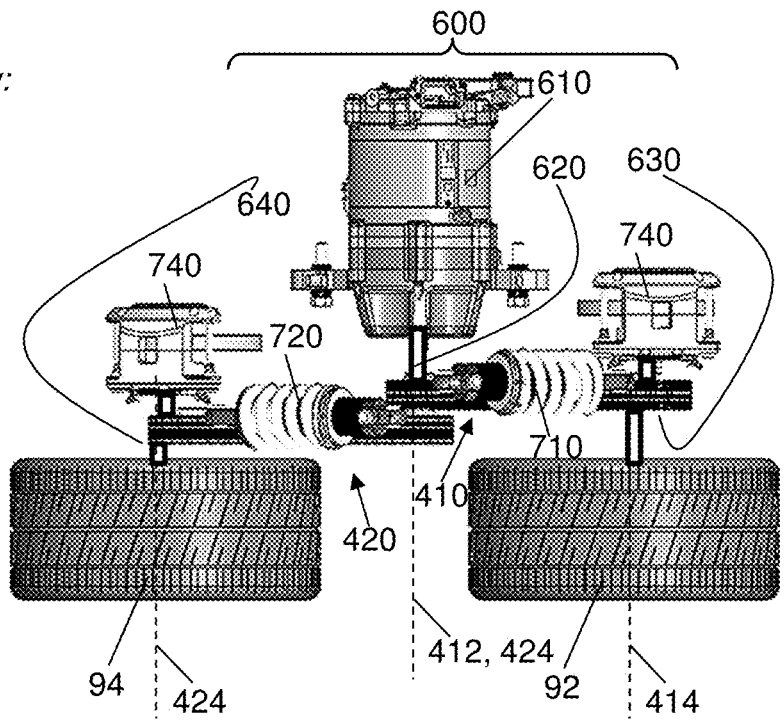

First drivetrain transmission 630 and/or second drivetrain transmission 640 may each include one or more of transmission shafts, gears, belts, and chains (e.g. as shown in FIGS. 7C and 7D). In various embodiments, first drivetrain transmission 630 and/or second drivetrain transmission 640 includes two or more meshed gears. In various embodiments, first drivetrain transmission 630 and/or second drivetrain transmission 640 includes an odd number of meshed gears. In various embodiments, first drivetrain transmission 630 and/or second drivetrain transmission 640 includes two or more gears having different diameters. In various embodiments, first drivetrain transmission 630 and/or second drivetrain transmission 640 includes a drivetrain shaft that is transverse to drivetrain shaft 620 that is connected to drivetrain motor 610. In various embodiments first drivetrain transmission 630 and/or second drivetrain transmission 640 function as a rotational speed reduction mechanism (e.g. between the motor and the wheel connector).

Drivetrain system 600 may include a controller 650. Controller 650 may control drivetrain motor 610. Controller 650 may control drivetrain motor 610 based on, for example, on input signals from the central controller of the vehicle platform.

Reference is now made to FIGS. 7A and 7B, which are schematic illustrations of dual-axle vehicle corner assembly 400 including two shock absorbers 710, 720, according to some embodiments of the invention. FIG. 7A shows a schematic side view of dual-axle vehicle corner assembly 400. FIG. 7B shows a schematic top view of dual-axle vehicle corner assembly 400.

Reference is also made to FIGS. 7C and 7D, which are two-dimensional (2D) diagrams of dual-axle vehicle corner assembly 400 including drivetrain system 600 and two motion restrainers 710, 720, and of wheels 92, 94 connected to dual-axle vehicle corner assembly 400, according to some embodiments of the invention.

Figure 7E:
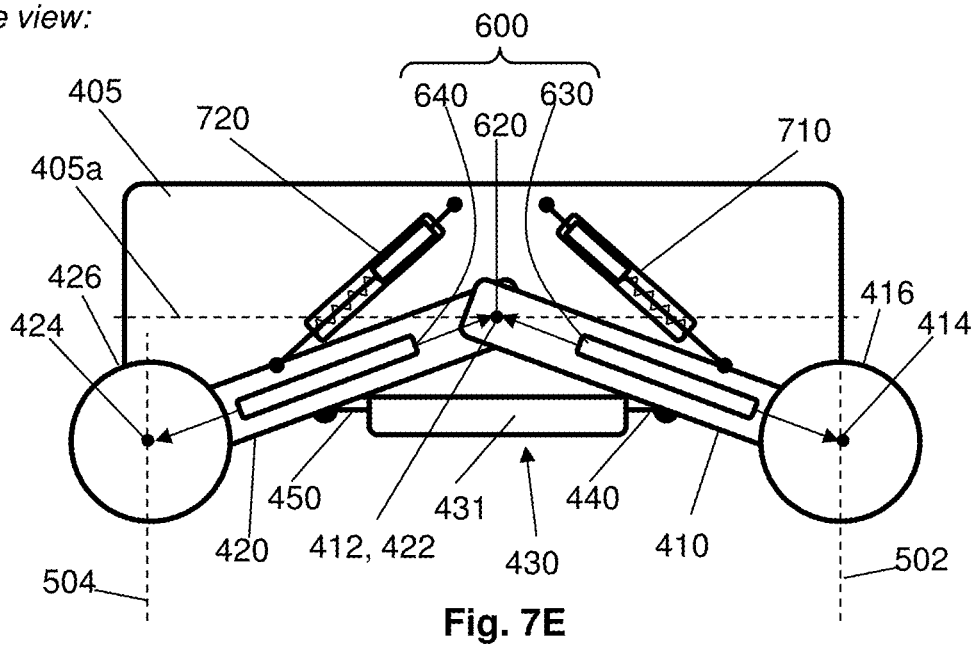
FIGS. 7E and 7F are schematic illustrations of a dual-axle vehicle corner assembly including the steering system, the drivetrain system and two motion restrainers, according to some embodiments of the invention.
Figure 7F:
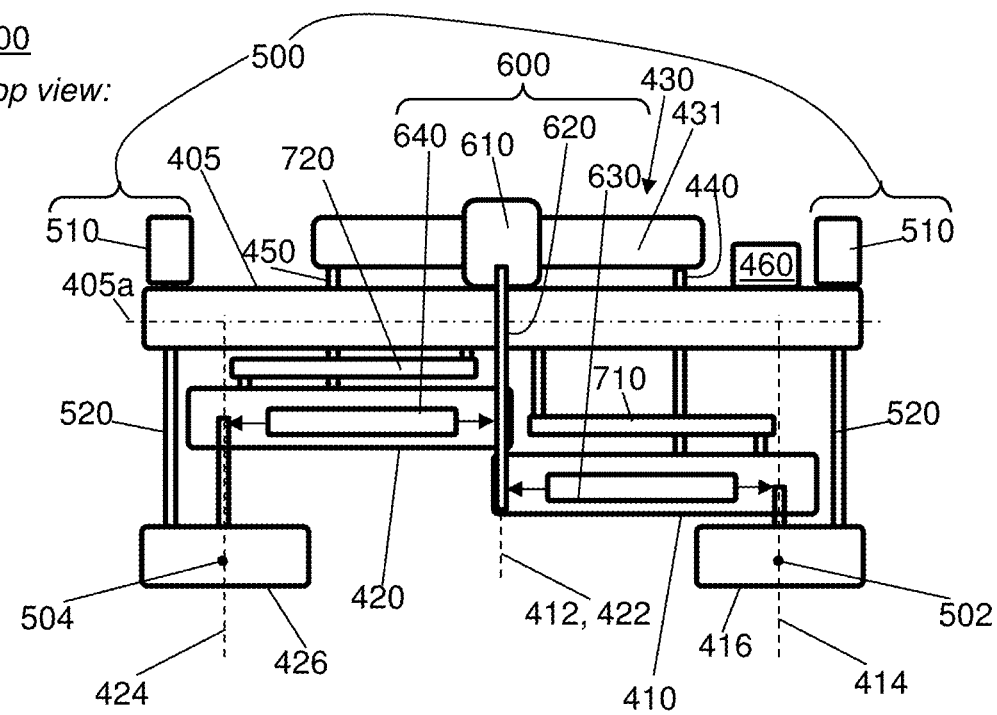

Reference is also made to FIGS. 7E and 7F, which are schematic illustrations of dual-axle vehicle corner assembly 400 including steering system 500, drivetrain system 600 and motion restrainers 710, 720, according to some embodiments of the invention. FIG. 7E shows a schematic side view of dual-axle vehicle corner assembly 400. FIG. 7F shows a schematic top view of dual-axle vehicle corner assembly 400.

Dual-axle vehicle corner assembly 400 may include a first motion restrainer 710 connected (e.g. rotatably connected) to first arm 410 and connected (e.g. rotatably connected) to sub-frame 405, and a second motion restrainer 720 connected (e.g. rotatably connected) to second arm 420 and connected (e.g. rotatably connected) to sub-frame 405.

First motion restrainer 710 may be perpendicular (or substantially perpendicular) to first arm axis 412 and to first axle axis 414. Second motion restrainer 720 may be perpendicular (or substantially perpendicular) to second arm axis 422 and to second axle axis 424. In some embodiments, first motion restrainer 710 is parallel to longitudinal axis 405a of sub-frame 405. In some embodiments, second motion restrainer 720 is parallel to longitudinal axis 405a of sub-frame 405. In some embodiments, first motion restrainer 710 is parallel (or substantially parallel) to first arm 410. In some embodiments, second motion restrainer 720 is parallel (or substantially parallel) to second arm 420. In some embodiments, first motion restrainer 710 is positioned within first arm 410. In some embodiments, second motion restrainer 720 is positioned within second arm 420.

Each of first motion restrainer 710 and second motion restrainer 720 may, include a damper, a spring damper, a shock absorber, a pneumatic absorber, a fluid absorber, a magnetic absorber, or any other motion restraining component known in the art.

In some embodiments, (i) suspension system 430 and (ii) first motion restrainer 710 and second motion restrainer 720 are positioned at opposing sides of sub-frame 405 with respect to each other (e.g. as shown in FIGS. 7A and 7B). In some embodiments, suspension system 430, first motion restrainer 710 and second motion restrainer 720 are positioned at the same side of sub-frame 405.

First and second motion restrainers 710, 720 may absorb and/or damp the relative motion of first and second arms 410, 420, respectively, with respect to sub-frame 405 (and with respect to the vehicle platform when assembly 400 is assembled to the vehicle platform). First and second motion restrainers 710, 720 may, e.g. apply forces on first and second arm 410, 420, respectively, and push wheels connected to first and second arm 410, 420, respectively, to the ground surface. By pushing the wheels to the ground surface, first and second motion restrainers 710, 720 may maintain a traction of wheels with the ground surface when, for example, one of the wheels lowers with respect to the other wheel and/or drops away of sub-frame 405 or the vehicle platform, e.g. due to a bump or a hole on the ground surface.

Dual-axle vehicle corner assembly 400 may include any combination of suspension system 430, steering system 500, drivetrain system 600 and/or motion restrainers 710, 720 disclosed herein. For example, dual-axle vehicle corner assembly 400 may include suspension system 430 having a kneeling/lifting function, and two motion restrainers 710, 720 (e.g. as shown in FIGS. 7A-7B). In another example, dual-axle vehicle corner assembly 400 may include suspension system 430 having a kneeling/lifting function, drivetrain system 600 and two motion restrainers 710, 720 (e.g. as shown in FIGS. 7C-7D). Sub-frame 405 is not shown in FIGS. 7C and 7D for sake of clarity. In the same example, e.g. as shown in FIG. 7D, dual-axle vehicle corner assembly 400 includes a brake system 740 for each of wheel connectors 416, 426. In another example, FIGS. 7E and 7F show schematic illustrations of dual-axle vehicle corner assembly 400 including steering system 500, drivetrain system 600 and two motion restrainers 710, 720. Other combinations of embodiments of the invention are also possible.

In some embodiments, dual-axle vehicle corner assembly 400 includes a controller 460 (e.g., as shown in FIG. 7F) to control components of steering system 500 (e.g. steering actuator(s) 510) and drivetrain system 600 (e.g. drivetrain motor 610). The controller of dual-axle vehicle corner assembly 400 may, for example, replace or may be used in addition to controllers 535, 650 of steering system 500 and drivetrain system 600, respectively.

The following illustrations/description depict embodiments of the suspension system for dual-axle vehicle corner assembly 400 (e.g. such as suspension system 430 described above). Each of embodiments of the suspension system may be included in dual-axle vehicle corner assembly 400 in any combination with steering system 500 and drivetrain system 600 described above. Each of the embodiments of the suspension system may include features from other embodiments of the suspension system presented, and embodiments of the suspension system not specifically described may include various features described herein.

Figure 8A:
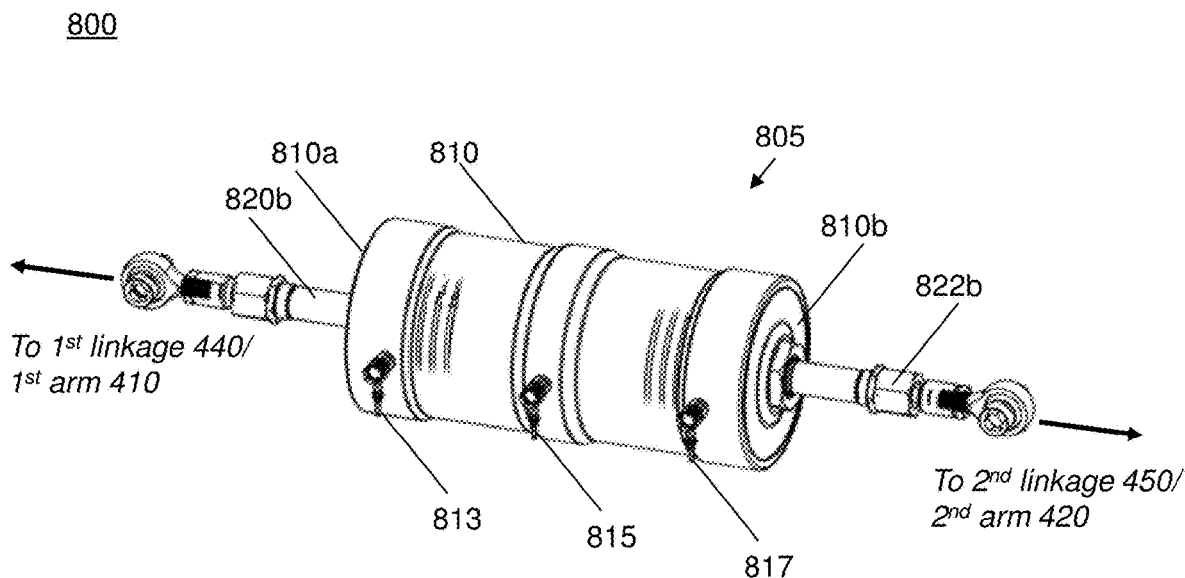
FIGS. 8A and 8B, which are 3D diagrams of a piston assembly of a suspension system for a dual-axle vehicle corner assembly, according to some embodiments of the invention.
Figure 8B:
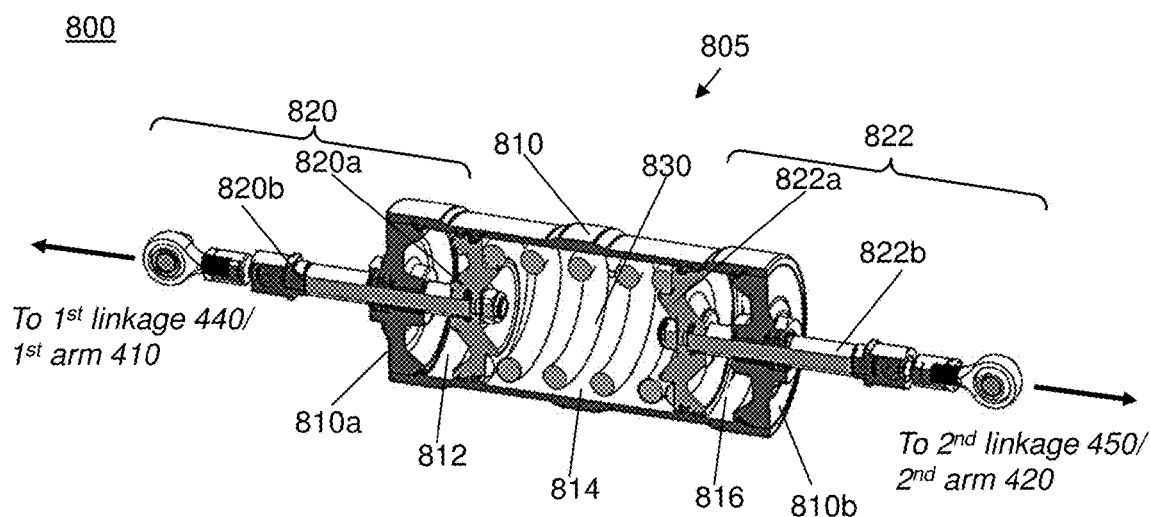

Reference is now made to FIGS. 8A and 8B, which are 3D diagrams of a piston assembly 805 of a suspension system 800 for dual-axle vehicle corner assembly 400, according to some embodiments of the invention. FIG. 8A shows a perspective view of piston assembly 805. FIG. 8B shows a partial section view of piston assembly 805.

Figure 8C:
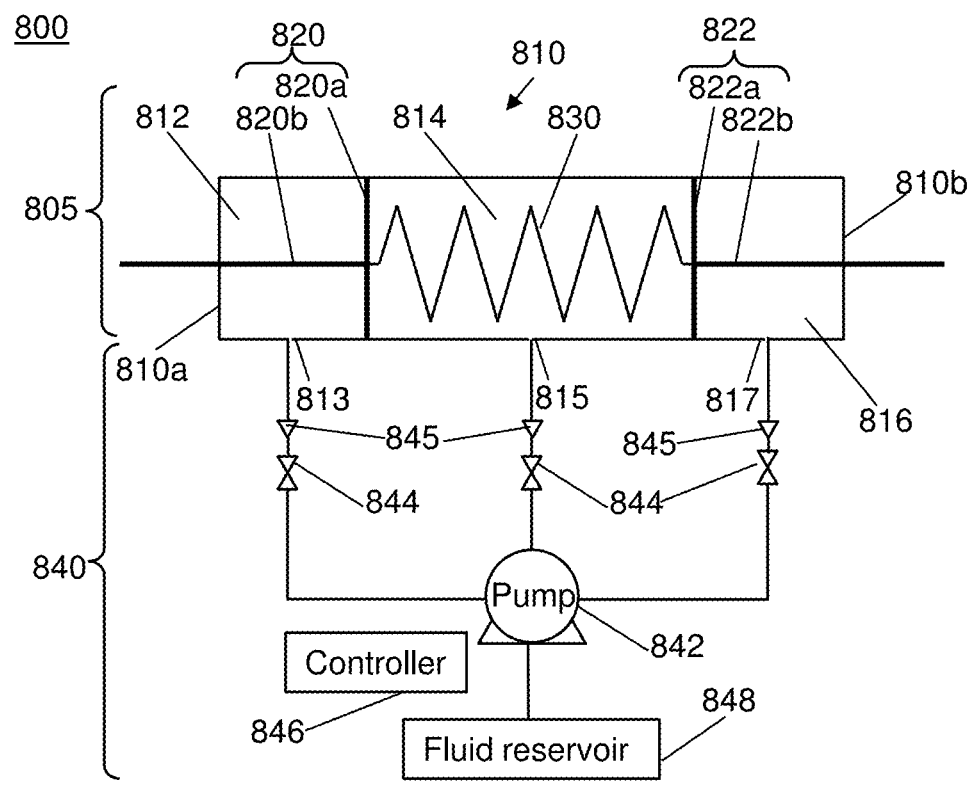
FIG. 8C is a schematic illustration of the piston assembly of FIGS. 8A-8B and a fluid supply subsystem, according to some embodiments of the invention.

Reference is also made to FIG. 8C, which is a schematic illustration of piston assembly 805 of FIGS. 8A-8B and a fluid supply subsystem 840, according to some embodiments of the invention.

Suspension system 800 may be used as, for example, suspension system 430 in dual-axle vehicle corner assembly 400 (e.g. as described above with respect to FIGS. 4A-4F).

Suspension system 800 may include a piston assembly 805. Piston assembly 805 may include a housing 810, a first piston 820 positioned within housing 810 and a second piston 822 positioned within housing 810 and forming a first fluid chamber 812, a second fluid chamber 814 and a third fluid chamber 816 in housing 810. First fluid chamber 812 may be formed between a head 820a of first piston 820 and a first end 810a of housing 810, second fluid chamber 814 may be formed between first piston head 820a and a head 822a of second piston 822, and third fluid chamber 816 may be formed between second piston head 822a and a second end 810b of housing 810. First and second piston heads 820a, 820b may be sealed with respect to internal surface of housing 810. First piston 820, e.g. a shaft 820b of first piston 820 extending externally from housing 810, may be connected to first arm 410, e.g. via first linkage 440. Second piston 822, e.g. a shaft 822b of second piston 822 extending externally from housing 810, may be connected to second arm 420, e.g. via second linkage 450.

Various configurations of first and second linkages 440, 450 may be used to connect suspension system 800 to first arm 410 and second arm 420 (e.g. as described above with respect to FIGS. 4A-4D).

Suspension system 800 may include a spring 830 positioned within second fluid chamber 814 of housing 810 between first fluid chamber 812 and third fluid chamber 816, e.g. between first piston head 820a and second piston head 822a (e.g., as shown in FIGS. 8B and 8C).

Fluid chambers 812, 814, 816 may each contain a fluid. A volume of each of first chamber 812, second chamber 814 and third chamber 816 may be defined by relative positions of first piston 820 and second piston 822 in housing 810. The volume of each of first chamber 812, second chamber 814 and third chamber 816 may change based on the fluid pressure within the respective chamber and the fluid pressure within adjacent chambers. For example, at least one of first fluid chamber 812, second fluid chamber 814 and third fluid chamber 816 may include a port to introduce and/or expel fluid from the respective chamber. In the example of FIGS. 8A and 8B, first fluid chamber 812 includes a first fluid chamber port 813, second fluid chamber 814 includes a second fluid chamber port 815, and third fluid chamber 816 includes a third fluid chamber port 817 to introduce and/or expel fluid from the respective chamber. In some embodiments, at least one of first fluid chamber 812, second fluid chamber 814 and third fluid chamber 816 contains fluid that is different from fluids contained within at least one another fluid chamber. For example, first fluid chamber 812 and third fluid chamber 816 may contain a first fluid and second fluid chamber 814 may contain a second fluid. The fluid(s) may be, for example, gas(s), e.g. an air. In another example, the fluid(s) may be uncompressible (or substantially uncompressible) liquid(s).

Suspension system 800 may include a fluid supply subsystem 840. Fluid supply subsystem 840 may control introduction of fluid to and/or expulsion of the fluid from at least one of first fluid chamber 812, second fluid chamber 814 and third fluid chamber 816 of housing 810.

Fluid supply subsystem 840 may include a fluid pump 842, fluid valves 844 and a controller 846 to control inflow and outflow of the fluid to/from chambers 812, 814, 816 of housing 810. Controller 846 may control fluid pump 842 and fluid valves 844 based on input signals from, for example, the central controller of the vehicle platform. Controller 846 may control fluid pump 842 to, for example, compress the fluid in at least one fluid chamber of first chamber 812, second chamber 814 and third chamber 816. Controller 846 may control fluid pump 842 to, for example, release fluid in at least one fluid chamber of first chamber 812, second chamber 814 and third chamber 816. Controller 846 may control fluid pump 842 to, for example, compress fluid in at least one fluid chamber of first chamber 812, second chamber 814 and third chamber 816 and release fluid in at least one another fluid chamber of first chamber 812, second chamber 814 and third chamber 816.

In some embodiments, fluid supply subsystem 840 includes fluid release valves 845 to release fluid from first chamber 812, second chamber 814 and third chamber 816 external to fluid supply subsystem 820.

In various embodiments, first chamber 812, second chamber 814 and/or third chamber 816 includes a bypass port to provide direct access to the respective chamber (and not via fluid supply subsystem 840). The bypass port(s) may be used in the case of, for example, a fault in fluid supply subsystem 840.

In some embodiments, fluid supply subsystem 840 includes a fluid reservoir 848. In some embodiments, fluid supply subsystem 840 includes two or more fluid pumps and two or more fluid reservoirs (e.g. if different fluids are used in different fluid chambers).

In operation, e.g. when suspension system 800 is assembled within dual-axle vehicle corner assembly 400, first and second pistons 820 and 822 may move with respect to housing 810 of piston assembly 805 to support and control relative motion of first and second arms 410, 420 with respect to each other and with respect to sub-frame 405 and/or control and distribute loads between first and second arms 410, 420 of dual-axle vehicle corner assembly 400.

In operation, controller 846 may control inflow and outflow of the fluid to and from fluid chambers 812, 814, 816 of housing 810 to control a spring rate of spring 830. The spring rate of spring 830 may, for example define suspension parameters or characteristics of suspension system 800 (e.g. such as suspension stiffness or any other parameter known in the art). The desired spring rate of spring 830 may be dictated by, for example, a desired height of the vehicle platform relative to the ground (e.g. kneeling), vehicle platform speed, vehicle platform load, desired suspension performance and stiffness, vehicle platform condition (e.g., parking, off road motion, high speed motion and/or low speed motion) or any other parameter known in the art. Accordingly, by controlling inflow and outflow of the fluid to and from fluid chambers 812, 814, 816 of housing 810, controller 846 may control suspension parameters or characteristics of suspension system 800.

In operation, controller 846 may control inflow and outflow of the fluid to and from fluid chambers 812, 814, 816 of housing 810 to control a distance between the connection points of first and second pistons 820, 822 to first and second linkages 440, 450, respectively (e.g. the length of piston assembly 805). The distance between the connection points of first and second pistons 820, 822 to first and second linkages 440, 450, respectively, may define the distance between first and second axle axes 414, 424 of dual-axle vehicle corner assembly 400 (e.g. as described above with respect to FIGS. 4E-4F). Accordingly, by controlling inflow and outflow of the fluid from fluid chambers 812, 814, 816 of housing 810, controller 846 may control the distance between first and second axle axes 414, 424 of dual-axle vehicle corner assembly 400 and control the height of dual-axle vehicle corner assembly 400 and of the vehicle platform relative to the ground.

Figure 9A:
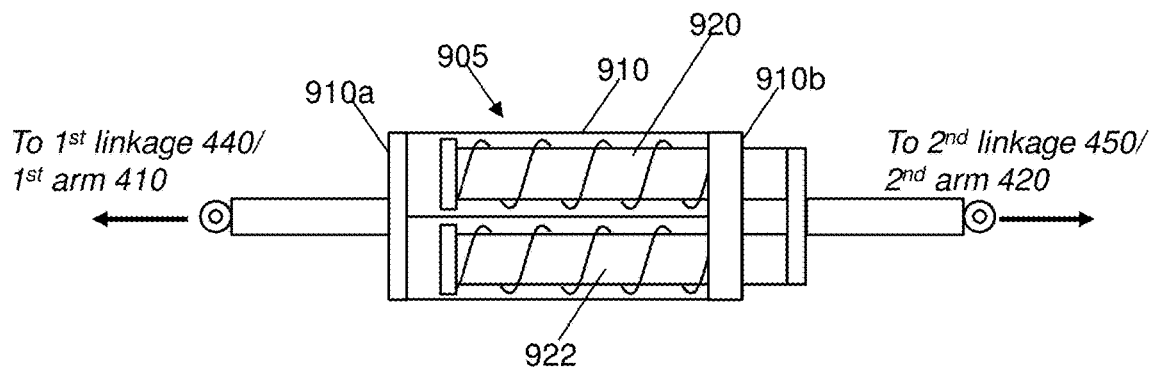
FIGS. 9A, 9B and 9C are schematic illustrations of a suspension system for a dual-axle vehicle corner assembly, the suspension system including a housing accommodating two or more parallel spring-loaded members, according to some embodiments of the invention.
Figure 9B:
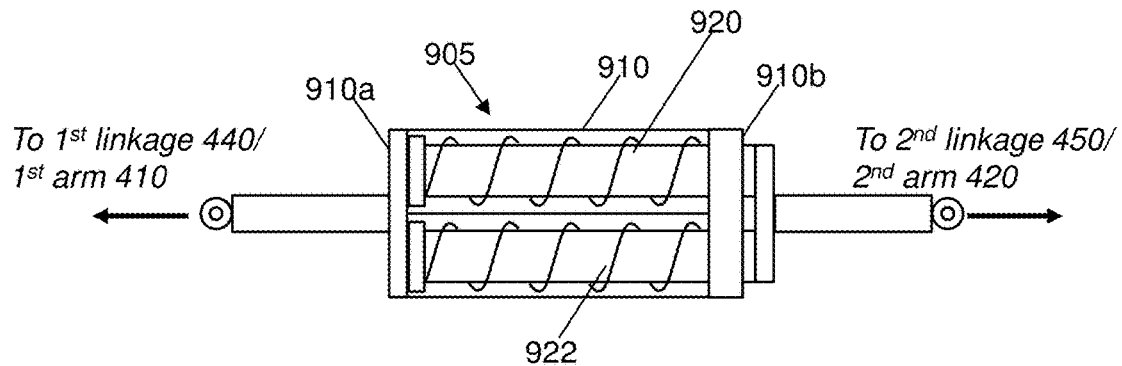
Figure 9C:
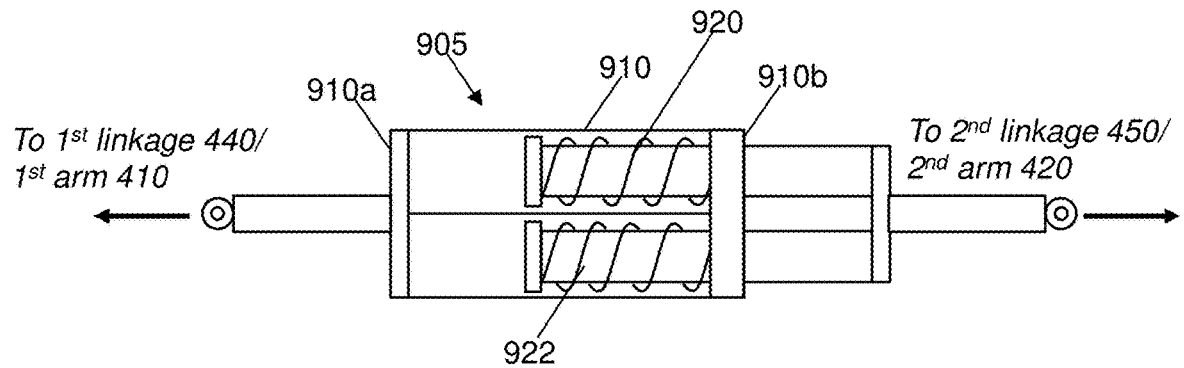

Reference is now made to FIGS. 9A, 9B and 9C, which are schematic illustrations of a suspension system 900 for dual-axle vehicle corner assembly 400, suspension system 900 including a housing 910 accommodating two or more parallel spring-loaded members 920, 922, according to some embodiments of the invention. FIGS. 9A, 9B and 9C show a schematic side view of suspension system 900 at different positions of spring-loaded members 920, 922 within housing 910. The different positions of spring-loaded members 920, 922 within housing 910 may be caused by, e.g. motion of first and second arms 410, 420 during operation of dual-axle vehicle corner assembly 400.

Suspension system 900 may be used as, for example, suspension system 430 in dual-axle vehicle corner assembly 400 (e.g. as described above with respect to FIGS. 4A-4F).

Suspension system 900 may include a piston assembly 905. Piston assembly 905 may include a housing 910. Housing 910 may be connected at its first end 910a to first arm 410, e.g. via a first linkage 440. Piston assembly 905 may include a first spring-loaded member 920 and a second spring-loaded member 922 positioned within housing 910 and extending externally from housing 910 through a second end 910b of housing 910. First spring-loaded member 920 and second spring-loaded member 922 may be parallel to each other. First spring-loaded member 920 and second spring-loaded member 922 may be connected to second arm 420, e.g. via a second linkage 450.

Various configurations of first and second linkages 440, 450 may be used to connect suspension system 900 to first arm 410 and second arm 420 (e.g. as described above with respect to FIGS. 4A-4D).

In various embodiments, each of first spring-loaded member 920 and second spring-loaded member 922 includes a shock absorber.

In some embodiments, the springs of first spring-loaded member 920 and second spring-loaded member 922 are preloaded to set a distance between the connection points of housing 910 and spring-loaded members 920, 922 to first and second linkages 440, 450, respectively (e.g. the length of piston assembly 905).

Figure 9D:
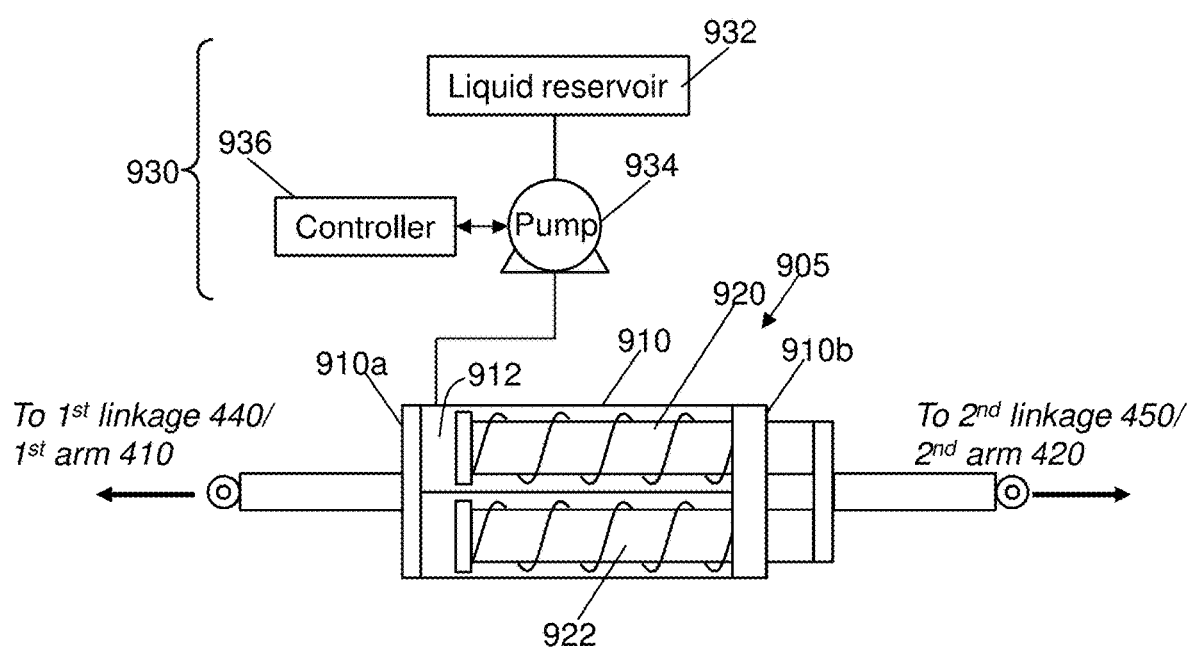
FIG. 9D is a schematic illustration of the suspension system of FIGS. 9A-9C including a hydraulic subsystem, according to some embodiments of the invention.

Reference is now made to FIG. 9D, which is a schematic illustration of suspension system 900 of FIGS. 9A-9C including a hydraulic subsystem 930, according to some embodiments of the invention.

First spring-loaded member 920 and second spring-loaded member 922 may be hydraulic pistons. Suspension system 900 may include a hydraulic subsystem 930 having a liquid reservoir 932 and a liquid pump 934. Liquid pump 934 may be in fluid communication with liquid reservoir 932 and with an interior 912 of housing 910. Liquid pump 934 may circulate the liquid between liquid reservoir 932 and interior 912 of housing 910. Hydraulic subsystem 930 may include a controller 936 to operate liquid pump 934 to control inflow and outflow of the liquid to and from interior 912 of housing 910. Hydraulic subsystem 930 may include any other components know in the art (e.g. such as valves, etc.).

In operation, e.g. when suspension system 900 is assembled within dual-axle vehicle corner assembly 400, first and second spring-loaded members 920, 922 may move with respect to housing 910 to support and control relative motion of first and second arms 410, 420 with respect to each other and with respect to sub-frame 405 and/or control and distribute loads between first and second arms 410, 420 of dual-axle vehicle corner assembly 400.

In operation, controller 936 may control inflow and outflow of the liquid to and from housing 910 to control suspension parameters or characteristics of suspension system 900 (e.g. such suspension stiffness or any other parameter known in the art).

In operation, controller 936 may control inflow and outflow of the liquid to and from housing 910 to control the distance between the connection points of housing 910 and spring-loaded members 920, 922 to first and second linkages 440, 450, respectively (e.g. the length of piston assembly 905). The distance between the connection points of housing 910 and spring-loaded members 920, 922 to first and second linkages 440, 450, respectively, may define the distance between first and second axle axes 414, 424 of dual-axle vehicle corner assembly 400. Accordingly, by controlling inflow and outflow of the liquid to and from housing 910, controller 936 may control the distance between first and second axle axes 414, 424 of dual-axle vehicle corner assembly 400 and control the height of dual-axle vehicle corner assembly 400 and of the vehicle platform relative to the ground.

Figure 10A:
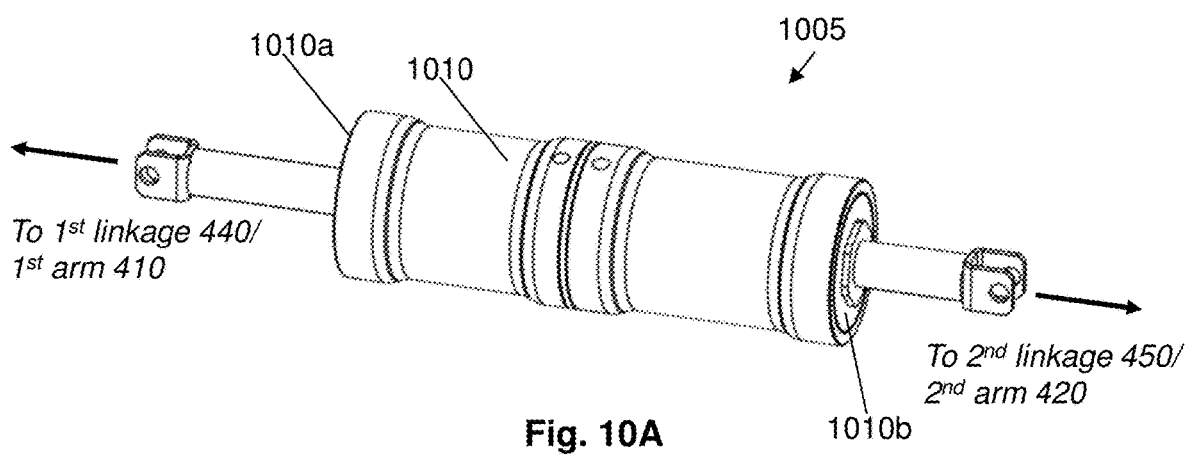
FIGS. 10A and 10B are 3D diagrams of a piston assembly of a suspension system for a dual-axle vehicle corner assembly, according to some embodiments of the invention.
Figure 10B:
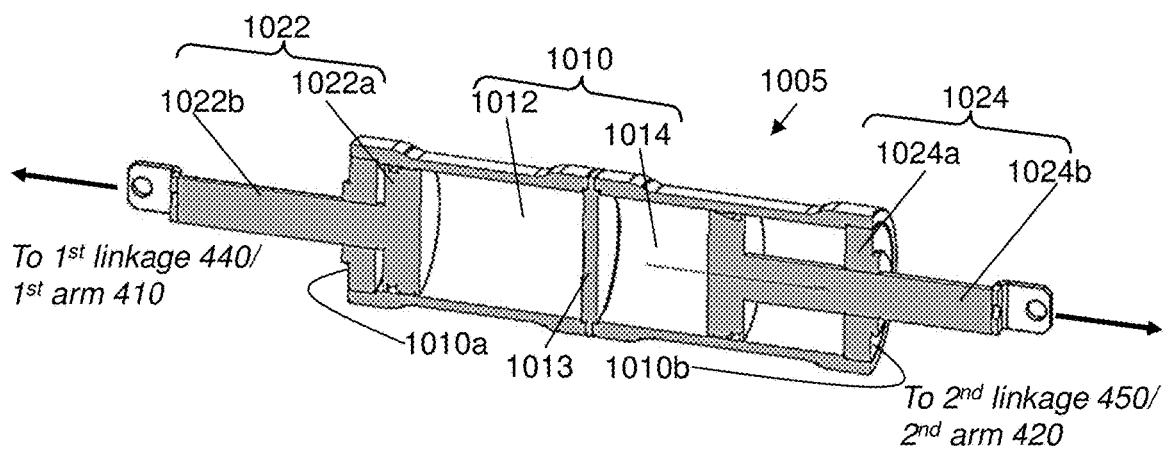

Reference is now made to FIGS. 10A and 10B, which are 3D diagrams of a piston assembly 1005 of a suspension system 1000 for dual-axle vehicle corner assembly 400, according to some embodiments of the invention. FIG. 10A shows a perspective view of suspension system 1000. FIG. 10B shows a partial section view of suspension system 1000.

Figure 10C:
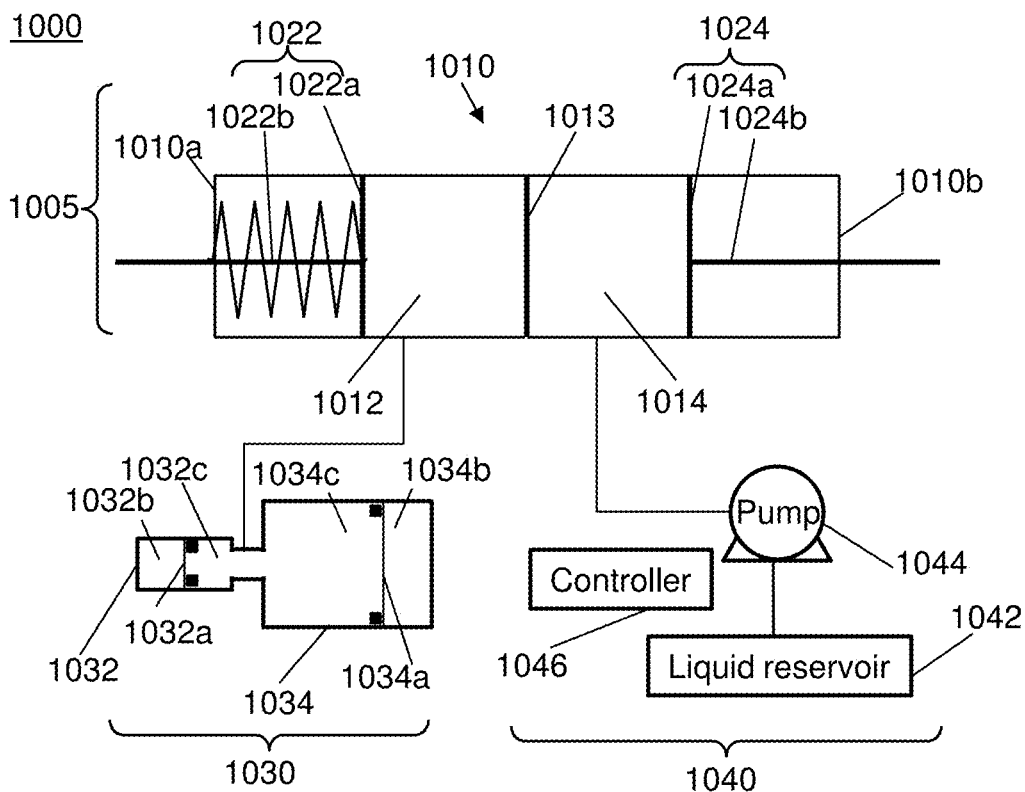
FIG. 10C is a schematic illustration of the piston assembly of FIGS. 10A-10B including a pressurizing subsystem and a hydraulic subsystem, according to some embodiments of the invention.

Reference is also made to FIG. 10C, which is a schematic illustration of piston assembly 1005 of FIGS. 10A-10B including a pressurizing subsystem 1030 and a hydraulic subsystem 1040, according to some embodiments of the invention.

Figure 10D:
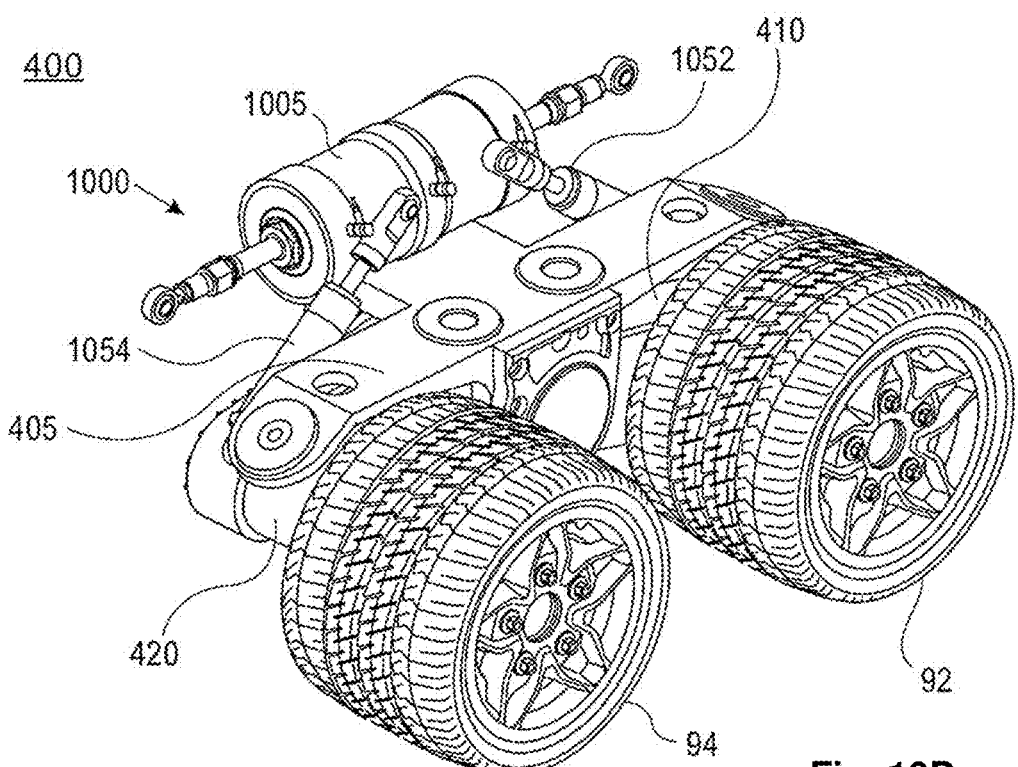
FIG. 10D is a 3D diagram of a dual-axle vehicle corner assembly including a suspension system of FIGS. 10A-10B, and of wheels connected to the dual-axle vehicle corner assembly, according to some embodiments of the invention.

Reference is also made to FIG. 10D, which is a 3D diagram of dual-axle vehicle corner assembly 400 including suspension system 1000 of FIGS. 10A-10C, and of wheels 92, 94 connected to dual-axle vehicle corner assembly 400, according to some embodiments of the invention. FIG. 10D shows a perspective view of dual-axle vehicle corner assembly 400. Some components of dual-axle vehicle corner assembly 400 (e.g. such as first and second linkages 440, 450) are not show in FIG. 10D for sake of clarity.

Piston assembly 1005 may include a housing 1010. Housing 1010 may include a first chamber 1012 and a second chamber 1014. First and second chambers 1012, 1014 may be separated by, for example, an internal wall 1013. First piston 1022, e.g. a head 1022*a* of first piston 1022, may be positioned within first chamber 1012 of housing 1010. First piston 1022, e.g. a shaft 1022*b* of first piston 1022 extending externally from housing 1010 through a first end 1010*a* of housing 1010, may be connected to first arm 410, e.g. via first linkage 440. First piston head 1022*a* may be sealed with respect to internal surface of housing 1010. In some embodiments, first piston 1022 is loaded with a spring 1022*c* (e.g., as schematically shown in FIG. 10C). Second piston 1024, e.g. a head 1024*a* of second piston 1022, may be positioned within second chamber 1014 of housing 1010. Second piston 1024, e.g. a shaft 1024*b* of second piston 1024 extending externally from housing 1010 through a second end 1010*b* of housing 1010, may be connected to second arm 420, e.g. via second linkage 450. Second piston head 1024*a* may be sealed with respect to internal surface of housing 1010.

Various configurations of first and second linkages 440, 450 may be used to connect suspension system 900 to first arm 410 and second arm 420 (e.g. as described above with respect to FIGS. 4A-4D).

Suspension system 1000 may include a pressurizing subsystem 1030. Pressurizing subsystem 1030 may include one or more accumulators containing a pressurized gas. The one or more accumulators may be in fluid communication with first chamber 1012 of housing 1010. Pressurizing subsystem 1030 may include a first accumulator 1032 and a second accumulator 1034 in fluid communication therebetween and in fluid communication with first chamber 1012 of housing 1010 (e.g. as shown in FIG. 10C). Each of first accumulator 1032 and second accumulator 1034 may contain a gas pressurized to a different pressure value than a gas pressure in another accumulator. For example, gas in first accumulator 1032 may be pressurized to a pressure of 1-3 Bar and gas in second accumulator 1034 may be pressurized to a pressure of 4-8 Bar. Other pressure values may be used.

First accumulator 1032 may include a piston 1032*a* that forms a first chamber 1032*b* and a second chamber 1032*c* at opposing sides of piston 1032*a*. Second accumulator 1034 may include a piston 1034*a* that forms a first chamber 1034*b* and a second chamber 1032*c* at opposing sides of piston 1034*a*. First chambers 1032*b*, 1034*b* of first and second accumulators 1032, 1034, respectively, may contain gas pre-pressurized to different pressure values with respect to each other (e.g. as described above). The gas in chambers 1032*b*, 1034*b* of first and second accumulators 1032, 1034, respectively, may be pre-pressurized to provide a desired spring or stiffness rate of first piston 1022 of piston assembly 1005 in operation (e.g. as described below). In some embodiments, first chamber 1012 of housing 1010 contains liquid. In some embodiments, a conduit interconnecting first chamber 1012 of housing 1010 and accumulators 1032, 1034 contains liquid. In some embodiments, second chambers 1032*c*, 1034*c* of first and second accumulators 1032, 1034, respectively, contain liquid.

Suspension system 1000 may include a hydraulic subsystem 1040. Hydraulic subsystem 1040 may include a liquid reservoir 1042 and a liquid pump 1044 in fluid communication with liquid reservoir 1042 and with second chamber 1014 of housing 1010. Liquid pump 1044 may introduce liquid to and expel liquid from second chamber 1014 of housing 1010. Hydraulic subsystem 1040 may include a controller 1046. Controller 1046 may control liquid pump 1044 to control inflow and outflow of the liquid to and from second chamber 1014 of housing 1010.

In operation, e.g. when suspension system 1000 is assembled within dual-axle vehicle corner assembly 400, first piston 1022 may move with respect to housing 1010 of piston assembly 1005 and may act as a spring causing suspension system 1000 to support and control relative motion of first and second arms 410, 420 with respect to each other and with respect to sub-frame 405 and/or control and distribute loads between first and second arms 410, 420 of dual-axle vehicle corner assembly 400. The spring rate or stiffness of first piston 1022 may be defined (or predefined) by pre-pressurized pressure values of gas contained within first chambers 1032*b*, 1034*b* of first and second accumulators 1032, 1034, respectively. The spring rate or stiffness of first piston 1022 may be, for example, constant (or substantially constant) and may provide linear (or substantially linear at least along a portion of the piston displacement) force-displacement curve of suspension system 1000. In another example, the spring rate or stiffness of first piston 1022 may vary as function of displacement of first piston 1022 with respect to housing 1010 of piston assembly 1005 and may provide a non-linear force-displacement curve of suspension system 1000. First and second accumulators 1032, 1034 may ensure continuous pressuring of first chamber 1012 accommodating first piston 1012. For example, if in operation piston 1032*a* of first accumulator 1032 has reached its maximal travel position or maximal pre-pressurized pressure value (e.g. when the pressure is equal to the pressure in another accumulator) and cannot move further, piston 1034*a* of second accumulator 1034 may still move and in second accumulator 1034 thus ensuring continuous pressuring of first chamber 1012 and providing first piston 1012 with the predefined spring rate or stiffness.

In some embodiments, suspension system 1000 includes a damper 1052 connected (e.g. rotatably connected) between first arm 410 and sub-frame 405 (e.g. as shown in FIG. 10D). In some embodiments, suspension system 1000 includes a damper 1054 connected (e.g. rotatably connected) between second arm 420 and sub-frame 405 (e.g. as shown in FIG. 10D). In operation, dampers 1052, 1054 may damp relative motion of first and second arms 410, 420 with respect to each other and with respect to sub-frame 405.

In operation, controller 1046 may control inflow and outflow of the liquid to and from second chamber 1014 of housing 1010 to control a position of second piston 1024 in second chamber 1014 of housing 1010 and thus control a distance between the connection points of first and second pistons 1022, 1024 with first and second linkages 440, 450, respectively (e.g. the length of piston assembly 1005). The distance between the connection points of first and second pistons 1022, 1024 to first and second linkages 440, 450, respectively, may define the distance between first and second axle axes 414, 424 of dual-axle vehicle corner assembly 400 (e.g. as described above with respect to FIGS. 4E-4F). Accordingly, by controlling inflow and outflow of the liquid to and from second chamber 1014 of housing 1010, controller 1046 may control the distance between first and second axle axes 414, 424 of dual-axle vehicle corner assembly 400 and control the height of dual-axle vehicle corner assembly 400 and of the vehicle platform relative to the ground (e.g. kneeling).

Figure 11A:
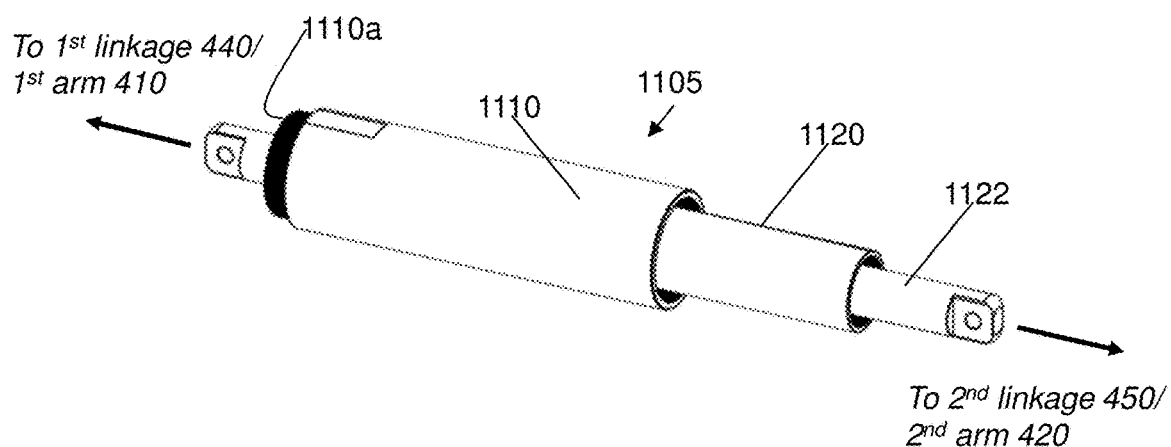
FIGS. 11A and 11B are 3D diagrams of a telescopic piston assembly of a suspension system for the dual-axle vehicle corner assembly, according to some embodiments of the invention.
Figure 11B:
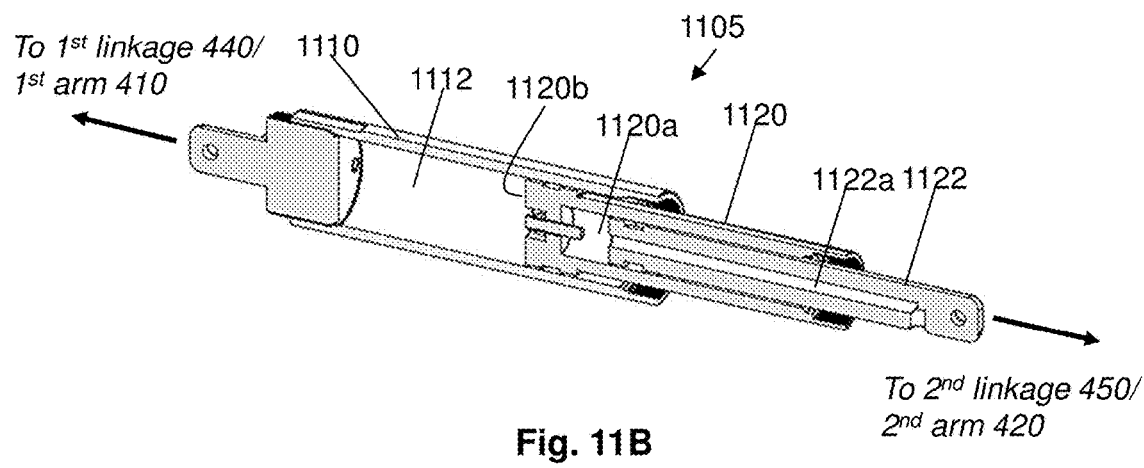

Reference is now made to FIGS. 11A and 11B, which are 3D diagrams of a telescopic piston assembly 1105 of a suspension system 1100 for dual-axle vehicle corner assembly 400, according to some embodiments of the invention.

FIG. 11A shows a perspective view of suspension system 1100. FIG. 11B shows a partial section view of suspension system 1100.

Telescopic piston assembly 1105 may include a housing 1110 having a housing cavity 1112. Housing 1110 may be connected, e.g. at its closed end 1110a, to first arm 410, e.g. via first linkage 440. Telescopic piston assembly 1105 may include a first piston 1120 positioned in housing cavity 1112. First piston 1120 may be sealed with respect to the internal surface of housing cavity 1112. First piston 1120 may include a first piston cavity 1120a having a closed end 1120b. Telescopic piston assembly 1105 may include a second piston 1122 positioned within first piston cavity 1120a. Second piston 1122 may be sealed with respect to the internal surface of first piston cavity 1120a. Second piston 1122 may be connected, e.g. at its end extending externally from first piston cavity 1120a, to second arm 420, e.g. via second linkage 450.

Figure 11C:
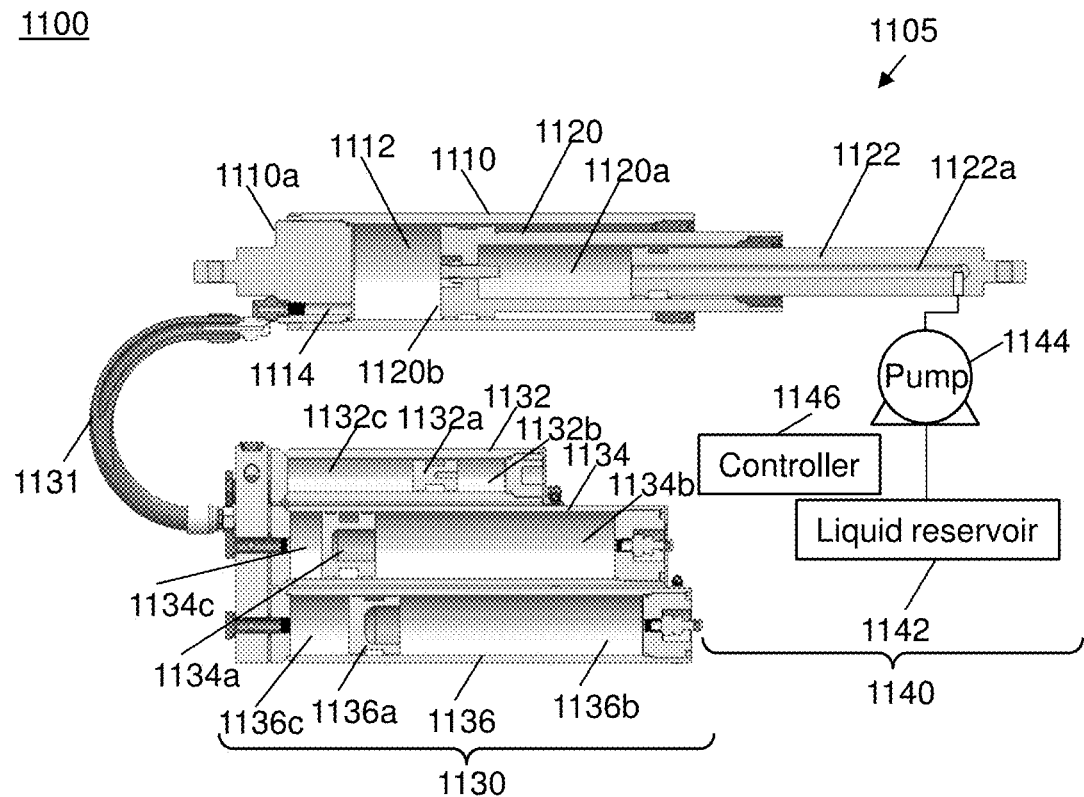
FIG. 11C is a two-dimensional (2D) diagram of a partial sectional view of the telescopic piston assembly of FIGS. 11A-11B and of the pressurizing subsystem, and a schematic illustration of a hydraulic subsystem, according to some embodiments of the invention.

Reference is also made to FIG. 11C, which is a 2D diagram of a partial sectional view of telescopic piston assembly 1105 of FIGS. 11A-11B and of a pressurizing subsystem 1130, and a schematic illustration of a hydraulic subsystem 1140, according to some embodiments of the invention. FIG. 11C shows a partial section view of piston assembly 1105 and a pressurizing subsystem 1130 and a schematic view of hydraulic subsystem 1140 of suspension system 1100.

Figure 11D:
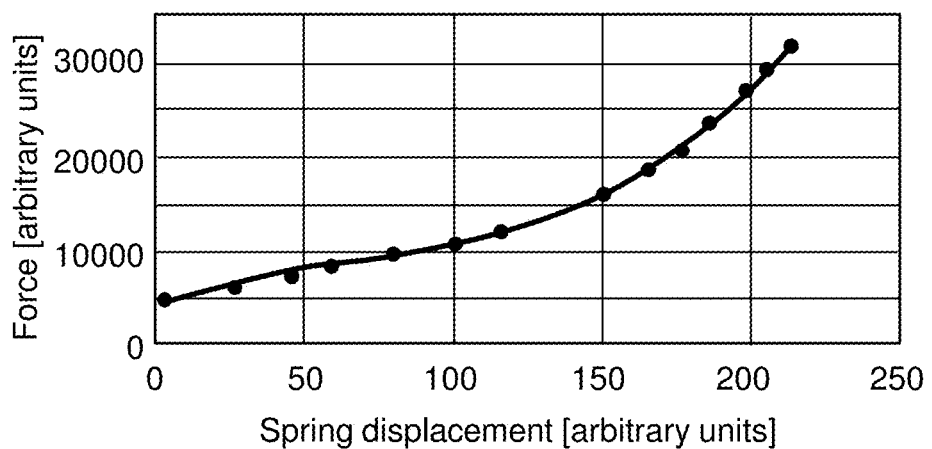
FIG. 11D is a graph showing an example of a force-displacement curve of the suspension system of FIG. 11C, according to some embodiments of the invention.

Reference is also made to FIG. 11D, which is a graph showing an example of a force-displacement curve of suspension system 1100 of FIG. 11C, according to some embodiments of the invention.

Suspension system 1100 may include a pressurizing subsystem 1130. Pressurizing subsystem 1130 may include one or more accumulators containing a pressurized gas. The one or more accumulators may be in fluid communication with housing cavity 1112, e.g. via a port 1114 in closed end 1110a of housing 1110. For example, pressurizing subsystem 1130 may include a first accumulator 1132, a second accumulator 1134 and a third accumulator 1136 in fluid communication with housing cavity 1112 (e.g. as shown in FIG. 11C). Each of first accumulator 1132, second accumulator 1134 and third accumulator 1136 may contain a gas pressurized to different pressure value than a gas in another accumulator. Accumulators 1132, 1134, 1136 may be positioned adjacent to and parallel to each other (e.g. as shown in FIG. 11C) to, for example, provide compact pressurizing system assembly.

First accumulator 1132 may include a piston 1132a that forms a first chamber 1132b and a second chamber 1132c in first accumulator 1132 at opposing sides of piston 1132a. Second accumulator 1134 may include a piston 1134a that forms a first chamber 1134b and a second chamber 1134c in second accumulator 1134 at opposing sides of piston 1134a. Third accumulator 1136 may include a piston 1136a that forms a first chamber 1136b and a second chamber 1136c in third accumulator 1136 at opposing sides of piston 1136a. First chambers 1132b, 1134b, 1136b of first, second and third accumulators 1132, 1134, 1136, respectively, may contain gas pre-pressurized to different pressure values with respect to each other (e.g. as described above). The gas in chambers 1132b, 1134b, 1136b of first, second and third accumulators 1132, 1134, 1136, respectively, may be pre-pressurized to provide a desired spring or stiffness rate of first piston 1120 of piston assembly 1105 in operation (e.g. as described below). In some embodiments, housing cavity 1112 contains liquid. In some embodiments, a conduit 1131 interconnecting housing cavity 1112 and accumulators 1132, 1134, 1136 contains liquid. In some embodiments, second chambers 1132c, 1134c, 1136c of first, second and third accumulators 1132, 1134, 1136, respectively, contain liquid.

Suspension system 1100 may include a hydraulic subsystem 1140. Hydraulic subsystem 1140 may include a liquid reservoir 1142 and a liquid pump 1144 in fluid communication with liquid reservoir 1142 and with first piston cavity 1120a, e.g. via a channel 1122a made through the length of second piston 1122 (e.g. as shown in FIG. 11C). Liquid pump 1144 may introduce liquid to and expel liquid from first piston cavity 1120a. Hydraulic subsystem 1140 may include a controller 1146. Controller 1146 may control liquid pump 1144 to control inflow and outflow of the liquid to and from first piston cavity 1120a.

In operation, e.g. when suspension system 1100 is assembled within dual-axle vehicle corner assembly 400, first piston 1120 may move with respect to housing 1110 of piston assembly 1105 and may act as a spring to support and control relative motion of first and second arms 410, 420 with respect to each other and with respect to sub-frame 405 and/or control and distribute loads between first and second arms 410, 420 of dual-axle vehicle corner assembly 400. The spring rate or stiffness of first piston 1120 may be defined (or predefined) by pre-pressurized pressure values of gas contained within first chambers 1132b, 1134b, 1136b of first, second and third accumulators 1132, 1134, 1136 respectively. The spring rate or stiffness of first piston 1120 may be, for example, constant (or substantially constant) and may provide linear (or substantially linear at least along a portion of the piston displacement) force-displacement curve of suspension system 1100. In another example, the spring rate or stiffness of first piston 1120 may vary as function of displacement of first piston 1120 with respect to housing 1110 of piston assembly 1105 and may provide a non-linear force-displacement curve of suspension system 1100 (e.g. as shown in FIG. 11D). First, second and third accumulators 1132, 1134, 1136 may ensure continuous pressuring of first piston housing cavity 1112 accommodating first piston 1120 and provide first piston 1120 with the pre-determined spring rate or stiffness.

Utilization of fluid accumulators 1132, 1134, 1136 in suspension system 1100 may cause first piston 1120 to act as a spring, thus, in some embodiments, eliminating a need in having coil springs in piston assembly 1105. Piston assembly 1105 that has no coil springs therein may be smaller and/or less complex as compared to piston assemblies having coil springs therein. Furthermore, coil springs typically have constant spring rate or stiffness while accumulators 1132, 1134, 1136 may provide piston 1120 with variable spring rate or stiffness characteristics (e.g. as described above).

In operation, controller 1146 may control inflow and outflow of the liquid to and from first piston cavity 1120a to control a position of second piston 1122 in first piston cavity 1120a and thus control a distance between the connection points of housing 1110 and second piston 1122 with first and second linkages 440, 450, respectively (e.g. the length of piston assembly 1105). The distance between the connection points of housing 1110 and second piston 1122 with first and second linkages 440, 450, respectively, may define the distance between first and second axle axes 414, 424 of dual-axle vehicle corner assembly 400 (e.g. as described above with respect to FIGS. 4E-4F and as described below with respect to FIGS. 11E-11F). Accordingly, by controlling inflow and outflow of the liquid to and from first piston cavity 1120a, controller 1146 may control the distance between first and second axle axes 414, 424 of dual-axle vehicle corner assembly 400 and control the height of dual-axle vehicle corner assembly 400 and of the vehicle platform relative to the ground (e.g. kneeling).

Figure 11E:
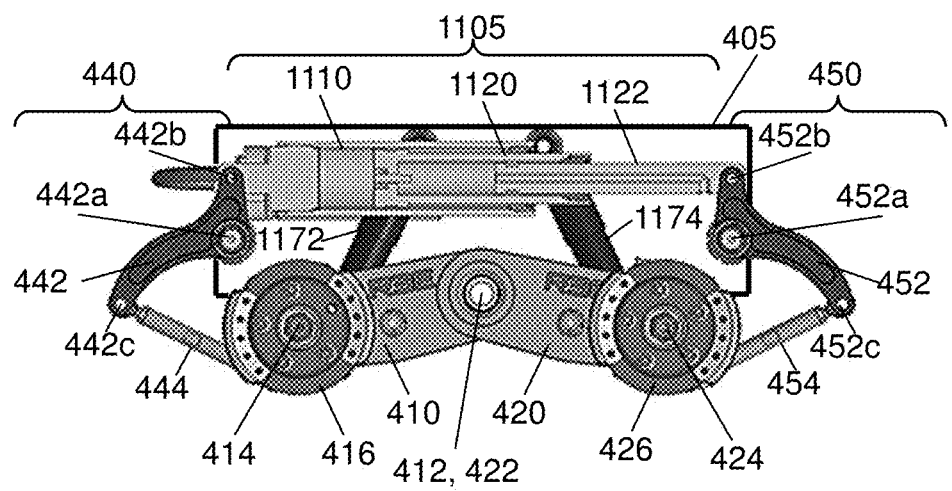
FIGS. 11E and 11F are 2D diagrams of a dual-axle vehicle corner assembly including the telescopic piston assembly of FIGS. 11A-11B, according to some embodiments of the invention.
Figure 11F:
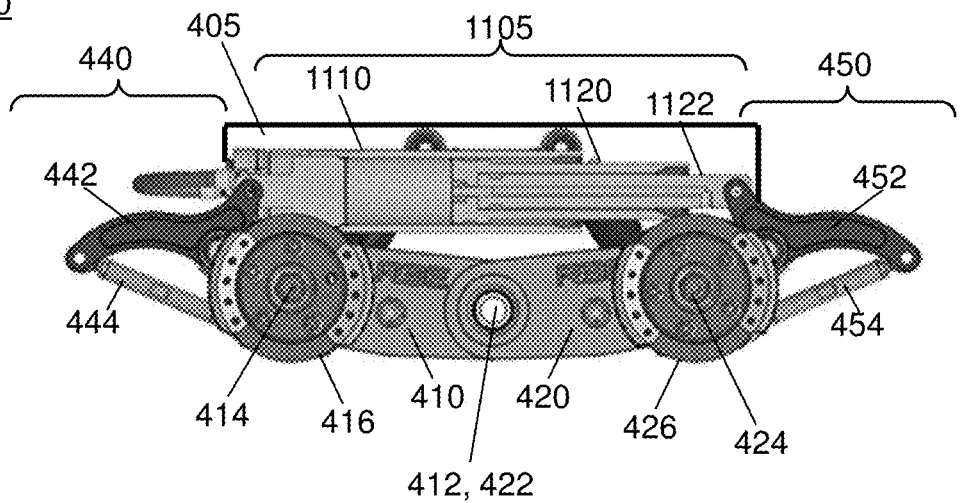

Reference is now made to FIGS. 11E and 11F, which are 2D diagrams of dual-axle vehicle corner assembly 400 including telescopic piston assembly 1105 of FIGS. 11A-11B, according to some embodiments of the invention. FIGS. 11E and 11F show side view of dual-axle vehicle corner assembly 400.

FIGS. 11E and 11F show dual-axle vehicle corner assembly 400 at different distances between first and second axle axes 414, 424 of first and second arms 410, 420 of dual-axle vehicle corner assembly 400, respectively. As described above with respect to FIGS. 4E-4F, the greater the distance between first axle axis 414 and second axle axis 424, the lower sub-frame 405 of dual-axle vehicle corner assembly 400 relative to the ground.

FIGS. 11E and 11F further show an example of first and second linkages 440, 450 that connect telescopic piston assembly 1105 of suspension system 1100 to first and second arms 410, 420, respectively.

First linkage 440 may include a first rocker link 442 and a first link 444. First rocker link 442 be connected (e.g. rotatably connected) to sub-frame 405 (schematically indicated in FIGS. 11E-11F by dashed rectangle) at a first (e.g. fixed) pivoting connection 442a. First rocker link 442 be connected (e.g. rotatably connected) to housing 1110 of telescopic piston assembly 1105 at a second (e.g. movable) pivoting connection 442b. First rocker link 442 be connected (e.g. rotatably connected) to first link 444 at a third (e.g. movable) pivoting connection 442c. First link 444 may be connected (e.g. rotatably connected) to first arm 410. First rocker link 442 and first link 444 may rotate about axes that are parallel (or substantially parallel) to first arm axis 412 and first axle axis 414.

Second linkage 450 may include a second rocker link 452 and a second link 454. Second rocker link 452 be connected (e.g. rotatably connected) to sub-frame 405 at a first (e.g. fixed) pivoting connection 452a. Second rocker link 452 be connected (e.g. rotatably connected) to second piston 1122 of telescopic piston assembly 1105 at a second (e.g. movable) pivoting connection 452b. Second rocker link 452 be connected (e.g. rotatably connected) to second link 454 at a third (e.g. movable) pivoting connection 452c. Second link 454 may be connected (e.g. rotatably connected) to second arm 420. Second rocker link 452 and second link 454 may rotate about axes that are parallel (or substantially parallel) to second arm axis 422 and second axle axis 424.

First and second linkages 440, 450 described with respect to and shown in FIGS. 11E-11F may be used, in some embodiments, to connect suspension systems 800, 900, 1000 disclosed herein to first and second arms 410, 420 of dual-axle vehicle corner assembly 400.

In some embodiments, suspension system 1100 includes a damper 1172 connected (e.g. rotatably connected) between first arm 410 and sub-frame 405 (e.g. as shown in FIGS. 11E-11F). In some embodiments, suspension system 1100 includes a damper 1174 connected (e.g. rotatably connected) between second arm 420 and sub-frame 405 (e.g. as shown in FIG. 11E-11F). In operation, dampers 1172, 1174 may damp relative motion of first and second arms 410, 420 with respect to each other and with respect to sub-frame 405.

Figure 11G:
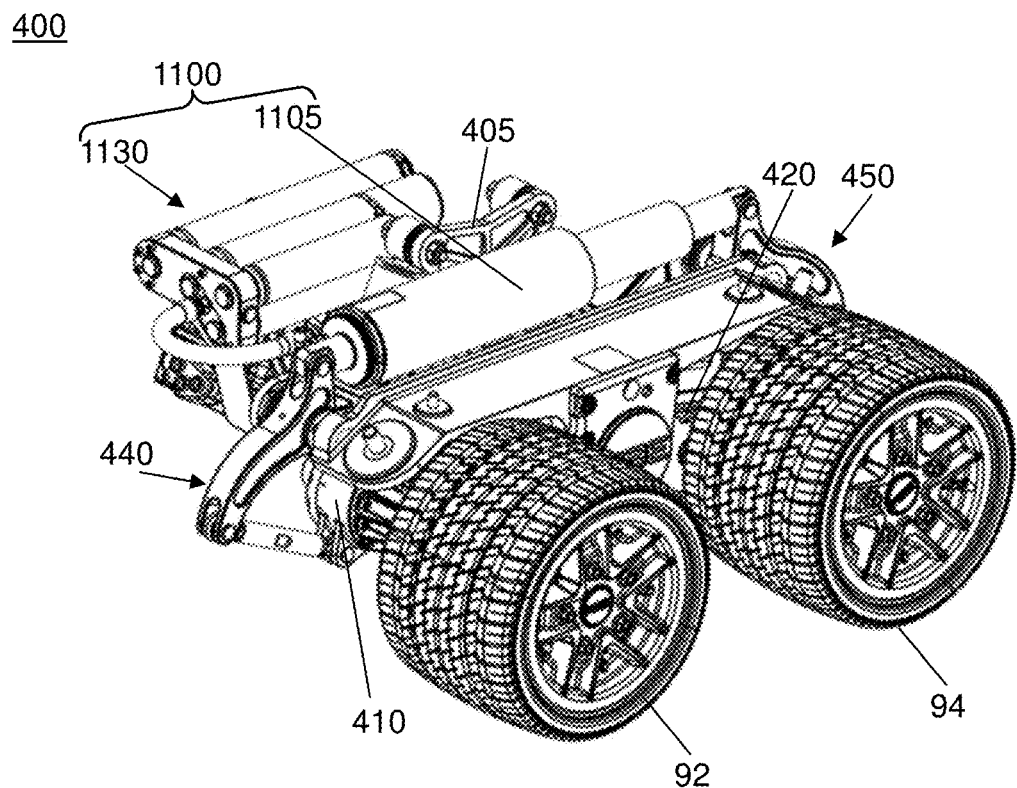
FIGS. 11G and 11H are 3D diagrams of a dual-axle vehicle corner assembly including a drivetrain system and the suspension system of FIGS. 11A-11C, and of wheels connected to the dual-axle vehicle corner assembly, according to some embodiments of the invention.
Figure 11H:
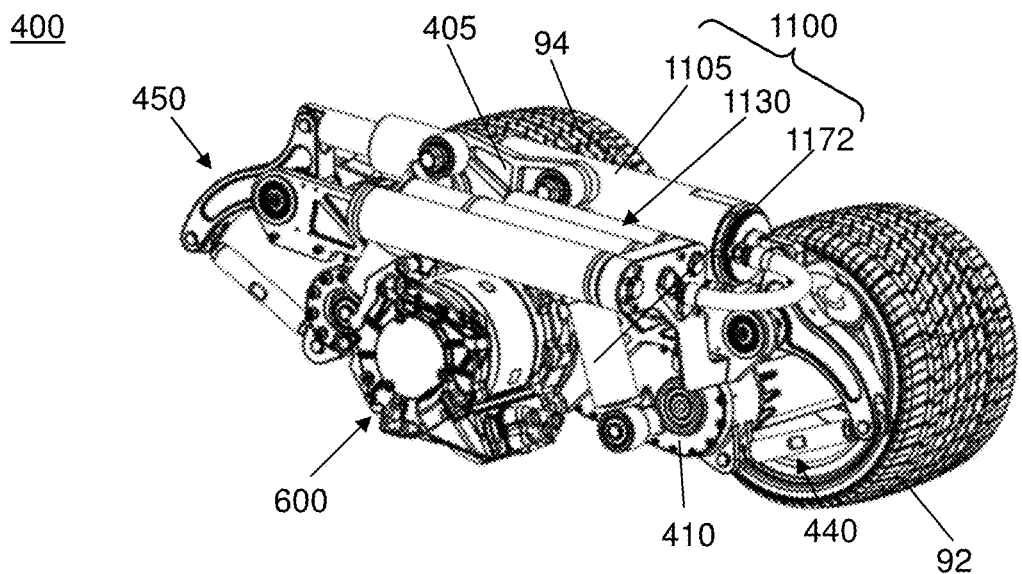

Dual-axle vehicle corner assembly 400 may include any combination of suspension system 1100, steering system 500 and/or drivetrain system 600 described above. For example, FIGS. 11G and 11H show 3D diagrams of dual-axle vehicle corner assembly 400 including drivetrain system 600 and suspension system 1100 of FIGS. 11A-11C, and of wheels 92, 94 connected to dual-axle vehicle corner assembly 400, according to some embodiments of the invention. FIGS. 11G and 11H show different perspective views of dual-axle vehicle corner assembly 400.

Figure 12A:
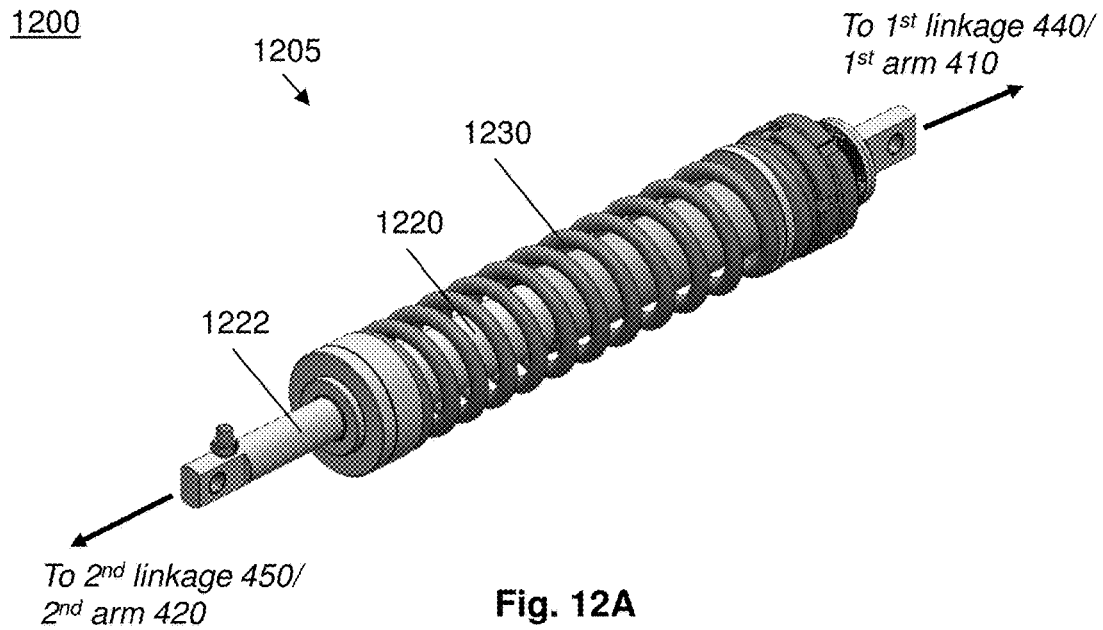
FIG. 12A is a 3D diagram of a piston assembly of a suspension system for a dual-axle vehicle corner assembly, according to some embodiments of the invention.

Reference is now made to FIG. 12A, which is a 3D diagram of a piston assembly 1205 of a suspension system 1200 for dual-axle vehicle corner assembly 400, according to some embodiments of the invention. FIG. 12A shows a perspective view of piston assembly 1205.

Figure 12B:
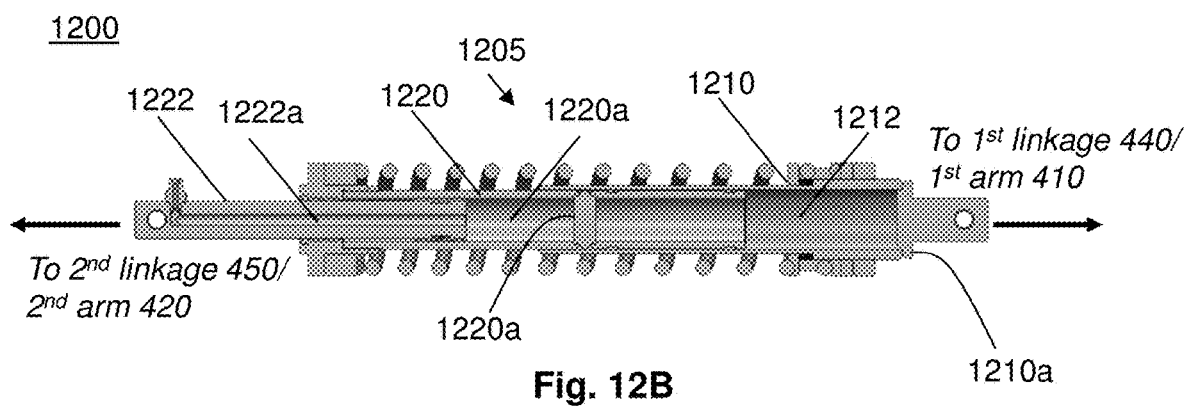
FIG. 12B is a 2D diagram of a partial sectional view of the piston assembly of FIG. 12A, according to some embodiments of the invention.

Reference is also made to FIG. 12B, which is a 2D diagram of a partial sectional view of piston assembly 1205 of FIG. 12A, according to some embodiments of the invention.

Figure 12C:
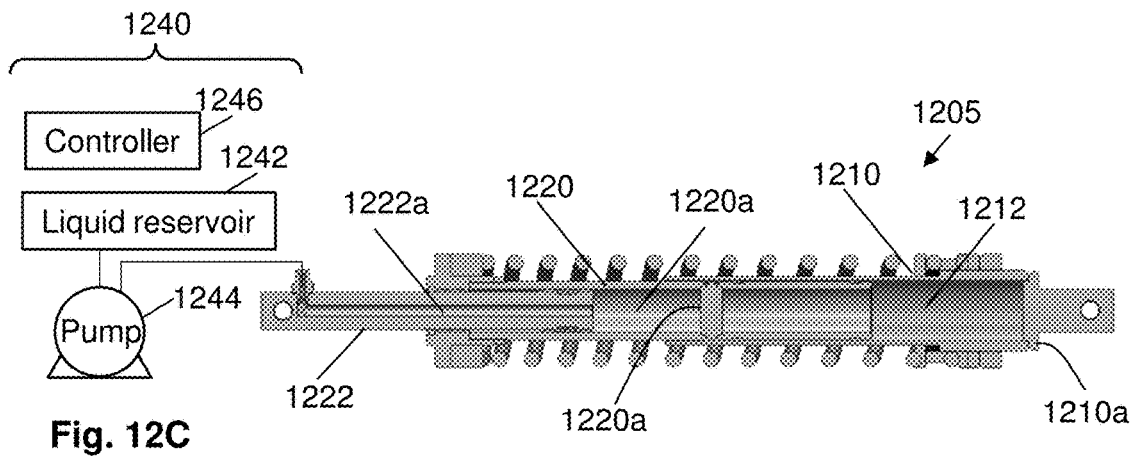
FIG. 12C is a 2D diagram of a partial sectional view of the piston assembly of FIGS. 12A-12B, and a schematic illustration of a hydraulic subsystem, according to some embodiments of the invention.

Reference is also made to FIG. 12C, which is a 2D diagram of a partial sectional view of piston assembly 1205 of FIGS. 12A-12B, and a schematic illustration of a hydraulic subsystem 1240, according to some embodiments of the invention.

Piston assembly 1205 may include a housing 1210 having a housing cavity 1212. Housing 1210 may be connected, e.g. at its closed end 1210a, to first arm 410, e.g. via first linkage 440. Piston assembly 1205 may include a first piston 1220 positioned in housing cavity 1212. First piston 1220 may be sealed with respect to the internal surface of housing cavity 1212. First piston 1220 may include a first piston cavity 1220a having a closed end 1220b. Piston assembly 1205 may include a second piston 1222 positioned within first piston cavity 1220a. Second piston 1222 may be sealed with respect to the internal surface of first piston cavity 1220a. Second piston 1222 may be connected, e.g. at its end extending externally from first position cavity 1220a, to second arm 420, e.g. via second linkage 450. Second piston 1222 may include a hollow channel 1222a made through the length of second piston 1222 to fluidically connect first piston cavity 1220a to hydraulic subsystem 1230. Piston assembly 1205 may include a spring 1230 positioned between and surrounding second piston 1222 and housing 1210.

Hydraulic subsystem 1240 may include a liquid reservoir 1242 and a liquid pump 1244 in fluid communication with liquid reservoir 1242 and with first piston cavity 1220a, e.g. via a hollow channel 1222a made through the length of second piston 1222 (e.g. as shown in FIG. 12C). Liquid pump 1244 may introduce liquid to and expel liquid from second chamber 1214 of housing 1210. Hydraulic subsystem 1240 may include a controller 1246. Controller 1246 may control liquid pump 1244 to control inflow and outflow of the liquid to and from first piston cavity 1220a.

In operation, e.g. when suspension system 1200 is assembled within dual-axle vehicle corner assembly 400, first and second pistons 1220, 1222 may move with respect to housing 1210 and first piston 1220 of piston assembly 1205, respectively, to support and control relative motion of first and second arms 410, 420 with respect to each other and with respect to sub-frame 405 and/or control and distribute loads between first and second arms 410, 420 of dual-axle vehicle corner assembly 400.

In operation, controller 1246 may control inflow and outflow of the liquid to and from first piston cavity 1220a to control a position of second piston 1222 in first piston cavity 1220a and thus control a distance between the connection points of housing 1210 and second piston 1222 with first and second linkages 440, 450, respectively (e.g. the length of piston assembly 1205). The distance between the connection points of housing 1210 and second piston 1222 with first and second linkages 440, 450, respectively, may define the distance between first and second axle axes 414, 424 of dual-axle vehicle corner assembly 400 (e.g. as described above with respect to FIGS. 4E-4F). Accordingly, by controlling inflow and outflow of the liquid to and from first piston cavity 1220*a*, controller 1246 may control the distance between first and second axle axes 414, 424 of dual-axle vehicle corner assembly 400 and control the height of dual-axle vehicle corner assembly 400 and of the vehicle platform relative to the ground.

Advantageously, dual-axle vehicle corner assembly 400 according to embodiments of the invention may have simple design, may be compact (e.g. in one or more of longitudinal, lateral, and vertical dimensions), and may control suspension parameters and distance between axle axes of dual-axle vehicle corner assembly 400. Dual-axle vehicle corner assembly 400 according to embodiments of the invention may be detachably connected to the vehicle platform as a single unit. For example, components of dual-axle vehicle corner assembly 400 may be connected to sub-frame 405 of assembly 400, wherein sub-frame 405 may have a plurality of fasteners (e.g. bolts or any other fasteners know in the art) to connect dual-axle vehicle corner assembly 400 to the vehicle platform. Dual-axle vehicle corner assembly 400 may be connected to either side of the vehicle platform without a need in any mechanical or other adaptations of in neither dual-axle vehicle corner assembly 400 nor the vehicle platform. Dual-axle vehicle corner assembly 400 may include one or more electrical connectors to electrically couple dual-axle vehicle corner assembly 400 to electrical systems of the vehicle platform when dual-axle vehicle corner assembly 400 is connected to the vehicle platform.

Figure 13A:
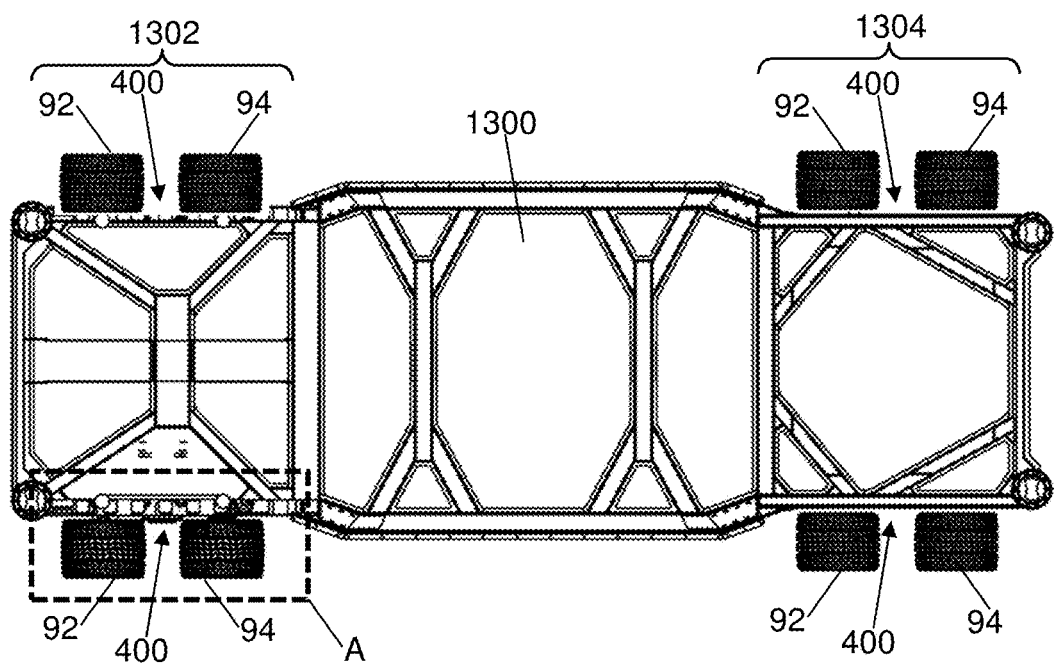
FIGS. 13A and 13B are 2D diagrams of a vehicle platform including dual-axle vehicle corner assemblies, according to some embodiments of the invention.
Figure 13B:
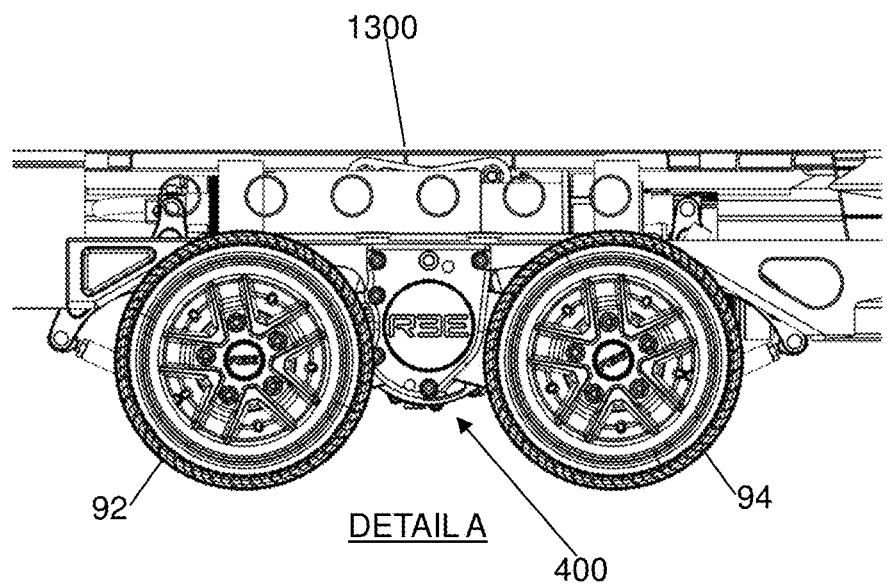

Reference is now made to FIGS. 13A and 13B, which are 2D diagrams of a vehicle platform 1300 including dual-axle vehicle corner assemblies 400, according to some embodiments of the invention. FIG. 13A shows a top view of vehicle platform 1300. FIG. 13B shows an enlarged side view of portion A of FIG. 13A.

Vehicle platform 1300 may include two or more pairs of dual-axle vehicle corner assemblies 400, wherein dual-axle vehicle corner assemblies 400 of each of the pairs may be connected to opposing sides of vehicle platform 1300 with respect to each other. In the example of FIG. 13A, vehicle platform 1300 includes two pairs of dual-axle vehicle corner assemblies 400—e.g. a front pair 1302 and a read pair 1304 of dual-axle vehicle corner assemblies 400.

Each of dual-axle vehicle corner assemblies 400 may be connected to either side of the vehicle platform without a need in any mechanical or other adaptations of in neither dual-axle vehicle corner assemblies 400 nor the vehicle platform. Dual-axle vehicle corner assemblies 400 may be easily connected to vehicle platform 1300 using less connectors, using simpler connectors and in a manner that is less time consuming than conventional dual-axle vehicle corner assemblies 400. For example, sub-frame 405 of each of dual-axle vehicle corner assemblies 400 may be connected to vehicle platform 1300 using screws, bolts, and other connectors known in the art. In some embodiments, dual-axle vehicle corner assemblies 400 are connected laterally to vehicle platform 1300. In some embodiments, dual-axle vehicle corner assemblies 400 are connected vertically to vehicle platform 1300. In various embodiments, at least one of the drivetrain system components, suspension system components, steering system components, and/or the brake system components of dual-axle vehicle corner assemblies 400 is not positioned in an area beneath vehicle platform 1300. In various embodiments, as shown for example in FIG. 13B, at least one of the drivetrain system components, suspension system components, steering system components, and/or the brake system components of dual-axle vehicle corner assemblies 400 is not positioned in an area above vehicle platform 1300.

Utilization of dual-axle vehicle corner assemblies 400 may provide wide design flexibility of vehicle platform 1300. Since dual-axle vehicle corner assemblies 400 may be connected to sides of vehicle platform 1300, e.g. such that none of components of dual-axle vehicle corner assemblies 400 is positioned in an area beneath vehicle platform 1300 and/or in an area above vehicle platform 1300 and between the opposing dual-axle vehicle corner assemblies 400, dual-axle vehicle corner assemblies 400 do not dictate the shape of vehicle platform 1300, which may be flat, or substantially flat, and may be entirely (or substantially entirely) used for installation of vehicle components.

Vehicle platform 1300 having dual-axle vehicle corner assemblies 400 according to embodiments of the invention may be substantially flat and/or may be significantly lower than vehicle platforms assembled with current typical dual-axle corner assemblies. The lower the vehicle platform, the lower its center of mass and thus such vehicle platform may, for example, have improved stability on the ground surface and/or may cause easier loading and unloading of goods, possibly without using a forklift or a loading ramp. Furthermore, the lower the vehicle platform, the greater the volume available for a cargo on the vehicle platform. For example, typical vehicles for city cargo delivery have a total height of 157 inches, wherein typical height of a vehicle chassis platform is 45 inches, providing a maximal height for a cargo volume of 112 inches. Vehicle platform 1300 assembled with dual-axle vehicle corner assemblies 400 according to embodiments of the invention may have a height of 16.5 inches, providing a maximal height for a cargo volume of 140.5 inches. Accordingly, a vehicle having vehicle platform 1300 assembled with dual-axle vehicle corner assemblies 400 according to embodiments of the invention may have 25% more volume for cargo as compared to vehicles having vehicle platforms assembled with typical dual-axle vehicle corner assemblies for platforms having the same footprint.

Each of dual-axle vehicle corner assemblies 400 of first pair 1302 and/or second pair 1304 may include any combination of the suspension system (e.g. suspension system 430, 800, 900, 1000, 1100 or 1200 described above), the steering system (e.g. steering system 500 described above) and/or drivetrain system (e.g. drivetrain system 600 described above). Each of dual-axle vehicle corner assemblies 400 of vehicle platform 1300 may provide a separate suspension for wheels connected thereto, independent of suspension of wheels connected to other dual-axle vehicle corner assemblies 400 of vehicle platform 1300. In some embodiments, each dual-axle vehicle corner assemblies 400 of vehicle platform 1300 may provide a separate steering of wheels connected thereto, independent of steering of wheels connected to other dual-axle vehicle corner assemblies 400 of vehicle platform 1300. In some embodiments, each dual-axle vehicle corner assemblies 400 of vehicle platform 1300 may provide a separate powering of wheels connected thereto, independent of powering of wheels connected to other dual-axle vehicle corner assemblies 400 of vehicle platform 1300. Vehicle platform 1300 assembled with dual-axle vehicle corner assemblies 400 according to embodiments of the invention and having independent suspension and/or independent steering and/or independent powering of dual-axle vehicle corner assemblies 400 may have an improved traction, improved stability, improved performance and improved steering as compared to vehicle platforms assembled with typical dual-axle vehicle corner assemblies.

According to various embodiments, vehicle platform 1300 and/or dual-axle vehicle corner assemblies 400 includes a control system including one or more sensors and a controller. The one or more sensors may measure, for example, road conditions, loads applied on components of dual-axle vehicle corner assemblies 400 or any other parameters related to operation of vehicle platform 1300 or dual-axle vehicle corner assemblies 400. The controller of the control system may process the measured parameters and generate data and/or notifications related thereto. For example, the controller may generate data related to health of vehicle platform 1300 or dual-axle vehicle corner assemblies 400, maintenance data and/or predictive data based on the measured parameters.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A dual-axle vehicle corner assembly comprising:
a sub-frame;
a first arm connected to the sub-frame and rotatable with respect to the sub-frame about a first arm axis, the first arm having a first axle axis about which a first wheel rotates when connected to the first arm;
a second arm connected to the sub-frame and rotatable with respect to the sub-frame about a second arm axis, the second arm having a second axle axis about which a second wheel rotates when connected to the second arm; and
a suspension system comprising a piston assembly interconnecting the first arm and the second arm, the piston assembly is to controllably increase and decrease a length of the piston assembly to control a distance between the first axle axis and the second axle axis;
wherein the first arm axis, the first axle axis, the second arm axis and the second axle axis are substantially parallel to each other;
wherein the piston assembly comprising:
a housing;
a first piston coupled to the first arm and having a first piston head, and a second piston coupled to the second arm and having a second piston head, the first piston head and the second piston head being positioned within the housing and forming within the housing a first fluid chamber, a second fluid chamber and a third fluid chamber; and
a spring positioned within the housing between the first piston head and the second piston head.

2. The assembly of claim 1, wherein the piston assembly is to controllably increase and decrease the length of the piston assembly to control a height of the sub-frame relative to a ground surface when the assembly is assembled to a vehicle platform.

3. The assembly of claim 1, wherein the first arm axis coincides with the second arm axis.

4. The assembly of claim 1, wherein the piston assembly, the first arm and the second arm are positioned at the same side of the sub-frame.

5. The assembly of claim 1, wherein (i) the piston assembly and (ii) the first arm and the second arm are positioned at opposing sides of the sub-frame with respect to each other.

6. The assembly of claim 1, wherein the suspension system comprising:
a fluid pump to alternately introduce fluid to and expel fluid from at least one of the first fluid chamber, the second fluid chamber or the third fluid chamber; and
a controller to operate the fluid pump to control at least one of a spring rate of the spring and the distance between the first axle axis and the second axle axis.

7. The assembly of claim 1, comprising:
a first connector connected to the first arm and rotatable about the first axle axis, the first connector to connect to the first wheel; and
a second connector connected to the second arm and rotatable about the second axle axis, the second connector to connect to the second wheel;
wherein at least one of: (i) the first connector is steerable relative to the first arm about a first steering axis or (ii) the second connector is steerable relative to the second arm about a second steering axis.

8. The assembly of claim 1, comprising:
a first connector connected to the first arm and rotatable about the first axle axis, the first connector to connect to the first wheel;
a second connector connected to the second arm and rotatable about the second axle axis, the second connector to connect to the second wheel; and
a drivetrain motor connected to the sub-frame, the drivetrain motor is to rotate at least one of the first connector or the second connector about the first axle axis and the second axle axis, respectively.

9. A dual-axle vehicle corner assembly comprising:
a sub-frame;
a first arm connected to the sub-frame and rotatable with respect to the sub-frame about a first arm axis, the first arm having a first axle axis about which a first wheel rotates when connected to the first arm;
a second arm connected to the sub-frame and rotatable with respect to the sub-frame about a second arm axis, the second arm having a second axle axis about which a second wheel rotates when connected to the second arm; and
a suspension system comprising a piston assembly interconnecting the first arm and the second arm, the piston assembly is to controllably increase and decrease a length of the piston assembly to control a distance between the first axle axis and the second axle axis;
wherein the first arm axis, the first axle axis, the second arm axis and the second axle axis are substantially parallel to each other,
wherein the piston assembly comprising:
a housing connected to the first arm;
a first spring-loaded member and a second spring-loaded member positioned within the housing, the first spring-loaded member and the second spring-loaded member being parallel to each other and being connected to the second arm;
wherein springs of the first spring-loaded member and the second spring-loaded member are preloaded to set the distance between the first axle axis and the second axle axis.

10. The assembly of claim 9, wherein the suspension system comprising:
a liquid pump to alternately introduce liquid to and expel liquid from the housing; and
a controller to operate the liquid pump to control the length of the piston assembly and the distance between the first axle axis and the second axle axis.

11. A dual-axle vehicle corner assembly of claim 1 comprising:
a sub-frame;
a first arm connected to the sub-frame and rotatable with respect to the sub-frame about a first arm axis, the first arm having a first axle axis about which a first wheel rotates when connected to the first arm;
a second arm connected to the sub-frame and rotatable with respect to the sub-frame about a second arm axis, the second arm having a second axle axis about which a second wheel rotates when connected to the second arm; and
a suspension system comprising a piston assembly interconnecting the first arm and the second arm, the piston assembly is to controllably increase and decrease a length of the piston assembly to control a distance between the first axle axis and the second axle axis;
wherein the first arm axis, the first axle axis, the second arm axis and the second axle axis are substantially parallel to each other,
wherein the piston assembly comprising:
a housing comprising:
a first chamber, and
a second chamber;
a first piston positioned within the first chamber and connected to the first arm; and
a second piston positioned within the second chamber and connected to the second arm.

12. The assembly of claim 11, wherein the suspension system comprising an accumulator in fluid communication with the first chamber of the housing, the accumulator comprising a pressurized gas.

13. The assembly of claim 11, wherein the suspension system comprising two or more accumulators in fluid communication with the first chamber of the housing, each of the accumulators comprising a gas pressurized to a different pressure value than a gas in other accumulators.

14. The assembly of claim 11, wherein the suspension system comprising:
a liquid pump to alternately introduce liquid to and expel liquid from the second chamber of the housing; and
a controller to operate the liquid pump to control the length of the piston assembly and the distance between the first axle axis and the second axle axis.

15. The assembly of claim 11, wherein the suspension system comprising a first damper interconnecting the housing and the first arm and a second damper interconnecting the housing and the second arm.

16. A dual-axle vehicle corner comprising:
a sub-frame;
a first arm connected to the sub-frame and rotatable with respect to the sub-frame about a first arm axis, the first arm having a first axle axis about which a first wheel rotates when connected to the first arm;
a second arm connected to the sub-frame and rotatable with respect to the sub-frame about a second arm axis, the second arm having a second axle axis about which a second wheel rotates when connected to the second arm; and
a suspension system comprising a piston assembly interconnecting the first arm and the second arm, the piston assembly is to controllably increase and decrease a length of the piston assembly to control a distance between the first axle axis and the second axle axis;
wherein the first arm axis, the first axle axis, the second arm axis and the second axle axis are substantially parallel to each other,
wherein the piston assembly comprising:
a housing comprising a housing cavity, the housing being connected to the first arm;
a first piston positioned within the housing cavity, the first piston comprising a first piston cavity; and
a second piston positioned within the first piston cavity and comprising a hollow channel in fluid communication with the first piston cavity, the second piston being connected to the second arm.

17. The assembly of claim 16, wherein the suspension system comprising two or more accumulators in fluid communication with the housing cavity, each of the accumulators comprising a gas pressurized to a different pressure value than a gas in other accumulators.

18. The assembly of claim 16, wherein the suspension system comprising:
a liquid pump to alternately introduce liquid to and expel liquid from the first piston cavity; and
a controller to operate the liquid pump to control the length of the piston assembly and the distance between the first axle axis and the second axle axis.

19. The assembly of claim 16, wherein the suspension system comprising a first damper interconnecting the sub-frame and the first arm and a second damper interconnecting the sub-frame and the second arm.

20. A dual-axle vehicle corner comprising:
a sub-frame;
a first arm connected to the sub-frame and rotatable with respect to the sub-frame about a first arm axis, the first arm having a first axle axis about which a first wheel rotates when connected to the first arm;
a second arm connected to the sub-frame and rotatable with respect to the sub-frame about a second arm axis, the second arm having a second axle axis about which a second wheel rotates when connected to the second arm; and a suspension system comprising a piston assembly interconnecting the first arm and the second arm, the piston assembly is to controllably increase and decrease a length of the piston assembly to control a distance between the first axle axis and the second axle axis;

wherein the first arm axis, the first axle axis, the second arm axis and the second axle axis are substantially parallel to each other;

wherein the first arm and the second arm are steerable about a steering axis relative to the sub-frame, the steering axis being positioned between the first axle axis and the second axle axis.

* * * * *